US011449012B2

(12) United States Patent
Raji et al.

(10) Patent No.: US 11,449,012 B2
(45) **Date of Patent: *Sep. 20, 2022**

(54) PREMISES MANAGEMENT NETWORKING

(71) Applicant: iControl Networks, Inc., Philadelphia, PA (US)

(72) Inventors: Reza Raji, Menlo Park, CA (US); Gerald Gutt, Tucson, AZ (US)

(73) Assignee: iControl Networks, Inc., Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/171,398

(22) Filed: Feb. 9, 2021

(65) Prior Publication Data

US 2021/0165372 A1 Jun. 3, 2021

Related U.S. Application Data

(63) Continuation of application No. 17/105,235, filed on Nov. 25, 2020, which is a continuation of application (Continued)

(51) Int. Cl.
*H04L 12/28* (2006.01)
*H04L 67/025* (2022.01)
(Continued)

(52) U.S. Cl.
CPC ........... *G05B 11/012* (2013.01); *G05B 11/01* (2013.01); *G06Q 30/02* (2013.01);
(Continued)

(58) Field of Classification Search
CPC ....... G05B 11/012; G05B 2219/15052; H04M 1/72403; H04L 41/0853; H04L 41/08; H04L 41/0866; H04L 41/12; H04L 41/22; H04L 41/045; H04L 67/2823; H04L 43/04; H04L 12/2803; H04L 12/2809;
(Continued)

(56) References Cited

U.S. PATENT DOCUMENTS 686,838 A 11/1901 Appel
1,738,540 A 12/1929 Replogle et al.
(Continued)

FOREIGN PATENT DOCUMENTS

AU 2005223267 B2 12/2010
AU 2010297957 A1 5/2012
(Continued)

OTHER PUBLICATIONS

US patent application filed on May 2, 2018, entitled "Automation System With Mobile Interface", U.S. Appl. No. 15/969,514.
(Continued)

*Primary Examiner* — Alina A Boutah
(74) *Attorney, Agent, or Firm* — BakerHostetler

(57) ABSTRACT

Methods and systems for managing a premises are disclosed. The premises may comprise a premises device and a gateway device in communication with the premises device. The gateway may send, to a server device and based on a current mode associated with the premises, one or more messages.

35 Claims, 17 Drawing Sheets

Related U.S. Application Data

No. 16/128,089, filed on Sep. 11, 2018, now Pat. No. 10,890,881, which is a continuation of application No. 13/718,851, filed on Dec. 18, 2012, now Pat. No. 10,156,831, which is a continuation of application No. 11/084,232, filed on Mar. 16, 2005, now Pat. No. 8,335,842.

(60) Provisional application No. 60/652,475, filed on Feb. 11, 2005, provisional application No. 60/553,934, filed on Mar. 16, 2004, provisional application No. 60/553,932, filed on Mar. 16, 2004.

(51) Int. Cl.

| | |
|---|---|
| ***H04L 67/125*** | (2022.01) |
| ***H04L 67/75*** | (2022.01) |
| ***H04L 41/0853*** | (2022.01) |
| ***G05B 11/01*** | (2006.01) |
| ***G06Q 30/02*** | (2012.01) |
| ***G06Q 30/06*** | (2012.01) |
| ***G06Q 50/06*** | (2012.01) |
| ***G06Q 50/08*** | (2012.01) |
| ***G06Q 50/12*** | (2012.01) |
| ***G06Q 50/16*** | (2012.01) |
| ***H04M 1/72403*** | (2021.01) |
| ***H04L 67/55*** | (2022.01) |
| ***H04L 67/565*** | (2022.01) |
| ***H04L 43/04*** | (2022.01) |
| *H04W 80/12* | (2009.01) |
| *H04W 88/02* | (2009.01) |

(52) U.S. Cl.

CPC ......... *G06Q 30/0601* (2013.01); *G06Q 50/06* (2013.01); *G06Q 50/08* (2013.01); *G06Q 50/12* (2013.01); *G06Q 50/16* (2013.01); *G06Q 50/163* (2013.01); *H04L 12/2803* (2013.01); *H04L 12/2809* (2013.01); *H04L 12/2818* (2013.01); *H04L 12/2825* (2013.01); *H04L 12/2834* (2013.01); *H04L 41/0853* (2013.01); *H04L 43/04* (2013.01); *H04L 67/025* (2013.01); *H04L 67/125* (2013.01); *H04L 67/55* (2022.05); *H04L 67/565* (2022.05); *H04L 67/75* (2022.05); *H04M 1/72403* (2021.01); *G05B 2219/15052* (2013.01); *H04L 2012/285* (2013.01); *H04L 2012/2841* (2013.01); *H04L 2012/2843* (2013.01); *H04W 80/12* (2013.01); *H04W 88/02* (2013.01)

(58) Field of Classification Search

CPC ............. H04L 12/2818; H04L 12/2825; H04L 12/2834; H04L 2012/2841; H04L 2012/2843; H04L 2012/285; H04L 67/36; H04L 67/925; H04L 67/26; H04L 67/125; H04W 80/12; H04W 88/02

See application file for complete search history.

(56) References Cited

U.S. PATENT DOCUMENTS

| | | | | |
|---|---|---|---|---|
| 3,803,576 A | | 4/1974 | Dobrzanski et al. | |
| 3,852,541 A | | 12/1974 | Altenberger | |
| 4,006,460 A | | 2/1977 | Hewitt et al. | |
| 4,141,006 A | | 2/1979 | Braxton | |
| 4,206,449 A | | 6/1980 | Apsell et al. | |
| 4,257,038 A | | 3/1981 | Rounds et al. | |
| 4,286,331 A | | 8/1981 | Anderson et al. | |
| 4,304,970 A | | 12/1981 | Fahey et al. | |
| 4,351,023 A | | 9/1982 | Richer | |
| 4,363,031 A | | 12/1982 | Reinowitz | |
| 4,459,582 A | | 7/1984 | Sheahan et al. | |
| 4,520,503 A | | 5/1985 | Kirst et al. | |
| 4,559,526 A | | 12/1985 | Tani et al. | |
| 4,559,527 A | | 12/1985 | Kirby | |
| 4,567,557 A | | 1/1986 | Burns | |
| 4,574,305 A | | 3/1986 | Campbell et al. | |
| 4,581,606 A | | 4/1986 | Mallory | |
| 4,591,834 A | | 5/1986 | Kyle | |
| D284,084 S | | 6/1986 | Ferrara, Jr. | |
| 4,641,127 A | | 2/1987 | Hogan et al. | |
| 4,652,859 A | | 3/1987 | Van Wienen | |
| 4,670,739 A | | 6/1987 | Kelly, Jr. | |
| 4,683,460 A | | 7/1987 | Nakatsugawa | |
| 4,694,282 A | | 9/1987 | Tamura et al. | |
| 4,716,973 A | | 1/1988 | Cobern | |
| 4,730,184 A | | 3/1988 | Bach | |
| 4,754,261 A | | 6/1988 | Marino | |
| 4,755,792 A | | 7/1988 | Pezzolo et al. | |
| 4,779,007 A | | 10/1988 | Schlanger et al. | |
| 4,801,924 A | | 1/1989 | Burgmann et al. | |
| 4,812,820 A | | 3/1989 | Chatwin | |
| 4,818,970 A | | 4/1989 | Natale et al. | |
| 4,833,339 A | | 5/1989 | Luchaco et al. | |
| 4,833,449 A | | 5/1989 | Gaffigan | |
| 4,855,713 A | | 8/1989 | Brunius | |
| 4,860,185 A | | 8/1989 | Brewer et al. | |
| 4,887,064 A | | 12/1989 | Drori et al. | |
| 4,897,630 A | | 1/1990 | Nykerk | |
| 4,918,623 A | | 4/1990 | Lockitt et al. | |
| 4,918,717 A | | 4/1990 | Bissonnette et al. | |
| 4,951,029 A | | 8/1990 | Severson | |
| 4,959,713 A | * | 9/1990 | Morotomi ............ | G08B 25/085 340/4.4 |
| 4,962,473 A | | 10/1990 | Crain | |
| 4,980,666 A | | 12/1990 | Hwang | |
| 4,993,059 A | | 2/1991 | Smith et al. | |
| 4,994,787 A | | 2/1991 | Kratt et al. | |
| 4,996,646 A | | 2/1991 | Farrington | |
| 5,023,901 A | | 6/1991 | Sloan et al. | |
| 5,083,106 A | | 1/1992 | Kostusiak et al. | |
| 5,086,385 A | * | 2/1992 | Launey .................. | G08B 25/14 700/83 |
| 5,091,780 A | | 2/1992 | Pomerleau | |
| 5,109,278 A | | 4/1992 | Erickson et al. | |
| 5,132,968 A | | 7/1992 | Cephus | |
| 5,134,644 A | | 7/1992 | Garton et al. | |
| 5,159,315 A | | 10/1992 | Schultz et al. | |
| 5,160,879 A | | 11/1992 | Tortola et al. | |
| 5,164,703 A | | 11/1992 | Rickman | |
| 5,164,979 A | | 11/1992 | Choi | |
| D337,569 S | | 7/1993 | Kando | |
| 5,227,776 A | | 7/1993 | Starefoss | |
| 5,237,305 A | | 8/1993 | Ishikuro et al. | |
| 5,245,694 A | | 9/1993 | Zwern | |
| 5,280,527 A | | 1/1994 | Gullman et al. | |
| 5,283,816 A | | 2/1994 | Gomez Diaz | |
| 5,299,971 A | | 4/1994 | Hart | |
| 5,319,394 A | | 6/1994 | Dukek | |
| 5,319,698 A | | 6/1994 | Glidewell et al. | |
| 5,334,974 A | | 8/1994 | Simms et al. | |
| 5,400,011 A | | 3/1995 | Sutton | |
| 5,400,246 A | | 3/1995 | Wilson et al. | |
| 5,406,260 A | | 4/1995 | Cummings et al. | |
| 5,410,343 A | | 4/1995 | Coddington et al. | |
| 5,412,708 A | | 5/1995 | Katz | |
| 5,414,409 A | | 5/1995 | Voosen et al. | |
| 5,414,833 A | | 5/1995 | Hershey et al. | |
| 5,428,293 A | | 6/1995 | Sinclair et al. | |
| 5,438,607 A | | 8/1995 | Przygoda et al. | |
| 5,446,445 A | | 8/1995 | Bloomfield et al. | |
| 5,448,290 A | | 9/1995 | Vanzeeland | |
| 5,452,344 A | | 9/1995 | Larson | |
| 5,465,081 A | | 11/1995 | Todd | |
| 5,471,194 A | | 11/1995 | Guscott | |
| 5,481,312 A | | 1/1996 | Cash et al. | |
| 5,483,224 A | | 1/1996 | Rankin et al. | |
| 5,486,812 A | | 1/1996 | Todd | |

(56) References Cited

U.S. PATENT DOCUMENTS 5,499,014 A 3/1996 Greenwaldt
5,499,196 A 3/1996 Pacheco
5,510,975 A 4/1996 Ziegler, Jr.
5,519,878 A 5/1996 Dolin, Jr.
RE35,268 E 6/1996 Frolov et al.
5,525,966 A 6/1996 Parish
5,526,428 A 6/1996 Arnold
5,534,845 A 7/1996 Issa et al.
5,541,585 A 7/1996 Duhame et al.
5,543,778 A 8/1996 Stouffer
5,546,072 A 8/1996 Creuseremee et al.
5,546,074 A 8/1996 Bernal et al.
5,546,447 A 8/1996 Skarbo et al.
5,548,646 A 8/1996 Aziz et al.
5,550,984 A 8/1996 Gelb
5,557,254 A 9/1996 Johnson et al.
5,565,843 A * 10/1996 Meyvis .................... G08B 5/36 340/326
5,570,079 A 10/1996 Dockery
5,572,438 A 11/1996 Ehlers et al.
5,578,989 A 11/1996 Pedtke
5,579,197 A 11/1996 Mengelt et al.
5,579,221 A * 11/1996 Mun .................... G05B 19/042 700/83
D377,034 S 12/1996 Matsushita
5,586,254 A 12/1996 Kondo et al.
5,587,705 A 12/1996 Morris
5,598,086 A 1/1997 Somerville
5,602,918 A 2/1997 Chen et al.
5,604,493 A 2/1997 Behlke
5,606,615 A 2/1997 Lapointe et al.
5,621,662 A * 4/1997 Humphries ............ G05B 15/02 340/3.1
5,623,601 A 4/1997 Vu
5,625,338 A 4/1997 Pildner et al.
5,625,410 A 4/1997 Washino et al.
5,629,687 A 5/1997 Sutton et al.
5,630,216 A 5/1997 McEwan
5,631,630 A 5/1997 McSweeney
5,638,046 A 6/1997 Malinowski
5,650,773 A 7/1997 Chiarello
5,651,070 A 7/1997 Blunt
5,652,567 A 7/1997 Traxler
5,654,694 A 8/1997 Newham
5,675,321 A 10/1997 McBride
5,680,131 A 10/1997 Utz
5,682,133 A 10/1997 Johnson et al.
5,686,885 A 11/1997 Bergman
5,686,896 A 11/1997 Bergman
5,689,235 A 11/1997 Sugimoto et al.
5,689,708 A 11/1997 Regnier et al.
5,691,697 A 11/1997 Carvalho et al.
5,694,335 A 12/1997 Hollenberg
5,694,595 A 12/1997 Jacobs et al.
5,696,486 A 12/1997 Poliquin et al.
5,696,898 A 12/1997 Baker et al.
D389,501 S 1/1998 Mascarenas et al.
5,706,191 A 1/1998 Bassett et al.
5,712,679 A 1/1998 Coles
5,714,933 A 2/1998 Le Van Suu
5,715,394 A 2/1998 Jabs
5,717,378 A 2/1998 Malvaso et al.
5,717,379 A 2/1998 Peters
5,717,578 A 2/1998 Afzal
5,719,551 A 2/1998 Flick
5,726,912 A 3/1998 Krall et al.
5,731,756 A 3/1998 Roddy
5,736,927 A 4/1998 Stebbins et al.
5,737,391 A 4/1998 Dame et al.
5,748,084 A 5/1998 Isikoff
5,748,089 A 5/1998 Sizemore
5,757,616 A 5/1998 May et al.
5,761,206 A 6/1998 Kackman
5,774,051 A 6/1998 Kostusiak
5,777,551 A 7/1998 Hess
5,777,837 A 7/1998 Eckel et al.
5,784,461 A 7/1998 Shaffer et al.
5,784,463 A 7/1998 Chen et al.
5,790,531 A 8/1998 Ellebracht et al.
5,793,028 A 8/1998 Wagener et al.
5,793,763 A 8/1998 Mayes et al.
5,794,128 A 8/1998 Brockel et al.
5,796,401 A 8/1998 Winer
5,798,701 A 8/1998 Bernal et al.
5,801,618 A 9/1998 Jenkins
5,805,056 A 9/1998 Mueller et al.
5,805,064 A 9/1998 Yorkey
5,809,013 A 9/1998 Kackman
5,809,265 A 9/1998 Blair et al.
5,812,054 A 9/1998 Cohen
5,819,124 A 10/1998 Somner et al.
5,821,937 A 10/1998 Tonelli
5,838,226 A 11/1998 Houggy et al.
5,844,599 A 12/1998 Hildin
5,845,070 A 12/1998 Ikudome
5,854,588 A 12/1998 Dockery
5,859,966 A 1/1999 Hayman et al.
5,861,804 A 1/1999 Fansa et al.
5,864,614 A 1/1999 Farris et al.
5,867,484 A 2/1999 Shaunfield
5,867,495 A 2/1999 Elliott et al.
5,874,952 A 2/1999 Morgan
5,875,395 A 2/1999 Holmes
5,877,696 A 3/1999 Powell
5,877,957 A * 3/1999 Bennett ................ G05B 19/042 700/86
5,880,775 A 3/1999 Ross
5,881,226 A 3/1999 Veneklase
5,886,894 A 3/1999 Rakoff
5,892,442 A 4/1999 Ozery
5,898,831 A 4/1999 Hall et al.
5,905,438 A 5/1999 Weiss et al.
5,907,279 A 5/1999 Bruins et al.
5,909,183 A 6/1999 Borgstahl et al.
5,914,655 A 6/1999 Clifton et al.
5,924,069 A 7/1999 Kowalkowski et al.
5,926,209 A 7/1999 Glatt
5,933,098 A 8/1999 Haxton
5,940,387 A 8/1999 Humpleman
5,943,394 A 8/1999 Ader et al.
5,952,815 A 9/1999 Rouillard et al.
5,955,946 A 9/1999 Beheshti et al.
5,958,053 A 9/1999 Denker
5,959,528 A 9/1999 Right et al.
5,959,529 A 9/1999 Kail, IV
5,963,916 A 10/1999 Kaplan
5,967,975 A 10/1999 Ridgeway
5,974,547 A 10/1999 Klimenko
D416,910 S 11/1999 Vasquez
5,982,418 A 11/1999 Ely
5,991,795 A 11/1999 Howard et al.
5,995,838 A 11/1999 Oda et al.
6,002,430 A 12/1999 McCall et al.
6,009,320 A 12/1999 Dudley
6,011,321 A 1/2000 Stancu et al.
6,011,921 A 1/2000 Takahashi et al.
6,032,036 A 2/2000 Maystre et al.
6,037,991 A 3/2000 Thro et al.
6,038,289 A 3/2000 Sands
6,040,770 A 3/2000 Britton
6,049,272 A 4/2000 Lee et al.
6,049,273 A 4/2000 Hess
6,049,598 A 4/2000 Peters et al.
6,052,052 A 4/2000 Delmonaco
6,058,115 A 5/2000 Sawyer et al.
6,060,994 A 5/2000 Chen
6,067,346 A 5/2000 Akhteruzzaman
6,067,440 A 5/2000 Diefes
6,069,655 A 5/2000 Seeley et al.
6,078,253 A 6/2000 Fowler
6,078,257 A 6/2000 Ferraro
6,078,649 A 6/2000 Small et al.
6,085,030 A 7/2000 Whitehead et al.
6,091,771 A 7/2000 Seeley et al.

(56) References Cited

U.S. PATENT DOCUMENTS 6,094,134 A 7/2000 Cohen
6,097,429 A 8/2000 Seeley et al.
6,104,785 A 8/2000 Chen
6,107,918 A 8/2000 Klein et al.
6,107,930 A 8/2000 Behlke et al.
6,108,034 A 8/2000 Kim
6,112,015 A 8/2000 Planas et al.
6,112,237 A 8/2000 Donaldson et al.
6,117,182 A 9/2000 Alpert et al.
6,124,882 A 9/2000 Voois et al.
6,128,653 A 10/2000 Del et al.
6,134,303 A 10/2000 Chen
6,134,591 A 10/2000 Nickles
6,138,249 A 10/2000 Nolet
6,139,177 A 10/2000 Venkatraman et al.
6,140,987 A 10/2000 Stein et al.
6,144,993 A 11/2000 Fukunaga et al.
6,154,133 A 11/2000 Ross et al.
6,157,943 A 12/2000 Meyer
6,161,182 A 12/2000 Nadooshan
6,167,186 A 12/2000 Kawasaki et al.
6,167,253 A 12/2000 Farris et al.
6,181,341 B1 1/2001 Shinagawa
6,192,282 B1 2/2001 Smith et al.
6,192,418 B1 2/2001 Hale et al.
6,198,475 B1 3/2001 Kunimatsu et al.
6,198,479 B1 3/2001 Humpleman et al.
6,208,247 B1 3/2001 Agre et al.
6,208,952 B1 3/2001 Goertzel et al.
6,209,011 B1 3/2001 Vong et al.
6,211,783 B1 4/2001 Wang
6,215,404 B1 4/2001 Morales
6,218,938 B1 4/2001 Lin
6,219,677 B1 4/2001 Howard
6,226,031 B1 5/2001 Barraclough et al.
6,229,429 B1 5/2001 Horon
6,230,271 B1 5/2001 Wadlow et al.
6,239,892 B1 5/2001 Davidson
6,243,683 B1 6/2001 Peters
6,246,320 B1 6/2001 Monroe
6,252,883 B1 6/2001 Schweickart et al.
6,271,752 B1 8/2001 Vaios
6,275,227 B1 8/2001 DeStefano
6,281,790 B1 8/2001 Kimmel et al.
6,282,569 B1 8/2001 Wallis et al.
6,286,038 B1 9/2001 Reichmeyer et al.
6,288,716 B1 9/2001 Humpleman et al.
6,289,382 B1 9/2001 Bowman-Amuah
6,292,766 B1 9/2001 Mattos et al.
6,292,827 B1 9/2001 Raz
6,295,346 B1 9/2001 Markowitz et al.
6,314,425 B1 11/2001 Serbinis et al.
6,320,506 B1 11/2001 Ferraro
6,323,897 B1 11/2001 Kogane et al.
D451,529 S 12/2001 Vasquez
6,327,044 B1 12/2001 Shima
6,331,122 B1 12/2001 Wu
6,332,193 B1 12/2001 Glass et al.
6,347,393 B1 2/2002 Alpert et al.
6,351,213 B1 2/2002 Hirsch et al.
6,351,271 B1 2/2002 Mainwaring et al.
6,351,595 B1 2/2002 Kim
6,351,829 B1 2/2002 Dupont et al.
6,353,853 B1 * 3/2002 Gravlin .................. H04L 41/22 702/188
6,353,891 B1 3/2002 Borella et al.
6,359,560 B1 3/2002 Budge et al.
6,363,417 B1 3/2002 Howard et al.
6,363,422 B1 3/2002 Hunter et al.
6,366,211 B1 4/2002 Parker
6,369,695 B1 4/2002 Horon
6,369,705 B1 4/2002 Kennedy
6,370,436 B1 4/2002 Howard et al.
6,374,079 B1 4/2002 Hsu
6,377,861 B1 4/2002 York
6,378,109 B1 4/2002 Young et al.
6,385,772 B1 5/2002 Courtney
6,392,538 B1 5/2002 Shere
6,396,531 B1 5/2002 Gerszberg et al.
6,400,265 B1 6/2002 Saylor et al.
6,405,348 B1 6/2002 Fallah-Tehrani et al.
6,411,802 B1 6/2002 Cardina et al.
D460,472 S 7/2002 Wang
6,418,037 B1 7/2002 Zhang
6,421,080 B1 7/2002 Lambert
6,430,629 B1 8/2002 Smyers
6,433,683 B1 8/2002 Robinson
6,434,604 B1 8/2002 Harada et al.
6,434,700 B1 8/2002 Alonso et al.
6,437,692 B1 8/2002 Petite et al.
6,441,723 B1 8/2002 Mansfield et al.
6,441,731 B1 8/2002 Hess
6,442,241 B1 8/2002 Tsumpes
6,445,291 B2 9/2002 Addy et al.
6,446,192 B1 9/2002 Narasimhan et al.
6,452,490 B1 9/2002 Garland et al.
6,452,923 B1 9/2002 Gerszberg et al.
6,452,924 B1 9/2002 Golden et al.
6,453,687 B2 9/2002 Sharood et al.
D464,328 S 10/2002 Vasquez et al.
D464,948 S 10/2002 Vasquez et al.
6,462,507 B2 10/2002 Fisher, Jr.
6,462,663 B1 10/2002 Wilson et al.
6,467,084 B1 10/2002 Howard et al.
6,476,858 B1 11/2002 Ramirez et al.
6,480,901 B1 11/2002 Weber et al.
6,493,020 B1 12/2002 Stevenson et al.
6,496,927 B1 12/2002 Mcgrane et al.
6,499,131 B1 12/2002 Savithri et al.
6,504,479 B1 1/2003 Lemons et al.
6,507,589 B1 1/2003 Ramasubramani et al.
6,508,709 B1 1/2003 Karmarkar
6,515,968 B1 2/2003 Combar et al.
6,526,581 B1 2/2003 Edson
6,529,230 B1 * 3/2003 Chong .................. G08B 25/14 348/14.01
6,529,589 B1 3/2003 Nelson et al.
6,529,723 B1 3/2003 Bentley
6,535,110 B1 3/2003 Arora et al.
6,542,992 B1 4/2003 Peirce et al.
6,549,130 B1 4/2003 Joao
6,552,647 B1 4/2003 Thiessen et al.
6,553,336 B1 4/2003 Johnson et al.
6,559,769 B2 5/2003 Anthony et al.
6,563,800 B1 5/2003 Salo et al.
6,567,122 B1 5/2003 Anderson et al.
6,567,502 B2 5/2003 Zellner et al.
6,574,234 B1 6/2003 Myer et al.
6,580,424 B1 6/2003 Krumm
6,580,950 B1 6/2003 Johnson et al.
6,587,046 B2 7/2003 Joao
6,587,455 B1 7/2003 Ray et al.
6,587,736 B2 7/2003 Howard et al.
6,587,739 B1 7/2003 Abrams et al.
6,591,094 B1 7/2003 Bentley
6,593,856 B1 * 7/2003 Madau ............... G05B 19/0428 340/12.27
6,597,703 B1 7/2003 Li et al.
6,601,086 B1 7/2003 Howard et al.
6,603,488 B2 8/2003 Humpleman et al.
6,609,127 B1 8/2003 Lee et al.
6,611,206 B2 8/2003 Eshelman et al.
6,615,088 B1 9/2003 Myer et al.
6,621,827 B1 9/2003 Rezvani et al.
6,624,750 B1 9/2003 Marman et al.
6,636,893 B1 10/2003 Fong
6,643,355 B1 11/2003 Tsumpes
6,643,652 B2 11/2003 Helgeson et al.
6,643,669 B1 11/2003 Novak et al.
6,643,795 B1 11/2003 Sicola et al.
6,648,682 B1 11/2003 Wu
6,658,091 B1 12/2003 Naidoo et al.
6,661,340 B1 12/2003 Saylor et al.
6,662,340 B2 12/2003 Rawat et al.

(56) References Cited

U.S. PATENT DOCUMENTS 6,665,004 B1 12/2003 Paff
6,667,688 B1 12/2003 Menard et al.
6,674,767 B1 1/2004 Kadyk et al.
6,675,365 B2 1/2004 Elzinga
6,680,730 B1 1/2004 Shields et al.
6,686,838 B1 2/2004 Rezvani et al.
6,690,411 B2 2/2004 Naidoo et al.
6,690,719 B1 2/2004 Raphaeli et al.
6,693,530 B1 2/2004 Dowens et al.
6,693,545 B2 2/2004 Brown et al.
6,697,103 B1 2/2004 Fernandez et al.
6,704,786 B1 3/2004 Gupta et al.
6,720,990 B1 4/2004 Walker et al.
6,721,689 B2 4/2004 Markle et al.
6,721,740 B1 4/2004 Skinner et al.
6,721,747 B2 4/2004 Lipkin
6,721,802 B1 4/2004 Wright et al.
6,727,811 B1 4/2004 Fendis
6,728,233 B1 4/2004 Park et al.
6,728,688 B1 4/2004 Hirsch et al.
6,738,824 B1 5/2004 Blair
6,741,171 B2 5/2004 Palka et al.
6,741,977 B1 5/2004 Nagaya et al.
6,754,717 B1 6/2004 Day et al.
6,756,896 B2 6/2004 Ford
6,756,998 B1 * 6/2004 Bilger ................. H04L 12/2803
715/734
6,759,956 B2 7/2004 Menard et al.
6,762,686 B1 7/2004 Tabe
6,771,181 B1 8/2004 Hughen, Jr.
6,778,085 B2 8/2004 Faulkner et al.
6,779,019 B1 8/2004 Mousseau et al.
6,781,509 B1 8/2004 Oppedahl et al.
6,785,542 B1 8/2004 Blight et al.
6,789,147 B1 9/2004 Kessler et al.
6,795,322 B2 9/2004 Aihara et al.
6,795,863 B1 9/2004 Doty, Jr.
6,798,344 B2 9/2004 Faulkner et al.
6,804,638 B2 10/2004 Fiedler
6,810,409 B1 10/2004 Fry et al.
6,810,420 B1 10/2004 Buse et al.
6,823,223 B2 * 11/2004 Gonzales ............. G05B 19/042
315/297
6,826,173 B1 11/2004 Kung et al.
6,826,233 B1 11/2004 Oosawa
6,829,478 B1 12/2004 Layton et al.
6,834,208 B2 * 12/2004 Gonzales ............ H04L 12/2803
700/86
6,836,214 B2 12/2004 Choi
6,850,252 B1 2/2005 Hoffberg
6,856,236 B2 2/2005 Christensen et al.
6,857,026 B1 2/2005 Cain
6,865,690 B2 3/2005 Kocin
6,871,193 B1 3/2005 Campbell et al.
6,873,256 B2 3/2005 Lemelson et al.
6,885,362 B2 4/2005 Suomela
D504,889 S 5/2005 Andre et al.
6,891,838 B1 5/2005 Petite et al.
6,912,429 B1 * 6/2005 Bilger .................. H05B 47/115
700/19
6,914,533 B2 7/2005 Petite
6,918,112 B2 7/2005 Bourke-Dunphy et al.
6,920,502 B2 7/2005 Araujo et al.
6,920,615 B1 7/2005 Campbell et al.
6,922,701 B1 7/2005 Ananian et al.
6,928,148 B2 8/2005 Simon et al.
6,930,599 B2 8/2005 Naidoo et al.
6,930,730 B2 8/2005 Maxson et al.
6,931,445 B2 8/2005 Davis
6,941,258 B2 9/2005 Van et al.
6,943,681 B2 9/2005 Rezvani et al.
6,956,477 B2 10/2005 Chun
6,957,186 B1 10/2005 Guheen et al.
6,957,275 B1 10/2005 Sekiguchi
6,959,341 B1 10/2005 Leung
6,959,393 B2 10/2005 Hollis et al.
6,963,908 B1 11/2005 Lynch et al.
6,963,981 B1 11/2005 Bailey et al.
6,965,294 B1 11/2005 Elliott et al.
6,965,313 B1 11/2005 Saylor et al.
6,970,183 B1 11/2005 Monroe
6,971,063 B1 11/2005 Rappaport et al.
6,971,076 B2 11/2005 Chen
6,972,676 B1 12/2005 Kimmel et al.
6,975,220 B1 12/2005 Foodman et al.
6,977,485 B1 12/2005 Wei
6,983,432 B2 1/2006 Hayes
6,990,591 B1 1/2006 Pearson
6,993,658 B1 1/2006 Engberg et al.
6,999,562 B2 2/2006 Winick
6,999,992 B1 2/2006 Deen et al.
7,016,970 B2 3/2006 Harumoto et al.
7,019,639 B2 3/2006 Stilp
7,020,697 B1 3/2006 Goodman et al.
7,020,701 B1 3/2006 Gelvin et al.
7,023,913 B1 4/2006 Monroe
7,023,914 B2 4/2006 Furukawa et al.
7,023,975 B2 4/2006 Mansfield et al.
7,024,676 B1 4/2006 Klopfenstein
7,028,328 B2 4/2006 Kogane et al.
7,030,752 B2 4/2006 Tyroler
7,032,002 B1 4/2006 Rezvani et al.
7,035,907 B1 4/2006 Decasper et al.
7,039,391 B2 5/2006 Rezvani et al.
7,042,880 B1 5/2006 Voit et al.
7,043,537 B1 5/2006 Pratt
7,047,088 B2 5/2006 Nakamura et al.
7,047,092 B2 5/2006 Wimsatt
7,047,180 B1 5/2006 Mathews et al.
7,050,388 B2 5/2006 Kim et al.
7,053,764 B2 5/2006 Stilp
7,053,765 B1 5/2006 Clark
7,068,164 B1 6/2006 Duncan et al.
7,072,934 B2 7/2006 Helgeson et al.
7,073,140 B1 7/2006 Li et al.
7,075,429 B2 7/2006 Marshall
7,079,020 B2 7/2006 Stilp
7,080,046 B1 7/2006 Rezvani et al.
7,082,460 B2 7/2006 Hansen et al.
7,085,814 B1 8/2006 Gandhi et al.
7,085,937 B1 8/2006 Rezvani et al.
7,086,018 B2 8/2006 Ito
7,099,944 B1 8/2006 Anschutz et al.
7,099,994 B2 8/2006 Thayer et al.
7,103,152 B2 9/2006 Naidoo et al.
7,106,176 B2 9/2006 La et al.
7,107,322 B1 9/2006 Freeny, Jr.
7,110,774 B1 9/2006 Davis et al.
7,111,072 B1 9/2006 Matthews et al.
7,113,090 B1 9/2006 Saylor et al.
7,113,099 B2 9/2006 Tyroler et al.
7,114,554 B2 10/2006 Bergman et al.
7,119,609 B2 10/2006 Naidoo et al.
7,119,674 B2 10/2006 Sefton
7,120,139 B1 10/2006 Kung et al.
7,120,232 B2 10/2006 Naidoo et al.
7,120,233 B2 10/2006 Naidoo et al.
7,126,473 B1 10/2006 Powell
7,130,383 B2 10/2006 Naidoo et al.
7,130,585 B1 10/2006 Ollis et al.
7,134,138 B2 11/2006 Scherr
7,136,711 B1 11/2006 Duncan et al.
7,142,503 B1 11/2006 Grant et al.
7,145,898 B1 12/2006 Elliott
7,147,147 B1 12/2006 Enright et al.
7,148,810 B2 12/2006 Bhat
7,149,798 B2 12/2006 Rezvani et al.
7,149,814 B2 12/2006 Neufeld et al.
7,158,776 B1 1/2007 Estes et al.
7,158,920 B2 1/2007 Ishikawa
7,164,883 B2 1/2007 Rappaport et al.
7,164,907 B2 1/2007 Cochran et al.
7,166,987 B2 1/2007 Lee et al.
7,171,686 B1 1/2007 Jansen et al.

(56) References Cited

U.S. PATENT DOCUMENTS 7,174,018 B1 2/2007 Patil et al.
7,174,564 B1 2/2007 Weatherspoon et al.
7,180,889 B1 2/2007 Kung et al.
7,181,207 B1 2/2007 Chow et al.
7,181,716 B1 2/2007 Dahroug
7,183,907 B2 2/2007 Simon et al.
7,184,428 B1 2/2007 Gerszberg et al.
7,184,848 B2 2/2007 Krzyzanowski et al.
7,187,986 B2 3/2007 Johnson et al.
7,194,003 B2 3/2007 Danner et al.
7,194,446 B1 3/2007 Bromley et al.
7,203,486 B2 4/2007 Patel
7,209,945 B2 4/2007 Hicks et al.
7,212,570 B2 5/2007 Akiyama et al.
7,213,061 B1 5/2007 Hite et al.
7,218,217 B2 5/2007 Adonailo et al.
7,222,359 B2 5/2007 Freund et al.
7,229,012 B1 6/2007 Enright et al.
7,237,267 B2 6/2007 Rayes et al.
7,240,327 B2 7/2007 Singh et al.
7,246,044 B2 7/2007 Imamura et al.
7,248,150 B2 7/2007 Mackjust et al.
7,248,161 B2 7/2007 Spoltore et al.
7,249,177 B1 7/2007 Miller
7,249,317 B1 7/2007 Nakagawa et al.
7,250,854 B2 7/2007 Rezvani et al.
7,250,859 B2 7/2007 Martin et al.
7,254,779 B1 8/2007 Rezvani et al.
7,262,690 B2 8/2007 Heaton et al.
7,277,010 B2 10/2007 Joao
7,292,142 B2 11/2007 Simon et al.
7,293,083 B1 11/2007 Ranous et al.
7,298,253 B2 11/2007 Petricoin et al.
7,305,461 B2 12/2007 Ullman
7,310,115 B2 12/2007 Tanimoto
7,313,102 B2 12/2007 Stephenson et al.
7,313,231 B2 12/2007 Reid
D558,460 S 1/2008 Yu et al.
D558,756 S 1/2008 Andre et al.
7,337,217 B2 2/2008 Wang
7,337,473 B2 2/2008 Chang et al.
7,339,895 B2 3/2008 Ozaki et al.
7,340,314 B1 3/2008 Duncan et al.
7,343,619 B2 3/2008 Ofek et al.
7,345,580 B2 3/2008 Akamatsu et al.
7,346,338 B1 3/2008 Calhoun et al.
7,349,682 B1 * 3/2008 Bennett, III ........ H04L 12/2818 340/534
7,349,761 B1 3/2008 Cruse
7,349,967 B2 3/2008 Wang
7,356,372 B1 4/2008 Duncan et al.
7,359,843 B1 4/2008 Keller et al.
7,362,221 B2 4/2008 Katz
7,367,045 B2 4/2008 Ofek et al.
7,370,115 B2 5/2008 Bae et al.
7,383,339 B1 6/2008 Meenan et al.
7,383,522 B2 6/2008 Murgai et al.
7,391,298 B1 6/2008 Campbell et al.
7,403,838 B2 7/2008 Deen et al.
7,409,045 B2 8/2008 Naidoo et al.
7,409,451 B1 8/2008 Meenan et al.
7,412,447 B2 8/2008 Hilbert et al.
7,425,101 B2 9/2008 Cheng
7,428,585 B1 9/2008 Owens et al.
7,430,614 B2 9/2008 Shen et al.
7,437,753 B2 10/2008 Nahum
7,440,434 B2 10/2008 Chaskar et al.
7,440,767 B2 10/2008 Ballay et al.
7,447,775 B1 11/2008 Zhu et al.
7,454,731 B2 11/2008 Oh et al.
7,457,869 B2 11/2008 Kernan
7,466,223 B2 12/2008 Sefton
7,469,139 B2 12/2008 Van De Groenendaal
7,469,294 B1 12/2008 Luo et al.
7,469,381 B2 12/2008 Ording
7,469,391 B2 12/2008 Carrere et al.
D584,738 S 1/2009 Kim et al.
D585,399 S 1/2009 Hwang
7,477,629 B2 1/2009 Tsirtsis et al.
7,479,949 B2 1/2009 Jobs et al.
7,480,713 B2 1/2009 Ullman
7,480,724 B2 1/2009 Zimler et al.
7,483,958 B1 1/2009 Elabbady et al.
7,490,350 B1 2/2009 Murotake et al.
7,498,695 B2 3/2009 Gaudreau et al.
7,502,672 B1 3/2009 Kolls
7,506,052 B2 3/2009 Qian et al.
7,509,687 B2 3/2009 Ofek et al.
7,512,965 B1 3/2009 Amdur et al.
7,526,539 B1 4/2009 Hsu
7,526,762 B1 4/2009 Astala et al.
7,528,723 B2 5/2009 Fast et al.
7,542,721 B1 6/2009 Bonner et al.
7,549,134 B1 6/2009 Li et al.
7,551,071 B2 6/2009 Bennett et al.
7,554,934 B2 6/2009 Abraham et al.
7,558,379 B2 7/2009 Winick
7,558,862 B1 7/2009 Tyukasz et al.
7,558,903 B2 7/2009 Kinstler
7,562,323 B1 7/2009 Bai et al.
7,564,855 B1 7/2009 Georgiou
7,568,018 B1 7/2009 Hove et al.
7,571,459 B2 8/2009 Ganesh et al.
7,577,420 B2 8/2009 Srinivasan et al.
7,583,191 B2 9/2009 Zinser
7,584,263 B1 9/2009 Hicks et al.
7,587,464 B2 9/2009 Moorer et al.
7,590,953 B2 9/2009 Chang
7,595,816 B1 9/2009 Enright et al.
7,596,622 B2 9/2009 Owen et al.
D602,014 S 10/2009 Andre et al.
D602,015 S 10/2009 Andre et al.
D602,017 S 10/2009 Andre et al.
D602,486 S 10/2009 Andre et al.
D602,487 S 10/2009 Maskatia
7,606,767 B1 10/2009 Couper et al.
7,610,555 B2 10/2009 Klein et al.
7,610,559 B1 * 10/2009 Humpleman ........... H04L 67/16 715/762
7,619,512 B2 11/2009 Trundle et al.
7,620,427 B2 11/2009 Shanahan
7,627,665 B2 12/2009 Barker et al.
7,633,385 B2 12/2009 Cohn et al.
7,634,519 B2 12/2009 Creamer et al.
7,639,157 B1 12/2009 Whitley et al.
7,651,530 B2 1/2010 Winick
7,653,911 B2 1/2010 Doshi et al.
7,671,729 B2 3/2010 Hershkovitz et al.
7,679,503 B2 3/2010 Mason et al.
7,681,201 B2 3/2010 Dale et al.
7,684,418 B2 3/2010 Scott et al.
7,696,873 B2 4/2010 Sharma et al.
7,697,028 B1 4/2010 Johnson
7,701,970 B2 4/2010 Krits et al.
7,702,782 B1 4/2010 Pai
D615,083 S 5/2010 Andre et al.
7,720,654 B2 5/2010 Hollis
7,733,371 B1 6/2010 Monroe
7,734,020 B2 6/2010 Elliot et al.
7,734,286 B2 6/2010 Almeda et al.
7,734,906 B2 6/2010 Orlando et al.
7,739,596 B2 6/2010 Clarke-Martin et al.
7,739,658 B2 6/2010 Watson et al.
7,747,975 B2 6/2010 Dinter et al.
7,751,409 B1 7/2010 Carolan
7,755,506 B1 7/2010 Clegg et al.
7,756,928 B1 7/2010 Meenan et al.
7,761,275 B2 7/2010 Chopra et al.
7,787,863 B2 8/2010 Van De Groenendaal
7,804,760 B2 9/2010 Schmukler et al.
D624,896 S 10/2010 Park et al.
D626,437 S 11/2010 Lee et al.
7,825,793 B1 11/2010 Spillman et al.
7,827,252 B2 11/2010 Hopmann et al.

(56) References Cited

U.S. PATENT DOCUMENTS

| | | | |
|---|---|---|---|
| 7,844,699 | B1 | 11/2010 | Horrocks et al. |
| 7,847,675 | B1 | 12/2010 | Thyen et al. |
| 7,855,635 | B2 | 12/2010 | Cohn et al. |
| 7,859,404 | B2 | 12/2010 | Chul et al. |
| 7,882,466 | B2 | 2/2011 | Ishikawa |
| 7,882,537 | B2 | 2/2011 | Okajo et al. |
| 7,884,855 | B2 | 2/2011 | Ortiz |
| 7,890,612 | B2 | 2/2011 | Todd et al. |
| 7,890,915 | B2 | 2/2011 | Celik et al. |
| 7,899,732 | B2 | 3/2011 | Van et al. |
| 7,904,074 | B2 | 3/2011 | Karaoguz et al. |
| 7,904,187 | B2 | 3/2011 | Hoffberg et al. |
| D636,769 | S | 4/2011 | Wood et al. |
| 7,921,686 | B2 | 4/2011 | Bagepalli et al. |
| 7,928,840 | B2 | 4/2011 | Kim et al. |
| 7,930,365 | B2 | 4/2011 | Dixit et al. |
| D637,596 | S | 5/2011 | Akana et al. |
| 7,949,960 | B2 | 5/2011 | Roessler et al. |
| D639,805 | S | 6/2011 | Song et al. |
| D640,663 | S | 6/2011 | Holt et al. |
| 7,956,736 | B2 | 6/2011 | Cohn et al. |
| 7,957,326 | B1 | 6/2011 | Christie, IV |
| 7,970,863 | B1 | 6/2011 | Fontaine |
| D641,018 | S | 7/2011 | Lee et al. |
| 7,974,235 | B2 | 7/2011 | Ghozati et al. |
| D642,563 | S | 8/2011 | Akana et al. |
| 8,001,219 | B2 | 8/2011 | Moorer et al. |
| D645,015 | S | 9/2011 | Lee et al. |
| D645,435 | S | 9/2011 | Kim et al. |
| D645,833 | S | 9/2011 | Seflic et al. |
| 8,022,833 | B2 | 9/2011 | Cho |
| 8,028,041 | B2 | 9/2011 | Olliphant et al. |
| 8,032,881 | B2 | 10/2011 | Holmberg et al. |
| 8,042,049 | B2 | 10/2011 | Killian et al. |
| 8,046,411 | B2 | 10/2011 | Hayashi et al. |
| 8,069,194 | B1 | 11/2011 | Manber et al. |
| D650,381 | S | 12/2011 | Park et al. |
| D654,460 | S | 2/2012 | Kim et al. |
| D654,497 | S | 2/2012 | Lee |
| 8,125,184 | B2 | 2/2012 | Raji et al. |
| D656,137 | S | 3/2012 | Chung et al. |
| 8,140,658 | B1 | 3/2012 | Gelvin et al. |
| 8,144,836 | B2 | 3/2012 | Naidoo et al. |
| 8,159,519 | B2 | 4/2012 | Kurtz et al. |
| 8,159,945 | B2 | 4/2012 | Muro et al. |
| 8,160,425 | B2 | 4/2012 | Kisliakov |
| 8,196,064 | B2 | 6/2012 | Krzyzanowski et al. |
| 8,200,827 | B1 | 6/2012 | Hunyady et al. |
| 8,205,181 | B1 | 6/2012 | Singla et al. |
| 8,209,400 | B2 | 6/2012 | Baum et al. |
| D663,298 | S | 7/2012 | Song et al. |
| D664,540 | S | 7/2012 | Kim et al. |
| 8,214,494 | B1 | 7/2012 | Slavin |
| 8,219,254 | B2 | 7/2012 | O'Connor |
| 8,229,812 | B2 | 7/2012 | Raleigh |
| D664,954 | S | 8/2012 | Kim et al. |
| D666,198 | S | 8/2012 | Van et al. |
| 8,239,477 | B2 | 8/2012 | Sharma et al. |
| D667,395 | S | 9/2012 | Lee |
| D667,396 | S | 9/2012 | Koh |
| D667,397 | S | 9/2012 | Koh |
| D667,398 | S | 9/2012 | Koh |
| D667,399 | S | 9/2012 | Koh |
| 8,269,376 | B1 | 9/2012 | Elberbaum |
| 8,269,623 | B2 | 9/2012 | Addy |
| 8,271,629 | B1 | 9/2012 | Winters et al. |
| 8,272,053 | B2 | 9/2012 | Markham et al. |
| 8,275,830 | B2 | 9/2012 | Raleigh |
| D668,650 | S | 10/2012 | Han |
| D668,651 | S | 10/2012 | Kim et al. |
| D668,652 | S | 10/2012 | Kim et al. |
| D669,469 | S | 10/2012 | Kang |
| D670,692 | S | 11/2012 | Akana et al. |
| D671,514 | S | 11/2012 | Kim et al. |
| 8,311,526 | B2 | 11/2012 | Forstall et al. |
| D671,938 | S | 12/2012 | Hsu et al. |
| D672,344 | S | 12/2012 | Li |
| D672,345 | S | 12/2012 | Li |
| D672,739 | S | 12/2012 | Sin |
| D672,768 | S | 12/2012 | Huang et al. |
| 8,335,854 | B2 | 12/2012 | Eldering |
| 8,336,010 | B1 | 12/2012 | Chang et al. |
| D673,561 | S | 1/2013 | Hyun et al. |
| D673,948 | S | 1/2013 | Andre et al. |
| D673,950 | S | 1/2013 | Li et al. |
| D674,369 | S | 1/2013 | Jaewoong |
| D675,203 | S | 1/2013 | Yang |
| 8,350,694 | B1 | 1/2013 | Trundle et al. |
| D675,588 | S | 2/2013 | Park |
| D675,612 | S | 2/2013 | Andre et al. |
| D676,443 | S | 2/2013 | Canizares et al. |
| D676,819 | S | 2/2013 | Choi |
| 8,373,313 | B2 | 2/2013 | Garcia et al. |
| D677,255 | S | 3/2013 | Mcmanigal et al. |
| D677,640 | S | 3/2013 | Kim et al. |
| D677,659 | S | 3/2013 | Akana et al. |
| D677,660 | S | 3/2013 | Groene et al. |
| D678,271 | S | 3/2013 | Chiu |
| D678,272 | S | 3/2013 | Groene et al. |
| D678,877 | S | 3/2013 | Groene et al. |
| 8,396,766 | B1 | 3/2013 | Enright et al. |
| 8,400,767 | B2 | 3/2013 | Yeom et al. |
| D679,706 | S | 4/2013 | Tang et al. |
| D680,151 | S | 4/2013 | Katori |
| D680,524 | S | 4/2013 | Feng et al. |
| D681,032 | S | 4/2013 | Akana et al. |
| 8,413,204 | B2 | 4/2013 | White et al. |
| D681,583 | S | 5/2013 | Park |
| D681,591 | S | 5/2013 | Sung |
| D681,632 | S | 5/2013 | Akana et al. |
| D682,239 | S | 5/2013 | Yeh et al. |
| 8,451,986 | B2 | 5/2013 | Cohn et al. |
| D684,553 | S | 6/2013 | Kim et al. |
| D684,968 | S | 6/2013 | Smith et al. |
| 8,456,293 | B1 | 6/2013 | Trundle et al. |
| D685,778 | S | 7/2013 | Fahrendorff et al. |
| D685,783 | S | 7/2013 | Bryan et al. |
| 8,478,450 | B2 | 7/2013 | Lu et al. |
| 8,483,853 | B1 | 7/2013 | Lambourne |
| 8,493,202 | B1 | 7/2013 | Trundle et al. |
| 8,499,038 | B1 | 7/2013 | Vucurevich |
| 8,520,072 | B1 | 8/2013 | Slavin et al. |
| 8,525,664 | B2 | 9/2013 | Hadizad et al. |
| 8,543,665 | B2 | 9/2013 | Ansari et al. |
| D692,042 | S | 10/2013 | Dawes et al. |
| 8,554,478 | B2 | 10/2013 | Hartman |
| 8,560,041 | B2 | 10/2013 | Flaherty et al. |
| 8,570,993 | B2 | 10/2013 | Austin et al. |
| 8,584,199 | B1 | 11/2013 | Chen et al. |
| 8,595,377 | B1 | 11/2013 | Apgar et al. |
| D695,735 | S | 12/2013 | Kitchen et al. |
| 8,599,018 | B2 | 12/2013 | Kellen et al. |
| 8,634,533 | B2 | 1/2014 | Strasters |
| 8,635,499 | B2 | 1/2014 | Cohn et al. |
| 8,638,211 | B2 | 1/2014 | Cohn et al. |
| 8,649,386 | B2 | 2/2014 | Ansari et al. |
| 8,650,320 | B1 | 2/2014 | Merrick et al. |
| 8,666,560 | B2 | 3/2014 | Lu et al. |
| 8,675,071 | B1 | 3/2014 | Slavin et al. |
| 8,700,769 | B2 | 4/2014 | Alexander et al. |
| 8,704,821 | B2 | 4/2014 | Kulkarni et al. |
| 8,723,671 | B2 | 5/2014 | Foisy et al. |
| 8,730,834 | B2 | 5/2014 | Marusca et al. |
| 8,738,765 | B2 | 5/2014 | Wyatt et al. |
| 8,812,654 | B2 | 8/2014 | Gelvin et al. |
| 8,817,809 | B2 | 8/2014 | Gage |
| 8,832,244 | B2 | 9/2014 | Gelvin et al. |
| 8,836,467 | B1 | 9/2014 | Cohn et al. |
| 8,885,552 | B2 | 11/2014 | Bedingfield et al. |
| 8,902,740 | B2 | 12/2014 | Hicks, III |
| 8,914,526 | B1 | 12/2014 | Lindquist et al. |
| 8,914,837 | B2 | 12/2014 | Ahmed et al. |
| 8,935,236 | B2 | 1/2015 | Morita et al. |
| 8,937,539 | B2 | 1/2015 | Sharma et al. |

(56) References Cited

U.S. PATENT DOCUMENTS 8,937,658 B2 1/2015 Hicks et al.
8,953,479 B2 2/2015 Hall et al.
8,953,749 B2 2/2015 Naidoo et al.
8,963,713 B2 2/2015 Dawes et al.
8,976,763 B2 3/2015 Shrestha et al.
8,983,534 B2 3/2015 Patel
8,988,217 B2 3/2015 Piccolo, III
8,988,221 B2 3/2015 Raji et al.
8,989,922 B2 3/2015 Jones et al.
9,047,753 B2 6/2015 Dawes et al.
9,059,863 B2 6/2015 Baum et al.
9,064,394 B1 6/2015 Trundle
9,094,407 B1 7/2015 Matthieu et al.
9,141,276 B2 9/2015 Dawes et al.
9,144,143 B2 9/2015 Raji et al.
9,146,548 B2 9/2015 Chambers et al.
9,147,337 B2 9/2015 Cohn et al.
9,160,784 B2 10/2015 Jeong et al.
9,170,707 B1 10/2015 Laska et al.
9,172,532 B1 10/2015 Fuller et al.
9,172,605 B2 10/2015 Hardy et al.
9,189,934 B2 11/2015 Jentoft et al.
9,191,228 B2 11/2015 Fulker et al.
9,202,362 B2 12/2015 Hyland et al.
9,246,921 B1 1/2016 Vlaminck et al.
9,286,772 B2 3/2016 Shapiro et al.
9,287,727 B1 3/2016 Egan et al.
9,300,921 B2 3/2016 Naidoo et al.
9,310,864 B1 4/2016 Klein et al.
9,373,014 B1 6/2016 Mehranfar
9,412,248 B1 8/2016 Cohn et al.
9,426,720 B2 8/2016 Cohn et al.
9,462,041 B1 10/2016 Hagins et al.
9,510,065 B2 11/2016 Cohn et al.
9,529,344 B1 12/2016 Hagins et al.
9,531,593 B2 * 12/2016 Baum ................. H04L 41/0668
9,600,945 B2 3/2017 Naidoo et al.
9,609,003 B1 3/2017 Chmielewski et al.
9,613,524 B1 4/2017 Lamb et al.
9,621,408 B2 4/2017 Gutt et al.
9,721,461 B2 8/2017 Zeng et al.
9,729,342 B2 8/2017 Cohn et al.
9,779,595 B2 10/2017 Thibault
9,805,587 B2 10/2017 Lamb
9,824,234 B2 11/2017 Cho et al.
9,843,458 B2 12/2017 Cronin
9,876,651 B2 1/2018 Cho et al.
9,882,985 B1 1/2018 Esam et al.
9,978,238 B2 5/2018 Fadell et al.
9,979,625 B2 5/2018 Mclaughlin et al.
10,002,507 B2 6/2018 Wilson et al.
10,025,473 B2 7/2018 Sarao et al.
10,079,839 B1 9/2018 Bryan et al.
10,120,354 B1 11/2018 Rolston et al.
10,237,757 B2 3/2019 Raleigh et al.
10,257,474 B2 4/2019 Nadathur et al.
10,264,138 B2 4/2019 Raleigh et al.
10,354,517 B1 7/2019 King
10,375,253 B2 * 8/2019 Dawes ................... H04M 11/04
10,380,873 B1 8/2019 Halverson
10,430,887 B1 10/2019 Parker et al.
10,687,270 B2 6/2020 Ishii
10,692,356 B2 6/2020 Sundermeyer et al.
10,782,681 B1 9/2020 Slavin
10,868,712 B1 12/2020 Hutz
2001/0016501 A1 8/2001 King
2001/0022836 A1 9/2001 Bremer et al.
2001/0025349 A1 9/2001 Sharood et al.
2001/0029585 A1 10/2001 Simon et al.
2001/0030597 A1 10/2001 Inoue et al.
2001/0034209 A1 10/2001 Tong et al.
2001/0034754 A1 10/2001 Elwahab et al.
2001/0034759 A1 10/2001 Chiles et al.
2001/0036192 A1 11/2001 Chiles et al.
2001/0042137 A1 11/2001 Ota et al.
2001/0044835 A1 11/2001 Schober et al.
2001/0046366 A1 11/2001 Susskind
2001/0047474 A1 11/2001 Takagi et al.
2001/0048030 A1 12/2001 Sharood et al.
2001/0053207 A1 12/2001 Jeon et al.
2001/0054115 A1 12/2001 Ferguson et al.
2002/0000913 A1 1/2002 Hamamoto et al.
2002/0003575 A1 1/2002 Marchese
2002/0004828 A1 1/2002 Davis et al.
2002/0005894 A1 1/2002 Foodman et al.
2002/0016639 A1 * 2/2002 Smith .................... G05B 15/02
700/9
2002/0018057 A1 2/2002 Sano
2002/0018478 A1 2/2002 Takeyama et al.
2002/0019751 A1 2/2002 Rothschild et al.
2002/0026476 A1 2/2002 Miyazaki et al.
2002/0026531 A1 2/2002 Keane et al.
2002/0027504 A1 3/2002 Davis et al.
2002/0028696 A1 3/2002 Hirayama et al.
2002/0029276 A1 3/2002 Bendinelli et al.
2002/0031120 A1 3/2002 Rakib
2002/0032853 A1 3/2002 Preston et al.
2002/0035633 A1 3/2002 Bose et al.
2002/0037004 A1 3/2002 Bossemeyer et al.
2002/0038380 A1 3/2002 Brawn et al.
2002/0046280 A1 4/2002 Fujita
2002/0046301 A1 4/2002 Shannon et al.
2002/0052719 A1 5/2002 Alexander et al.
2002/0052913 A1 5/2002 Yamada et al.
2002/0055977 A1 5/2002 Nishi
2002/0059078 A1 5/2002 Valdes et al.
2002/0059148 A1 5/2002 Rosenhaft et al.
2002/0059637 A1 5/2002 Rakib
2002/0068558 A1 6/2002 Janik
2002/0068984 A1 6/2002 Alexander et al.
2002/0072868 A1 6/2002 Bartone et al.
2002/0075153 A1 6/2002 Dahl
2002/0083342 A1 6/2002 Webb et al.
2002/0085488 A1 7/2002 Kobayashi
2002/0091815 A1 7/2002 Anderson et al.
2002/0095490 A1 7/2002 Barker et al.
2002/0099809 A1 7/2002 Lee
2002/0099829 A1 7/2002 Richards et al.
2002/0099854 A1 7/2002 Jorgensen
2002/0103898 A1 8/2002 Moyer et al.
2002/0103927 A1 8/2002 Parent
2002/0107910 A1 8/2002 Zhao
2002/0109580 A1 8/2002 Shreve et al.
2002/0111698 A1 8/2002 Graziano et al.
2002/0114439 A1 8/2002 Dunlap
2002/0116117 A1 8/2002 Martens et al.
2002/0118107 A1 8/2002 Yamamoto et al.
2002/0118796 A1 8/2002 Menard et al.
2002/0120696 A1 8/2002 Mousseau et al.
2002/0120698 A1 8/2002 Tamargo
2002/0120790 A1 8/2002 Schwalb
2002/0126009 A1 9/2002 Oyagi et al.
2002/0128728 A1 9/2002 Murakami et al.
2002/0131404 A1 9/2002 Mehta et al.
2002/0133539 A1 9/2002 Monday
2002/0133578 A1 9/2002 Wu
2002/0143805 A1 * 10/2002 Hayes ............... H04L 29/12594
345/169
2002/0143923 A1 10/2002 Alexander
2002/0147982 A1 10/2002 Naidoo et al.
2002/0150086 A1 10/2002 Bailey et al.
2002/0152298 A1 10/2002 Kikta et al.
2002/0152432 A1 10/2002 Fleming
2002/0156564 A1 10/2002 Preston et al.
2002/0156899 A1 10/2002 Sekiguchi
2002/0161885 A1 10/2002 Childers et al.
2002/0163534 A1 11/2002 Choi et al.
2002/0163997 A1 11/2002 Bergman et al.
2002/0164997 A1 11/2002 Parry
2002/0165006 A1 11/2002 Haller et al.
2002/0166125 A1 11/2002 Fulmer
2002/0174367 A1 11/2002 Kimmel et al.
2002/0174434 A1 11/2002 Lee et al.
2002/0177428 A1 11/2002 Menard et al.

(56) References Cited

U.S. PATENT DOCUMENTS

| | | | |
|---|---|---|---|
| 2002/0177482 A1 | 11/2002 | Cheong et al. | |
| 2002/0178100 A1 | 11/2002 | Koveos | |
| 2002/0178211 A1 | 11/2002 | Singhal et al. | |
| 2002/0180579 A1 | 12/2002 | Nagaoka et al. | |
| 2002/0184301 A1 | 12/2002 | Parent | |
| 2002/0184527 A1 | 12/2002 | Chun et al. | |
| 2002/0186683 A1 | 12/2002 | Buck et al. | |
| 2002/0188723 A1 | 12/2002 | Choi et al. | |
| 2002/0191636 A1* | 12/2002 | Hallenbeck | G04G 13/021 370/465 |
| 2003/0004088 A1 | 1/2003 | Ushio et al. | |
| 2003/0005030 A1 | 1/2003 | Sutton et al. | |
| 2003/0006879 A1 | 1/2003 | Kang et al. | |
| 2003/0009552 A1 | 1/2003 | Benfield et al. | |
| 2003/0009553 A1 | 1/2003 | Benfield et al. | |
| 2003/0010243 A1 | 1/2003 | Roller | |
| 2003/0023839 A1 | 1/2003 | Burkhardt et al. | |
| 2003/0025599 A1 | 2/2003 | Monroe | |
| 2003/0028294 A1 | 2/2003 | Yanagi | |
| 2003/0028398 A1 | 2/2003 | Yamashita et al. | |
| 2003/0030548 A1 | 2/2003 | Kovacs et al. | |
| 2003/0031165 A1 | 2/2003 | O'Brien, Jr. | |
| 2003/0038730 A1 | 2/2003 | Imafuku et al. | |
| 2003/0038849 A1 | 2/2003 | Craven et al. | |
| 2003/0039242 A1 | 2/2003 | Moore | |
| 2003/0041137 A1 | 2/2003 | Horie et al. | |
| 2003/0041167 A1 | 2/2003 | French et al. | |
| 2003/0050731 A1 | 3/2003 | Rosenblum | |
| 2003/0050737 A1* | 3/2003 | Osann, Jr. | H04L 67/125 700/276 |
| 2003/0051009 A1 | 3/2003 | Shah et al. | |
| 2003/0051026 A1 | 3/2003 | Carter et al. | |
| 2003/0052905 A1 | 3/2003 | Gordon et al. | |
| 2003/0052923 A1 | 3/2003 | Porter | |
| 2003/0056012 A1 | 3/2003 | Modeste et al. | |
| 2003/0056014 A1 | 3/2003 | Verberkt et al. | |
| 2003/0060900 A1 | 3/2003 | Lo et al. | |
| 2003/0061344 A1 | 3/2003 | Monroe | |
| 2003/0061615 A1* | 3/2003 | Van Der Meulen | H04L 67/12 725/74 |
| 2003/0061621 A1 | 3/2003 | Petty et al. | |
| 2003/0062997 A1* | 4/2003 | Naidoo | G08B 13/19691 340/531 |
| 2003/0065757 A1 | 4/2003 | Mentze et al. | |
| 2003/0065784 A1 | 4/2003 | Herrod | |
| 2003/0065791 A1 | 4/2003 | Garg et al. | |
| 2003/0067923 A1 | 4/2003 | Ju et al. | |
| 2003/0071724 A1 | 4/2003 | D Amico | |
| 2003/0071840 A1 | 4/2003 | Huang et al. | |
| 2003/0073406 A1 | 4/2003 | Benjamin et al. | |
| 2003/0074088 A1* | 4/2003 | Gonzales | G05B 19/042 700/19 |
| 2003/0074090 A1* | 4/2003 | Becka | G06Q 10/06 700/83 |
| 2003/0081768 A1 | 5/2003 | Caminschi | |
| 2003/0090473 A1 | 5/2003 | Joshi | |
| 2003/0096590 A1 | 5/2003 | Satoh | |
| 2003/0101243 A1 | 5/2003 | Donahue et al. | |
| 2003/0101459 A1 | 5/2003 | Edson | |
| 2003/0103088 A1 | 6/2003 | Dresti et al. | |
| 2003/0110262 A1 | 6/2003 | Hasan et al. | |
| 2003/0110302 A1 | 6/2003 | Hodges et al. | |
| 2003/0112866 A1 | 6/2003 | Yu et al. | |
| 2003/0113100 A1 | 6/2003 | Hecht et al. | |
| 2003/0115345 A1 | 6/2003 | Chien et al. | |
| 2003/0123419 A1 | 7/2003 | Rangnekar et al. | |
| 2003/0123634 A1 | 7/2003 | Chee | |
| 2003/0128114 A1 | 7/2003 | Quigley | |
| 2003/0128115 A1 | 7/2003 | Giacopelli et al. | |
| 2003/0132018 A1 | 7/2003 | Okita et al. | |
| 2003/0134590 A1 | 7/2003 | Suda et al. | |
| 2003/0137426 A1 | 7/2003 | Anthony et al. | |
| 2003/0137991 A1 | 7/2003 | Doshi et al. | |
| 2003/0147534 A1 | 8/2003 | Ablay et al. | |
| 2003/0149671 A1 | 8/2003 | Yamamoto et al. | |
| 2003/0153325 A1 | 8/2003 | Veerepalli et al. | |
| 2003/0155757 A1 | 8/2003 | Larsen et al. | |
| 2003/0158609 A1 | 8/2003 | Chiu | |
| 2003/0158635 A1 | 8/2003 | Pillar et al. | |
| 2003/0159135 A1 | 8/2003 | Hiller et al. | |
| 2003/0169728 A1 | 9/2003 | Choi | |
| 2003/0172145 A1 | 9/2003 | Nguyen | |
| 2003/0174154 A1 | 9/2003 | Yukie et al. | |
| 2003/0174648 A1 | 9/2003 | Wang et al. | |
| 2003/0174717 A1 | 9/2003 | Zabarski et al. | |
| 2003/0177236 A1 | 9/2003 | Goto et al. | |
| 2003/0182396 A1 | 9/2003 | Reich et al. | |
| 2003/0182640 A1 | 9/2003 | Alani et al. | |
| 2003/0184436 A1 | 10/2003 | Seales et al. | |
| 2003/0187920 A1 | 10/2003 | Redkar | |
| 2003/0187938 A1 | 10/2003 | Mousseau et al. | |
| 2003/0189509 A1 | 10/2003 | Hayes et al. | |
| 2003/0193991 A1 | 10/2003 | Lansford | |
| 2003/0196115 A1 | 10/2003 | Karp | |
| 2003/0197847 A1 | 10/2003 | Shinoda | |
| 2003/0200325 A1 | 10/2003 | Krishnaswamy et al. | |
| 2003/0201889 A1 | 10/2003 | Zulkowski | |
| 2003/0208610 A1 | 11/2003 | Rochetti et al. | |
| 2003/0210126 A1 | 11/2003 | Kanazawa | |
| 2003/0214775 A1 | 11/2003 | Fukuta et al. | |
| 2003/0216143 A1 | 11/2003 | Roese et al. | |
| 2003/0217110 A1 | 11/2003 | Weiss | |
| 2003/0217136 A1 | 11/2003 | Cho et al. | |
| 2003/0225883 A1 | 12/2003 | Greaves et al. | |
| 2003/0227382 A1 | 12/2003 | Breed | |
| 2003/0227439 A1* | 12/2003 | Lee | G06K 9/00221 345/156 |
| 2003/0229779 A1 | 12/2003 | Morais et al. | |
| 2003/0230934 A1 | 12/2003 | Cordelli et al. | |
| 2003/0233155 A1 | 12/2003 | Slemmer et al. | |
| 2003/0233332 A1 | 12/2003 | Keeler et al. | |
| 2003/0233549 A1 | 12/2003 | Hatakeyama et al. | |
| 2003/0233583 A1 | 12/2003 | Carley | |
| 2003/0233594 A1 | 12/2003 | Earl | |
| 2003/0236841 A1 | 12/2003 | Epshteyn | |
| 2004/0003051 A1 | 1/2004 | Krzyzanowski et al. | |
| 2004/0003241 A1 | 1/2004 | Sengodan et al. | |
| 2004/0008724 A1 | 1/2004 | Devine et al. | |
| 2004/0015572 A1 | 1/2004 | Kang | |
| 2004/0034697 A1 | 2/2004 | Fairhurst et al. | |
| 2004/0034798 A1 | 2/2004 | Yamada et al. | |
| 2004/0036615 A1 | 2/2004 | Candela | |
| 2004/0037295 A1 | 2/2004 | Tanaka et al. | |
| 2004/0039459 A1 | 2/2004 | Daugherty et al. | |
| 2004/0054789 A1 | 3/2004 | Breh et al. | |
| 2004/0056665 A1 | 3/2004 | Iwanaga et al. | |
| 2004/0064351 A1 | 4/2004 | Mikurak | |
| 2004/0068657 A1 | 4/2004 | Alexander et al. | |
| 2004/0068668 A1 | 4/2004 | Lor et al. | |
| 2004/0075738 A1 | 4/2004 | Burke et al. | |
| 2004/0083015 A1 | 4/2004 | Patwari | |
| 2004/0086093 A1 | 5/2004 | Schranz | |
| 2004/0093492 A1 | 5/2004 | Daude et al. | |
| 2004/0095943 A1 | 5/2004 | Korotin | |
| 2004/0102859 A1* | 5/2004 | Bennett | H04L 12/2829 700/86 |
| 2004/0103308 A1 | 5/2004 | Paller | |
| 2004/0107027 A1 | 6/2004 | Boudrieau | |
| 2004/0107299 A1 | 6/2004 | Lee et al. | |
| 2004/0113770 A1 | 6/2004 | Falk et al. | |
| 2004/0113778 A1 | 6/2004 | Script et al. | |
| 2004/0113937 A1 | 6/2004 | Sawdey et al. | |
| 2004/0117068 A1 | 6/2004 | Lee | |
| 2004/0117330 A1 | 6/2004 | Ehlers et al. | |
| 2004/0117462 A1 | 6/2004 | Bodin et al. | |
| 2004/0117465 A1 | 6/2004 | Bodin et al. | |
| 2004/0125146 A1 | 7/2004 | Gerlach et al. | |
| 2004/0125782 A1 | 7/2004 | Chang | |
| 2004/0133689 A1 | 7/2004 | Vasisht | |
| 2004/0136386 A1 | 7/2004 | Miller et al. | |
| 2004/0137915 A1 | 7/2004 | Diener et al. | |
| 2004/0139227 A1 | 7/2004 | Takeda | |
| 2004/0143749 A1 | 7/2004 | Tajalli et al. | |

(56) References Cited

U.S. PATENT DOCUMENTS

2004/0153171 A1 8/2004 Brandt et al.
2004/0155757 A1 8/2004 Litwin et al.
2004/0160309 A1 8/2004 Stilp
2004/0163073 A1 8/2004 Krzyzanowski et al.
2004/0163118 A1 8/2004 Mottur
2004/0163705 A1 8/2004 Uhler
2004/0169288 A1 9/2004 Hsieh et al.
2004/0170120 A1 9/2004 Reunamaki et al.
2004/0170155 A1 9/2004 Omar et al.
2004/0172396 A1 9/2004 Vanska et al.
2004/0172657 A1 9/2004 Phillips et al.
2004/0177163 A1 9/2004 Casey et al.
2004/0181693 A1 9/2004 Milliot et al.
2004/0183756 A1 9/2004 Freitas et al.
2004/0189471 A1 9/2004 Ciarcia et al.
2004/0189871 A1 9/2004 Kurosawa et al.
2004/0196844 A1 10/2004 Hagino
2004/0198386 A1 10/2004 Dupray
2004/0199645 A1 10/2004 Rouhi
2004/0201472 A1 10/2004 McGunn et al.
2004/0202351 A1 10/2004 Park et al.
2004/0212494 A1 10/2004 Stilp
2004/0212503 A1 10/2004 Stilp
2004/0212687 A1 10/2004 Patwari
2004/0213150 A1 10/2004 Krause et al.
2004/0215694 A1* 10/2004 Podolsky ................ H04L 67/02 709/201
2004/0215700 A1 10/2004 Shenfield et al.
2004/0215750 A1 10/2004 Stilp
2004/0215955 A1 10/2004 Tamai et al.
2004/0218591 A1* 11/2004 Ogawa .................... H04L 69/40 370/364
2004/0220830 A1 11/2004 Moreton et al.
2004/0223605 A1 11/2004 Donnelly
2004/0225516 A1 11/2004 Bruskotter et al.
2004/0225719 A1 11/2004 Kisley et al.
2004/0229569 A1 11/2004 Franz
2004/0243714 A1 12/2004 Wynn et al.
2004/0243835 A1 12/2004 Terzis et al.
2004/0243996 A1 12/2004 Sheehy et al.
2004/0246339 A1 12/2004 Ooshima et al.
2004/0249613 A1 12/2004 Sprogis et al.
2004/0249922 A1* 12/2004 Hackman ............ H04L 12/2803 709/223
2004/0253926 A1 12/2004 Gross
2004/0257433 A1 12/2004 Lia et al.
2004/0258032 A1 12/2004 Kawamura
2004/0260407 A1* 12/2004 Wimsatt ................ H04L 12/282 700/19
2004/0260427 A1* 12/2004 Wimsatt ................. G05B 15/02 700/275
2004/0260527 A1 12/2004 Stanculescu
2004/0263314 A1 12/2004 Dorai et al.
2004/0266493 A1 12/2004 Bahl et al.
2004/0267385 A1 12/2004 Lingemann
2004/0267937 A1 12/2004 Klemets
2004/0268298 A1 12/2004 Miller et al.
2005/0002335 A1 1/2005 Adamczyk et al.
2005/0002417 A1 1/2005 Kelly et al.
2005/0007967 A1 1/2005 Keskar et al.
2005/0010866 A1 1/2005 Humpleman et al.
2005/0015805 A1 1/2005 Iwamura
2005/0021309 A1 1/2005 Alexander et al.
2005/0021626 A1 1/2005 Prajapat et al.
2005/0022210 A1 1/2005 Zintel et al.
2005/0023858 A1 2/2005 Bingle et al.
2005/0024203 A1 2/2005 Wolfe
2005/0030928 A1 2/2005 Virtanen et al.
2005/0033513 A1 2/2005 Gasbarro
2005/0038325 A1 2/2005 Moll
2005/0038326 A1 2/2005 Mathur
2005/0044061 A1 2/2005 Klemow
2005/0048957 A1 3/2005 Casey et al.
2005/0049746 A1 3/2005 Rosenblum
2005/0050214 A1 3/2005 Nishiyama et al.
2005/0052831 A1 3/2005 Chen
2005/0055575 A1 3/2005 Evans et al.
2005/0055716 A1 3/2005 Louie et al.
2005/0057361 A1 3/2005 Giraldo et al.
2005/0060163 A1 3/2005 Barsness et al.
2005/0060411 A1 3/2005 Coulombe et al.
2005/0066045 A1 3/2005 Johnson et al.
2005/0066912 A1 3/2005 Korbitz et al.
2005/0069098 A1 3/2005 Kalervo et al.
2005/0071483 A1 3/2005 Motoyama
2005/0075764 A1 4/2005 Horst et al.
2005/0079855 A1 4/2005 Jethi et al.
2005/0081161 A1 4/2005 MacInnes et al.
2005/0086093 A1 4/2005 Hammad et al.
2005/0086126 A1 4/2005 Patterson
2005/0086211 A1 4/2005 Mayer
2005/0086366 A1 4/2005 Luebke et al.
2005/0088983 A1 4/2005 Wesslen et al.
2005/0089023 A1 4/2005 Barkley et al.
2005/0090915 A1 4/2005 Geiwitz
2005/0091435 A1 4/2005 Han et al.
2005/0091696 A1 4/2005 Wolfe et al.
2005/0096753 A1* 5/2005 Arling ................... H04L 12/282 700/11
2005/0101314 A1 5/2005 Levi
2005/0102152 A1 5/2005 Hodges
2005/0102497 A1 5/2005 Buer
2005/0105530 A1 5/2005 Kono
2005/0108091 A1* 5/2005 Sotak ............... H04N 21/44008 705/14.61
2005/0108369 A1 5/2005 Sather et al.
2005/0114432 A1 5/2005 Hodges et al.
2005/0114528 A1 5/2005 Suito
2005/0114900 A1 5/2005 Ladd et al.
2005/0117602 A1 6/2005 Carrigan et al.
2005/0117732 A1 6/2005 Arpin
2005/0119913 A1 6/2005 Hornreich et al.
2005/0120082 A1 6/2005 Hesselink et al.
2005/0125083 A1* 6/2005 Kiko ..................... H04L 12/282 700/19
2005/0128068 A1 6/2005 Winick et al.
2005/0128083 A1 6/2005 Puzio et al.
2005/0128093 A1 6/2005 Genova et al.
2005/0128314 A1 6/2005 Ishino
2005/0144312 A1 6/2005 Kadyk et al.
2005/0144645 A1 6/2005 Casey et al.
2005/0148356 A1 7/2005 Ferguson et al.
2005/0149639 A1 7/2005 Vrielink et al.
2005/0149746 A1 7/2005 Lu et al.
2005/0154494 A1 7/2005 Ahmed
2005/0154774 A1 7/2005 Giaffreda et al.
2005/0155757 A1 7/2005 Paton
2005/0156568 A1 7/2005 Yueh
2005/0156737 A1 7/2005 Al-Khateeb
2005/0159823 A1 7/2005 Hayes et al.
2005/0159911 A1 7/2005 Funk et al.
2005/0169288 A1 8/2005 Kamiwada et al.
2005/0174229 A1 8/2005 Feldkamp et al.
2005/0177515 A1 8/2005 Kalavade et al.
2005/0179531 A1 8/2005 Tabe
2005/0182681 A1 8/2005 Bruskotter et al.
2005/0184865 A1 8/2005 Han
2005/0185618 A1 8/2005 Friday et al.
2005/0188315 A1 8/2005 Campbell et al.
2005/0197847 A1 9/2005 Smith
2005/0200474 A1* 9/2005 Behnke .................. G08B 25/14 340/521
2005/0204076 A1 9/2005 Cumpson et al.
2005/0207429 A1 9/2005 Akita et al.
2005/0216302 A1 9/2005 Raji et al.
2005/0216580 A1 9/2005 Raji et al.
2005/0220123 A1 10/2005 Wybenga et al.
2005/0222820 A1 10/2005 Chung
2005/0222933 A1 10/2005 Wesby
2005/0229016 A1 10/2005 Addy
2005/0232242 A1 10/2005 Karaoguz et al.
2005/0232284 A1 10/2005 Karaoguz et al.
2005/0234568 A1 10/2005 Chung et al.

(56) References Cited

U.S. PATENT DOCUMENTS

| | | | |
|---|---|---|---|
| 2005/0237182 | A1 | 10/2005 | Wang |
| 2005/0246119 | A1 | 11/2005 | Koodali |
| 2005/0249199 | A1 | 11/2005 | Albert et al. |
| 2005/0253709 | A1 | 11/2005 | Baker |
| 2005/0256608 | A1 | 11/2005 | King et al. |
| 2005/0257013 | A1 | 11/2005 | Ma |
| 2005/0257260 | A1 | 11/2005 | Lenoir et al. |
| 2005/0259673 | A1 | 11/2005 | Lu et al. |
| 2005/0262241 | A1 | 11/2005 | Gubbi et al. |
| 2005/0267605 | A1 | 12/2005 | Lee et al. |
| 2005/0270151 | A1 | 12/2005 | Winick |
| 2005/0273831 | A1 | 12/2005 | Slomovich et al. |
| 2005/0276389 | A1 | 12/2005 | Hinkson et al. |
| 2005/0277434 | A1 | 12/2005 | Tuomi et al. |
| 2005/0280964 | A1 | 12/2005 | Richmond et al. |
| 2005/0281196 | A1 | 12/2005 | Tornetta et al. |
| 2005/0282557 | A1 | 12/2005 | Mikko et al. |
| 2005/0285934 | A1 | 12/2005 | Carter |
| 2005/0285941 | A1 | 12/2005 | Haigh et al. |
| 2005/0286518 | A1 | 12/2005 | Park et al. |
| 2006/0007005 | A1 | 1/2006 | Yui et al. |
| 2006/0009863 | A1 | 1/2006 | Lingemann |
| 2006/0015943 | A1 | 1/2006 | Mahieu |
| 2006/0018328 | A1 | 1/2006 | Mody et al. |
| 2006/0018479 | A1 | 1/2006 | Chen |
| 2006/0022816 | A1 | 2/2006 | Yukawa |
| 2006/0023847 | A1 | 2/2006 | Tyroler et al. |
| 2006/0026301 | A1 | 2/2006 | Maeda et al. |
| 2006/0031436 | A1 | 2/2006 | Sakata et al. |
| 2006/0031852 | A1 | 2/2006 | Chu et al. |
| 2006/0036750 | A1 | 2/2006 | Ladd et al. |
| 2006/0041655 | A1 | 2/2006 | Holloway et al. |
| 2006/0045074 | A1 | 3/2006 | Lee |
| 2006/0050692 | A1 | 3/2006 | Petrescu et al. |
| 2006/0050862 | A1 | 3/2006 | Shen et al. |
| 2006/0051122 | A1 | 3/2006 | Kawazu et al. |
| 2006/0052884 | A1 | 3/2006 | Staples et al. |
| 2006/0053447 | A1 | 3/2006 | Krzyzanowski et al. |
| 2006/0053459 | A1 | 3/2006 | Simerly et al. |
| 2006/0053491 | A1 | 3/2006 | Khuti et al. |
| 2006/0058923 | A1 | 3/2006 | Kruk et al. |
| 2006/0063534 | A1 | 3/2006 | Kokkonen et al. |
| 2006/0064305 | A1 | 3/2006 | Alonso |
| 2006/0064478 | A1 | 3/2006 | Sirkin |
| 2006/0067344 | A1 | 3/2006 | Sakurai |
| 2006/0067356 | A1 | 3/2006 | Kim et al. |
| 2006/0067484 | A1 | 3/2006 | Elliot et al. |
| 2006/0072470 | A1 | 4/2006 | Moore et al. |
| 2006/0075235 | A1 | 4/2006 | Renkis |
| 2006/0077254 | A1 | 4/2006 | Shu et al. |
| 2006/0078344 | A1 | 4/2006 | Kawazu et al. |
| 2006/0080465 | A1 | 4/2006 | Conzola et al. |
| 2006/0088092 | A1 | 4/2006 | Chen et al. |
| 2006/0093365 | A1 | 5/2006 | Dybsetter et al. |
| 2006/0094400 | A1 | 5/2006 | Beachem et al. |
| 2006/0101062 | A1 | 5/2006 | Godman et al. |
| 2006/0103510 | A1 | 5/2006 | Chen et al. |
| 2006/0104312 | A1 | 5/2006 | Friar |
| 2006/0105713 | A1 | 5/2006 | Zheng et al. |
| 2006/0106933 | A1 | 5/2006 | Huang et al. |
| 2006/0109113 | A1 | 5/2006 | Reyes et al. |
| 2006/0109860 | A1 | 5/2006 | Matsunaga et al. |
| 2006/0109966 | A1 | 5/2006 | Sasakura et al. |
| 2006/0111095 | A1 | 5/2006 | Weigand |
| 2006/0114842 | A1 | 6/2006 | Miyamoto et al. |
| 2006/0121924 | A1 | 6/2006 | Rengaraj et al. |
| 2006/0123212 | A1 | 6/2006 | Yagawa |
| 2006/0129837 | A1 | 6/2006 | Im et al. |
| 2006/0130004 | A1 | 6/2006 | Hughes et al. |
| 2006/0132302 | A1 | 6/2006 | Stilp |
| 2006/0133412 | A1 | 6/2006 | Callaghan |
| 2006/0136558 | A1 | 6/2006 | Sheehan et al. |
| 2006/0142968 | A1 | 6/2006 | Han et al. |
| 2006/0142978 | A1 | 6/2006 | Suenbuel et al. |
| 2006/0143268 | A1 | 6/2006 | Chatani |
| 2006/0145842 | A1 | 7/2006 | Stilp |
| 2006/0154642 | A1 | 7/2006 | Scannell |
| 2006/0155851 | A1 | 7/2006 | Ma et al. |
| 2006/0159032 | A1 | 7/2006 | Ukrainetz et al. |
| 2006/0161270 | A1 | 7/2006 | Luskin et al. |
| 2006/0161662 | A1 | 7/2006 | Ng et al. |
| 2006/0161960 | A1 | 7/2006 | Benoit |
| 2006/0167784 | A1 | 7/2006 | Hoffberg |
| 2006/0167919 | A1 | 7/2006 | Hsieh |
| 2006/0168013 | A1 | 7/2006 | Wilson et al. |
| 2006/0168095 | A1 | 7/2006 | Sharma et al. |
| 2006/0168178 | A1 | 7/2006 | Hwang et al. |
| 2006/0168190 | A1 | 7/2006 | Johan et al. |
| 2006/0176146 | A1 | 8/2006 | Krishan et al. |
| 2006/0176167 | A1 | 8/2006 | Dohrmann |
| 2006/0181406 | A1 | 8/2006 | Petite et al. |
| 2006/0182100 | A1 | 8/2006 | Li et al. |
| 2006/0187900 | A1 | 8/2006 | Akbar |
| 2006/0189311 | A1 | 8/2006 | Cromer et al. |
| 2006/0190458 | A1 | 8/2006 | Mishina et al. |
| 2006/0190529 | A1 | 8/2006 | Morozumi et al. |
| 2006/0197660 | A1 | 9/2006 | Luebke et al. |
| 2006/0200845 | A1 | 9/2006 | Foster et al. |
| 2006/0206220 | A1 | 9/2006 | Amundson |
| 2006/0208872 | A1 | 9/2006 | Yu et al. |
| 2006/0208880 | A1 | 9/2006 | Funk et al. |
| 2006/0209857 | A1 | 9/2006 | Hicks, III |
| 2006/0215650 | A1 | 9/2006 | Wollmershauser et al. |
| 2006/0217115 | A1 | 9/2006 | Cassett et al. |
| 2006/0218244 | A1 | 9/2006 | Rasmussen et al. |
| 2006/0218593 | A1 | 9/2006 | Afshary et al. |
| 2006/0221184 | A1 | 10/2006 | Vallone et al. |
| 2006/0222153 | A1 | 10/2006 | Tarkoff et al. |
| 2006/0226972 | A1 | 10/2006 | Smith |
| 2006/0229746 | A1 | 10/2006 | Ollis et al. |
| 2006/0230270 | A1 | 10/2006 | Goffin |
| 2006/0233372 | A1 | 10/2006 | Shaheen et al. |
| 2006/0235963 | A1 | 10/2006 | Wetherly et al. |
| 2006/0236050 | A1 | 10/2006 | Sugimoto et al. |
| 2006/0238372 | A1 | 10/2006 | Jung et al. |
| 2006/0238617 | A1 | 10/2006 | Tamir |
| 2006/0242395 | A1 | 10/2006 | Fausak |
| 2006/0244589 | A1 | 11/2006 | Schranz |
| 2006/0245369 | A1 | 11/2006 | Schimmelpfeng et al. |
| 2006/0246886 | A1 | 11/2006 | Benco et al. |
| 2006/0246919 | A1 | 11/2006 | Park et al. |
| 2006/0250235 | A1 | 11/2006 | Astrin |
| 2006/0251255 | A1 | 11/2006 | Batta |
| 2006/0258342 | A1 | 11/2006 | Fok et al. |
| 2006/0259951 | A1 | 11/2006 | Forssell et al. |
| 2006/0265489 | A1 | 11/2006 | Moore |
| 2006/0271695 | A1 | 11/2006 | Lavian |
| 2006/0274764 | A1 | 12/2006 | Mah et al. |
| 2006/0281435 | A1 | 12/2006 | Shearer et al. |
| 2006/0282886 | A1 | 12/2006 | Gaug |
| 2006/0288288 | A1 | 12/2006 | Girgensohn et al. |
| 2006/0291507 | A1 | 12/2006 | Sarosi et al. |
| 2006/0294565 | A1 | 12/2006 | Walter |
| 2007/0001818 | A1 | 1/2007 | Small et al. |
| 2007/0002833 | A1 | 1/2007 | Bajic |
| 2007/0005736 | A1 | 1/2007 | Hansen et al. |
| 2007/0005957 | A1 | 1/2007 | Sahita et al. |
| 2007/0006177 | A1 | 1/2007 | Aiber et al. |
| 2007/0008099 | A1 | 1/2007 | Kimmel et al. |
| 2007/0014248 | A1 | 1/2007 | Fowlow |
| 2007/0043478 | A1 | 2/2007 | Ehlers et al. |
| 2007/0043954 | A1 | 2/2007 | Fox |
| 2007/0046462 | A1 | 3/2007 | Fancella |
| 2007/0047585 | A1 | 3/2007 | Gillespie et al. |
| 2007/0052675 | A1 | 3/2007 | Chang |
| 2007/0055770 | A1 | 3/2007 | Karmakar et al. |
| 2007/0058627 | A1 | 3/2007 | Smith et al. |
| 2007/0061018 | A1 | 3/2007 | Callaghan et al. |
| 2007/0061020 | A1 | 3/2007 | Bovee et al. |
| 2007/0061266 | A1 | 3/2007 | Moore et al. |
| 2007/0061430 | A1 | 3/2007 | Kim |
| 2007/0061878 | A1 | 3/2007 | Hagiu et al. |
| 2007/0063836 | A1 | 3/2007 | Hayden et al. |
| 2007/0063866 | A1 | 3/2007 | Webb |

(56) References Cited

U.S. PATENT DOCUMENTS

| | | | |
|---|---|---|---|
| 2007/0064714 | A1 | 3/2007 | Bl et al. |
| 2007/0067780 | A1 | 3/2007 | Kumar et al. |
| 2007/0079151 | A1 | 4/2007 | Connor et al. |
| 2007/0079385 | A1 | 4/2007 | Williams et al. |
| 2007/0083668 | A1 | 4/2007 | Kelsey et al. |
| 2007/0090944 | A1 | 4/2007 | Du Breuil |
| 2007/0094716 | A1 | 4/2007 | Farino et al. |
| 2007/0096981 | A1 | 5/2007 | Abraham |
| 2007/0101345 | A1 | 5/2007 | Takagi |
| 2007/0105072 | A1 | 5/2007 | Koljonen |
| 2007/0106124 | A1 | 5/2007 | Kuriyama et al. |
| 2007/0106536 | A1 | 5/2007 | Moore |
| 2007/0106547 | A1 | 5/2007 | Agrawal |
| 2007/0109975 | A1 | 5/2007 | Reckamp et al. |
| 2007/0116020 | A1 | 5/2007 | Cheever et al. |
| 2007/0117464 | A1 | 5/2007 | Freeman |
| 2007/0118609 | A1 | 5/2007 | Mullan et al. |
| 2007/0127510 | A1 | 6/2007 | Bossemeyer et al. |
| 2007/0132576 | A1 | 6/2007 | Kolavennu et al. |
| 2007/0136759 | A1 | 6/2007 | Zhang et al. |
| 2007/0140267 | A1 | 6/2007 | Yang |
| 2007/0142022 | A1 | 6/2007 | Madonna et al. |
| 2007/0142044 | A1 | 6/2007 | Fitzgerald et al. |
| 2007/0143440 | A1 | 6/2007 | Reckamp et al. |
| 2007/0146127 | A1 | 6/2007 | Stilp et al. |
| 2007/0146484 | A1 | 6/2007 | Horton et al. |
| 2007/0147419 | A1 | 6/2007 | Tsujimoto et al. |
| 2007/0150616 | A1 | 6/2007 | Baek et al. |
| 2007/0154010 | A1 | 7/2007 | Wong |
| 2007/0155325 | A1 | 7/2007 | Bambic et al. |
| 2007/0155423 | A1 | 7/2007 | Carmody et al. |
| 2007/0156689 | A1 | 7/2007 | Meek et al. |
| 2007/0160017 | A1 | 7/2007 | Meier et al. |
| 2007/0161372 | A1 | 7/2007 | Rogalski et al. |
| 2007/0162228 | A1 | 7/2007 | Mitchell |
| 2007/0162680 | A1 | 7/2007 | Mitchell |
| 2007/0164779 | A1 | 7/2007 | Weston et al. |
| 2007/0168860 | A1 | 7/2007 | Takayama et al. |
| 2007/0176766 | A1 | 8/2007 | Cheng |
| 2007/0182543 | A1 | 8/2007 | Luo |
| 2007/0182819 | A1 | 8/2007 | Monroe |
| 2007/0183345 | A1 | 8/2007 | Fahim et al. |
| 2007/0185989 | A1 | 8/2007 | Corbett et al. |
| 2007/0192486 | A1 | 8/2007 | Wilson et al. |
| 2007/0197236 | A1 | 8/2007 | Ahn et al. |
| 2007/0198698 | A1 | 8/2007 | Boyd et al. |
| 2007/0200658 | A1 | 8/2007 | Yang |
| 2007/0208521 | A1 | 9/2007 | Petite et al. |
| 2007/0214262 | A1 | 9/2007 | Buchbinder et al. |
| 2007/0214264 | A1 | 9/2007 | Koister |
| 2007/0216764 | A1 | 9/2007 | Kwak |
| 2007/0216783 | A1 | 9/2007 | Ortiz et al. |
| 2007/0218895 | A1 | 9/2007 | Saito et al. |
| 2007/0223465 | A1 | 9/2007 | Wang et al. |
| 2007/0223500 | A1 | 9/2007 | Lee et al. |
| 2007/0226182 | A1 | 9/2007 | Sobotka et al. |
| 2007/0230415 | A1 | 10/2007 | Malik |
| 2007/0230744 | A1 | 10/2007 | Dronge |
| 2007/0245223 | A1 | 10/2007 | Siedzik et al. |
| 2007/0253361 | A1 | 11/2007 | Pristas et al. |
| 2007/0255856 | A1 | 11/2007 | Reckamp et al. |
| 2007/0256105 | A1 | 11/2007 | Tabe |
| 2007/0257986 | A1 | 11/2007 | Ivanov et al. |
| 2007/0260713 | A1 | 11/2007 | Moorer et al. |
| 2007/0262857 | A1 | 11/2007 | Jackson |
| 2007/0263782 | A1 | 11/2007 | Stock et al. |
| 2007/0265866 | A1 | 11/2007 | Fehling et al. |
| 2007/0271398 | A1 | 11/2007 | Manchester et al. |
| 2007/0275703 | A1 | 11/2007 | Lim et al. |
| 2007/0277111 | A1 | 11/2007 | Bennett et al. |
| 2007/0282665 | A1 | 12/2007 | Buehler et al. |
| 2007/0283001 | A1 | 12/2007 | Spiess et al. |
| 2007/0283004 | A1 | 12/2007 | Buehler |
| 2007/0286210 | A1 | 12/2007 | Gutt et al. |
| 2007/0286369 | A1 | 12/2007 | Gutt et al. |
| 2007/0287405 | A1 | 12/2007 | Radtke |
| 2007/0288849 | A1 | 12/2007 | Moorer et al. |
| 2007/0288858 | A1 | 12/2007 | Pereira |
| 2007/0290830 | A1 | 12/2007 | Gurley |
| 2007/0291118 | A1 | 12/2007 | Shu et al. |
| 2007/0296814 | A1 | 12/2007 | Cooper et al. |
| 2007/0298772 | A1 | 12/2007 | Owens et al. |
| 2008/0001734 | A1 | 1/2008 | Stilp et al. |
| 2008/0013531 | A1 | 1/2008 | Elliott et al. |
| 2008/0013957 | A1 | 1/2008 | Akers et al. |
| 2008/0025487 | A1 | 1/2008 | Johan et al. |
| 2008/0027587 | A1 | 1/2008 | Nickerson et al. |
| 2008/0042826 | A1 | 2/2008 | Hevia et al. |
| 2008/0043107 | A1 | 2/2008 | Coogan et al. |
| 2008/0046593 | A1 | 2/2008 | Ando et al. |
| 2008/0048975 | A1 | 2/2008 | Leibow |
| 2008/0052348 | A1 | 2/2008 | Adler et al. |
| 2008/0056212 | A1 | 3/2008 | Karaoguz et al. |
| 2008/0056261 | A1 | 3/2008 | Osborn et al. |
| 2008/0059533 | A1 | 3/2008 | Krikorian |
| 2008/0059622 | A1 | 3/2008 | Hite et al. |
| 2008/0065681 | A1 | 3/2008 | Fontijn et al. |
| 2008/0065685 | A1 | 3/2008 | Frank |
| 2008/0072244 | A1 | 3/2008 | Eker et al. |
| 2008/0074258 | A1 | 3/2008 | Bennett et al. |
| 2008/0074993 | A1 | 3/2008 | Vainola |
| 2008/0082186 | A1 | 4/2008 | Hood et al. |
| 2008/0084294 | A1 | 4/2008 | Zhiying et al. |
| 2008/0084296 | A1 | 4/2008 | Kutzik et al. |
| 2008/0086564 | A1 | 4/2008 | Putman et al. |
| 2008/0091793 | A1 | 4/2008 | Diroo et al. |
| 2008/0095339 | A1 | 4/2008 | Elliott et al. |
| 2008/0102845 | A1 | 5/2008 | Zhao |
| 2008/0103608 | A1 | 5/2008 | Gough et al. |
| 2008/0104215 | A1 | 5/2008 | Excoffier et al. |
| 2008/0104516 | A1 | 5/2008 | Lee |
| 2008/0109302 | A1 | 5/2008 | Salokannel et al. |
| 2008/0109650 | A1 | 5/2008 | Shim et al. |
| 2008/0112340 | A1 | 5/2008 | Luebke |
| 2008/0112405 | A1 | 5/2008 | Cholas et al. |
| 2008/0117029 | A1 | 5/2008 | Dohrmann et al. |
| 2008/0117201 | A1 | 5/2008 | Martinez et al. |
| 2008/0117922 | A1 | 5/2008 | Cockrell et al. |
| 2008/0120405 | A1 | 5/2008 | Son et al. |
| 2008/0122575 | A1 | 5/2008 | Lavian et al. |
| 2008/0126535 | A1 | 5/2008 | Zhu et al. |
| 2008/0128444 | A1 | 6/2008 | Schininger et al. |
| 2008/0129484 | A1 | 6/2008 | Dahl et al. |
| 2008/0129821 | A1 | 6/2008 | Howarter et al. |
| 2008/0130949 | A1 | 6/2008 | Ivanov et al. |
| 2008/0133725 | A1 | 6/2008 | Shaouy |
| 2008/0134343 | A1 | 6/2008 | Pennington et al. |
| 2008/0137572 | A1 | 6/2008 | Park et al. |
| 2008/0140868 | A1 | 6/2008 | Kalayjian et al. |
| 2008/0141303 | A1 | 6/2008 | Walker et al. |
| 2008/0141341 | A1 | 6/2008 | Mnogradov et al. |
| 2008/0144884 | A1 | 6/2008 | Habibi |
| 2008/0147834 | A1 | 6/2008 | Quinn et al. |
| 2008/0151037 | A1 | 6/2008 | Kumarasamy et al. |
| 2008/0155080 | A1 | 6/2008 | Marlow et al. |
| 2008/0155470 | A1 | 6/2008 | Khedouri et al. |
| 2008/0162637 | A1 | 7/2008 | Adamczyk et al. |
| 2008/0163355 | A1 | 7/2008 | Chu |
| 2008/0165787 | A1 | 7/2008 | Xu et al. |
| 2008/0170511 | A1 | 7/2008 | Shorty et al. |
| 2008/0180240 | A1 | 7/2008 | Raji et al. |
| 2008/0181239 | A1 | 7/2008 | Wood et al. |
| 2008/0183483 | A1 | 7/2008 | Hart |
| 2008/0183842 | A1 | 7/2008 | Raji et al. |
| 2008/0189609 | A1 | 8/2008 | Larson et al. |
| 2008/0201468 | A1 | 8/2008 | Titus |
| 2008/0201723 | A1 | 8/2008 | Bottaro et al. |
| 2008/0208399 | A1 | 8/2008 | Pham |
| 2008/0209505 | A1 | 8/2008 | Ghai et al. |
| 2008/0209506 | A1 | 8/2008 | Ghai et al. |
| 2008/0215450 | A1 | 9/2008 | Gates et al. |
| 2008/0215613 | A1 | 9/2008 | Grasso |
| 2008/0219239 | A1 | 9/2008 | Bell et al. |
| 2008/0221715 | A1 | 9/2008 | Krzyzanowski et al. |

(56) References Cited

U.S. PATENT DOCUMENTS

2008/0227460 A1 9/2008 David et al.
2008/0235326 A1 9/2008 Parsi et al.
2008/0235600 A1 9/2008 Harper et al.
2008/0239075 A1 10/2008 Mehrotra et al.
2008/0240372 A1 10/2008 Frenette
2008/0240696 A1 10/2008 Kucharyson
2008/0259818 A1 10/2008 Balassanian
2008/0261540 A1 10/2008 Rohani et al.
2008/0263150 A1 10/2008 Childers et al.
2008/0266080 A1 10/2008 Leung et al.
2008/0266257 A1 10/2008 Chiang
2008/0271150 A1 10/2008 Boerger et al.
2008/0284580 A1 11/2008 Babich et al.
2008/0284587 A1 11/2008 Saigh et al.
2008/0284592 A1 11/2008 Collins et al.
2008/0288639 A1 11/2008 Ruppert et al.
2008/0294588 A1 11/2008 Morris et al.
2008/0297599 A1 12/2008 Donovan et al.
2008/0303903 A1 12/2008 Bentley et al.
2008/0313316 A1 12/2008 Hite et al.
2008/0316024 A1 12/2008 Chantelou et al.
2009/0003252 A1 1/2009 Salomone et al.
2009/0003820 A1 1/2009 Law et al.
2009/0007596 A1 1/2009 Goldstein et al.
2009/0013210 A1 1/2009 McIntosh et al.
2009/0019141 A1 1/2009 Bush et al.
2009/0036142 A1 2/2009 Xiaolu
2009/0041467 A1 2/2009 Carleton et al.
2009/0042649 A1 2/2009 Hsieh et al.
2009/0046664 A1 2/2009 Aso
2009/0049094 A1 2/2009 Howell et al.
2009/0049488 A1 2/2009 Stransky
2009/0051769 A1 2/2009 Kuo et al.
2009/0055760 A1 2/2009 Whatcott et al.
2009/0057427 A1 3/2009 Geadelmann et al.
2009/0063582 A1 3/2009 Anna et al.
2009/0066534 A1 3/2009 Sivakkolundhu
2009/0066789 A1 3/2009 Baum et al.
2009/0067395 A1 3/2009 Curtis et al.
2009/0070436 A1 3/2009 Dawes et al.
2009/0070477 A1 3/2009 Baum et al.
2009/0070681 A1 3/2009 Dawes et al.
2009/0070682 A1 3/2009 Dawes et al.
2009/0070692 A1 3/2009 Dawes et al.
2009/0072988 A1 3/2009 Haywood
2009/0074184 A1 3/2009 Baum et al.
2009/0076211 A1 3/2009 Yang et al.
2009/0076879 A1 3/2009 Sparks et al.
2009/0077167 A1 3/2009 Baum et al.
2009/0077622 A1 3/2009 Baum et al.
2009/0077623 A1 3/2009 Baum et al.
2009/0077624 A1 3/2009 Baum et al.
2009/0079547 A1 3/2009 Oksanen et al.
2009/0086660 A1 4/2009 Sood et al.
2009/0086740 A1 4/2009 Al-Bakri et al.
2009/0092283 A1 4/2009 Whillock et al.
2009/0094671 A1 4/2009 Kurapati et al.
2009/0100176 A1 4/2009 Hicks, III et al.
2009/0100329 A1 4/2009 Espinoza
2009/0100460 A1 4/2009 Hicks et al.
2009/0100492 A1 4/2009 Hicks et al.
2009/0113344 A1 4/2009 Nesse et al.
2009/0119397 A1 5/2009 Neerdaels
2009/0125708 A1 5/2009 Woodring et al.
2009/0128365 A1 5/2009 Laskin
2009/0134998 A1 5/2009 Baum et al.
2009/0138600 A1 5/2009 Baum et al.
2009/0138958 A1 5/2009 Baum et al.
2009/0146846 A1 6/2009 Grossman
2009/0158189 A1 6/2009 Itani
2009/0158292 A1 6/2009 Rattner et al.
2009/0161609 A1 6/2009 Bergstrom
2009/0165114 A1 6/2009 Baum et al.
2009/0172443 A1 7/2009 Rothman et al.
2009/0177298 A1 7/2009 McFarland et al.
2009/0177906 A1 7/2009 Paniagua et al.
2009/0180430 A1 7/2009 Fadell
2009/0187297 A1 7/2009 Kish et al.
2009/0193373 A1 7/2009 Abbaspour et al.
2009/0197539 A1 8/2009 Shiba
2009/0202250 A1 8/2009 Dizechi et al.
2009/0204693 A1 8/2009 Andreev et al.
2009/0221368 A1 9/2009 Yen et al.
2009/0224875 A1 9/2009 Rabinowitz et al.
2009/0228445 A1 9/2009 Gangal
2009/0240353 A1 9/2009 Songkakul et al.
2009/0240730 A1 9/2009 Wood
2009/0240787 A1 9/2009 Denny
2009/0240814 A1 9/2009 Brubacher et al.
2009/0240946 A1 9/2009 Yeap et al.
2009/0254960 A1 10/2009 Yarom et al.
2009/0256708 A1 10/2009 Hsiao et al.
2009/0259515 A1 10/2009 Belimpasakis et al.
2009/0260052 A1 10/2009 Bathula et al.
2009/0260083 A1 10/2009 Szeto et al.
2009/0260430 A1 10/2009 Zamfes
2009/0265042 A1 10/2009 Mollenkopf et al.
2009/0265193 A1 10/2009 Collins et al.
2009/0270090 A1 10/2009 Kawamura
2009/0271042 A1 10/2009 Keith
2009/0289787 A1 11/2009 Dawson et al.
2009/0289788 A1 11/2009 Leblond
2009/0292909 A1 11/2009 Feder et al.
2009/0303100 A1 12/2009 Zemany
2009/0307255 A1 12/2009 Park
2009/0307307 A1 12/2009 Igarashi
2009/0313693 A1 12/2009 Rogers
2009/0316671 A1 12/2009 Rolf et al.
2009/0322510 A1 12/2009 Berger et al.
2009/0324010 A1 12/2009 Hou
2009/0327483 A1 12/2009 Thompson et al.
2009/0327510 A1 12/2009 Edelman et al.
2010/0000791 A1 1/2010 Alberty
2010/0001812 A1 1/2010 Kausch
2010/0004949 A1 1/2010 O'Brien
2010/0008274 A1 1/2010 Kneckt et al.
2010/0009758 A1 1/2010 Twitchell, Jr.
2010/0013917 A1 1/2010 Hanna et al.
2010/0023865 A1 1/2010 Fulker et al.
2010/0026481 A1 2/2010 Oh et al.
2010/0026487 A1 2/2010 Hershkovitz
2010/0030578 A1 2/2010 Siddique et al.
2010/0030810 A1 2/2010 Marr
2010/0039958 A1 2/2010 Ge et al.
2010/0041380 A1 2/2010 Hewes et al.
2010/0042954 A1 2/2010 Rosenblatt et al.
2010/0067371 A1 3/2010 Gogic et al.
2010/0070618 A1 3/2010 Kim et al.
2010/0074112 A1 3/2010 Derr et al.
2010/0077111 A1 3/2010 Holmes et al.
2010/0077347 A1 3/2010 Kirtane et al.
2010/0082744 A1 4/2010 Raji et al.
2010/0095111 A1 4/2010 Gutt et al.
2010/0095369 A1 4/2010 Gutt et al.
2010/0100269 A1 4/2010 Ekhaguere et al.
2010/0102951 A1 4/2010 Rutledge
2010/0121521 A1 5/2010 Kiribayashi
2010/0122091 A1 5/2010 Huang et al.
2010/0138758 A1 6/2010 Mizumori et al.
2010/0138764 A1 6/2010 Hatambeiki et al.
2010/0141762 A1 6/2010 Siann et al.
2010/0145485 A1 6/2010 Duchene et al.
2010/0150170 A1 6/2010 Lee et al.
2010/0159898 A1 6/2010 Krzyzanowski et al.
2010/0159967 A1 6/2010 Pounds et al.
2010/0164736 A1 7/2010 Byers et al.
2010/0165897 A1 7/2010 Sood
2010/0174643 A1 7/2010 Schaefer et al.
2010/0177749 A1 7/2010 Essinger et al.
2010/0177750 A1 7/2010 Essinger et al.
2010/0185857 A1 7/2010 Neitzel et al.
2010/0197219 A1 8/2010 Issa et al.
2010/0204839 A1 8/2010 Behm et al.
2010/0210240 A1 8/2010 Mahaffey et al.

(56) References Cited

U.S. PATENT DOCUMENTS

| | | | |
|---|---|---|---|
| 2010/0212012 | A1 | 8/2010 | Touboul et al. |
| 2010/0218104 | A1 | 8/2010 | Lewis |
| 2010/0222069 | A1 | 9/2010 | Abraham et al. |
| 2010/0238286 | A1 | 9/2010 | Boghossian et al. |
| 2010/0241711 | A1 | 9/2010 | Ansari et al. |
| 2010/0241748 | A1 | 9/2010 | Ansari et al. |
| 2010/0248681 | A1 | 9/2010 | Phills |
| 2010/0267390 | A1 | 10/2010 | Lin et al. |
| 2010/0274366 | A1 | 10/2010 | Fata et al. |
| 2010/0277302 | A1 | 11/2010 | Cohn et al. |
| 2010/0279649 | A1 | 11/2010 | Thomas |
| 2010/0280635 | A1 | 11/2010 | Cohn et al. |
| 2010/0280637 | A1 | 11/2010 | Cohn et al. |
| 2010/0281135 | A1 | 11/2010 | Cohn et al. |
| 2010/0281161 | A1 | 11/2010 | Cohn et al. |
| 2010/0298024 | A1 | 11/2010 | Choi |
| 2010/0308990 | A1 | 12/2010 | Simon et al. |
| 2010/0321151 | A1 | 12/2010 | Matsuura et al. |
| 2010/0325107 | A1 | 12/2010 | Kenton et al. |
| 2010/0332164 | A1 | 12/2010 | Aisa et al. |
| 2011/0000521 | A1 | 1/2011 | Tachibana |
| 2011/0029875 | A1 | 2/2011 | Milch |
| 2011/0030056 | A1 | 2/2011 | Tokunaga |
| 2011/0037593 | A1 | 2/2011 | Foisy et al. |
| 2011/0040415 | A1 | 2/2011 | Nickerson et al. |
| 2011/0040877 | A1 | 2/2011 | Foisy |
| 2011/0046792 | A1 | 2/2011 | Imes et al. |
| 2011/0051638 | A1 | 3/2011 | Jeon et al. |
| 2011/0068921 | A1 | 3/2011 | Shafer |
| 2011/0080267 | A1 | 4/2011 | Clare et al. |
| 2011/0087988 | A1 | 4/2011 | Ray et al. |
| 2011/0093799 | A1 | 4/2011 | Hatambeiki et al. |
| 2011/0096678 | A1 | 4/2011 | Ketonen |
| 2011/0102588 | A1 | 5/2011 | Trundle et al. |
| 2011/0107436 | A1 | 5/2011 | Cholas et al. |
| 2011/0125333 | A1 | 5/2011 | Gray |
| 2011/0125846 | A1 | 5/2011 | Ham et al. |
| 2011/0128378 | A1 | 6/2011 | Raji |
| 2011/0131226 | A1 | 6/2011 | Chandra et al. |
| 2011/0148572 | A1 | 6/2011 | Ku |
| 2011/0156914 | A1 | 6/2011 | Sheharri et al. |
| 2011/0169637 | A1 | 7/2011 | Siegler et al. |
| 2011/0197327 | A1 | 8/2011 | McElroy et al. |
| 2011/0200052 | A1 | 8/2011 | Mungo et al. |
| 2011/0208359 | A1 | 8/2011 | Duchene et al. |
| 2011/0212706 | A1 | 9/2011 | Uusilehto |
| 2011/0218777 | A1 | 9/2011 | Chen et al. |
| 2011/0230139 | A1 | 9/2011 | Nakahara |
| 2011/0230160 | A1 | 9/2011 | Felgate |
| 2011/0234392 | A1 | 9/2011 | Cohn et al. |
| 2011/0246762 | A1 | 10/2011 | Adams et al. |
| 2011/0257953 | A1 | 10/2011 | Li et al. |
| 2011/0261195 | A1 | 10/2011 | Martin et al. |
| 2011/0276699 | A1 | 11/2011 | Pedersen |
| 2011/0283006 | A1 | 11/2011 | Ramamurthy |
| 2011/0289517 | A1 | 11/2011 | Sather et al. |
| 2011/0302497 | A1 | 12/2011 | Garrett et al. |
| 2011/0309929 | A1 | 12/2011 | Myers |
| 2011/0314515 | A1 | 12/2011 | Hernoud et al. |
| 2012/0001436 | A1 | 1/2012 | Sami et al. |
| 2012/0014363 | A1 | 1/2012 | Hassan et al. |
| 2012/0016607 | A1 | 1/2012 | Cottrell et al. |
| 2012/0017268 | A9 | 1/2012 | Dispensa |
| 2012/0020060 | A1 | 1/2012 | Myer et al. |
| 2012/0023151 | A1 | 1/2012 | Bennett et al. |
| 2012/0030130 | A1 | 2/2012 | Smith et al. |
| 2012/0062370 | A1 | 3/2012 | Feldstein et al. |
| 2012/0066608 | A1 | 3/2012 | Sundermeyer et al. |
| 2012/0066632 | A1 | 3/2012 | Sundermeyer et al. |
| 2012/0075469 | A1 | 3/2012 | Oskin et al. |
| 2012/0081842 | A1 | 4/2012 | Ewing et al. |
| 2012/0084184 | A1 | 4/2012 | Raleigh et al. |
| 2012/0143383 | A1 | 6/2012 | Cooperrider et al. |
| 2012/0154126 | A1 | 6/2012 | Cohn et al. |
| 2012/0172027 | A1 | 7/2012 | Partheesh et al. |
| 2012/0182245 | A1 | 7/2012 | Hutton |
| 2012/0209951 | A1 | 8/2012 | Enns et al. |
| 2012/0214502 | A1 | 8/2012 | Qiang |
| 2012/0232788 | A1 | 9/2012 | Diao |
| 2012/0242788 | A1 | 9/2012 | Chuang et al. |
| 2012/0257061 | A1 | 10/2012 | Edwards et al. |
| 2012/0259722 | A1 | 10/2012 | Mikurak |
| 2012/0265892 | A1 | 10/2012 | Ma et al. |
| 2012/0269199 | A1 | 10/2012 | Chan et al. |
| 2012/0278877 | A1 | 11/2012 | Baum et al. |
| 2012/0280790 | A1 | 11/2012 | Gerhardt et al. |
| 2012/0296486 | A1 | 11/2012 | Marriam et al. |
| 2012/0307646 | A1 | 12/2012 | Xia et al. |
| 2012/0309354 | A1 | 12/2012 | Du |
| 2012/0314901 | A1 | 12/2012 | Hanson et al. |
| 2012/0315848 | A1 | 12/2012 | Smith et al. |
| 2012/0324566 | A1 | 12/2012 | Baum et al. |
| 2012/0327242 | A1 | 12/2012 | Barley et al. |
| 2012/0331109 | A1 | 12/2012 | Baum et al. |
| 2013/0007871 | A1 | 1/2013 | Meenan et al. |
| 2013/0038730 | A1 | 2/2013 | Peterson et al. |
| 2013/0038800 | A1 | 2/2013 | Yoo |
| 2013/0047123 | A1 | 2/2013 | May et al. |
| 2013/0057695 | A1 | 3/2013 | Huisking |
| 2013/0062951 | A1 | 3/2013 | Raji et al. |
| 2013/0073746 | A1 | 3/2013 | Singh et al. |
| 2013/0082835 | A1 | 4/2013 | Shapiro et al. |
| 2013/0082836 | A1 | 4/2013 | Watts |
| 2013/0085615 | A1 | 4/2013 | Barker |
| 2013/0086618 | A1 | 4/2013 | Klein et al. |
| 2013/0094538 | A1 | 4/2013 | Wang |
| 2013/0103207 | A1 | 4/2013 | Ruff et al. |
| 2013/0115972 | A1 | 5/2013 | Ziskind et al. |
| 2013/0120131 | A1 | 5/2013 | Hicks, III |
| 2013/0125157 | A1 | 5/2013 | Sharif-Ahmadi et al. |
| 2013/0136102 | A1 | 5/2013 | Macwan et al. |
| 2013/0147799 | A1 | 6/2013 | Hoguet |
| 2013/0154822 | A1 | 6/2013 | Kumar et al. |
| 2013/0155229 | A1 | 6/2013 | Thornton et al. |
| 2013/0163491 | A1 | 6/2013 | Singh et al. |
| 2013/0173797 | A1 | 7/2013 | Poirer et al. |
| 2013/0174239 | A1 | 7/2013 | Kim et al. |
| 2013/0183924 | A1 | 7/2013 | Saigh et al. |
| 2013/0184874 | A1 | 7/2013 | Frader-Thompson et al. |
| 2013/0191755 | A1 | 7/2013 | Balog et al. |
| 2013/0205016 | A1 | 8/2013 | Dupre et al. |
| 2013/0218959 | A1 | 8/2013 | Sa et al. |
| 2013/0222133 | A1 | 8/2013 | Schultz et al. |
| 2013/0223279 | A1 | 8/2013 | Tinnakornsrisuphap et al. |
| 2013/0245837 | A1 | 9/2013 | Grohman |
| 2013/0257611 | A1 | 10/2013 | Lamb et al. |
| 2013/0258119 | A1 | 10/2013 | Kim et al. |
| 2013/0261821 | A1 | 10/2013 | Lu et al. |
| 2013/0266193 | A1 | 10/2013 | Tiwari et al. |
| 2013/0271270 | A1 | 10/2013 | Jamadagni et al. |
| 2013/0286942 | A1 | 10/2013 | Bonar et al. |
| 2013/0311146 | A1 | 11/2013 | Miller et al. |
| 2013/0314542 | A1 | 11/2013 | Jackson |
| 2013/0318231 | A1 | 11/2013 | Raji et al. |
| 2013/0318443 | A1 | 11/2013 | Bachman et al. |
| 2013/0325935 | A1 | 12/2013 | Kiley et al. |
| 2013/0331109 | A1 | 12/2013 | Dhillon et al. |
| 2013/0344875 | A1 | 12/2013 | Chowdhury |
| 2014/0006660 | A1 | 1/2014 | Frei et al. |
| 2014/0024361 | A1 | 1/2014 | Poon et al. |
| 2014/0032034 | A1 | 1/2014 | Raptopoulos et al. |
| 2014/0035726 | A1 | 2/2014 | Schoner et al. |
| 2014/0053246 | A1 | 2/2014 | Huang et al. |
| 2014/0068486 | A1 | 3/2014 | Sellers et al. |
| 2014/0075464 | A1 | 3/2014 | Mccrea |
| 2014/0098247 | A1 | 4/2014 | Rao et al. |
| 2014/0108151 | A1 | 4/2014 | Bookstaff |
| 2014/0112405 | A1 | 4/2014 | Jafarian et al. |
| 2014/0126425 | A1 | 5/2014 | Burd et al. |
| 2014/0136242 | A1 | 5/2014 | Weekes et al. |
| 2014/0136847 | A1 | 5/2014 | Huang |
| 2014/0136936 | A1 | 5/2014 | Patel et al. |
| 2014/0140575 | A1 | 5/2014 | Wolf |
| 2014/0143695 | A1 | 5/2014 | Sundermeyer et al. |

(56) References Cited

U.S. PATENT DOCUMENTS

| | | | |
|---|---|---|---|
| 2014/0143851 | A1 | 5/2014 | Baum et al. |
| 2014/0143854 | A1 | 5/2014 | Lopez et al. |
| 2014/0146171 | A1 | 5/2014 | Brady et al. |
| 2014/0153695 | A1 | 6/2014 | Yanagisawa et al. |
| 2014/0167928 | A1 | 6/2014 | Burd et al. |
| 2014/0172957 | A1 | 6/2014 | Baum et al. |
| 2014/0176797 | A1 | 6/2014 | Silva et al. |
| 2014/0180968 | A1 | 6/2014 | Song et al. |
| 2014/0188290 | A1 | 7/2014 | Steinberg et al. |
| 2014/0201291 | A1 | 7/2014 | Russell |
| 2014/0208214 | A1 | 7/2014 | Stern |
| 2014/0218517 | A1 | 8/2014 | Kim et al. |
| 2014/0233951 | A1 | 8/2014 | Cook |
| 2014/0236325 | A1 | 8/2014 | Sasaki et al. |
| 2014/0245160 | A1 | 8/2014 | Bauer et al. |
| 2014/0254896 | A1 | 9/2014 | Zhou et al. |
| 2014/0266678 | A1 | 9/2014 | Shapiro et al. |
| 2014/0266736 | A1 | 9/2014 | Cretu-Petra |
| 2014/0278281 | A1 | 9/2014 | Vaynriber et al. |
| 2014/0282048 | A1 | 9/2014 | Shapiro et al. |
| 2014/0282934 | A1 | 9/2014 | Miasnik et al. |
| 2014/0289384 | A1 | 9/2014 | Kao et al. |
| 2014/0289388 | A1 | 9/2014 | Ghosh et al. |
| 2014/0293046 | A1 | 10/2014 | Ni |
| 2014/0298467 | A1 | 10/2014 | Bhagwat et al. |
| 2014/0316616 | A1 | 10/2014 | Kugelmass |
| 2014/0317660 | A1 | 10/2014 | Cheung et al. |
| 2014/0319232 | A1 | 10/2014 | Gourlay et al. |
| 2014/0328161 | A1 | 11/2014 | Haddad et al. |
| 2014/0340216 | A1 | 11/2014 | Puskarich |
| 2014/0359101 | A1 | 12/2014 | Dawes et al. |
| 2014/0359524 | A1 | 12/2014 | Sasaki et al. |
| 2014/0368331 | A1 | 12/2014 | Cohn et al. |
| 2014/0369584 | A1 | 12/2014 | Fan et al. |
| 2014/0372599 | A1 | 12/2014 | Gutt et al. |
| 2014/0372811 | A1 | 12/2014 | Cohn et al. |
| 2015/0009325 | A1 | 1/2015 | Kardashov |
| 2015/0019714 | A1 | 1/2015 | Shaashua et al. |
| 2015/0022666 | A1 | 1/2015 | Kay et al. |
| 2015/0054947 | A1 | 2/2015 | Dawes |
| 2015/0058250 | A1 | 2/2015 | Stanzione et al. |
| 2015/0074206 | A1 | 3/2015 | Baldwin |
| 2015/0074259 | A1 | 3/2015 | Ansari et al. |
| 2015/0077553 | A1 | 3/2015 | Dawes |
| 2015/0082414 | A1 | 3/2015 | Dawes |
| 2015/0088982 | A1 | 3/2015 | Johnson et al. |
| 2015/0097680 | A1 | 4/2015 | Fadell et al. |
| 2015/0097949 | A1 | 4/2015 | Ure et al. |
| 2015/0097961 | A1 | 4/2015 | Ure et al. |
| 2015/0106721 | A1 | 4/2015 | Cha et al. |
| 2015/0142991 | A1 | 5/2015 | Zaloom |
| 2015/0161875 | A1 | 6/2015 | Cohn et al. |
| 2015/0170447 | A1 | 6/2015 | Buzhardt |
| 2015/0193127 | A1 | 7/2015 | Chai et al. |
| 2015/0205297 | A1 | 7/2015 | Stevens et al. |
| 2015/0205465 | A1 | 7/2015 | Robison et al. |
| 2015/0222601 | A1 | 8/2015 | Metz et al. |
| 2015/0256355 | A1 | 9/2015 | Pera et al. |
| 2015/0261427 | A1 | 9/2015 | Sasaki |
| 2015/0266577 | A1 | 9/2015 | Jones et al. |
| 2015/0287310 | A1 | 10/2015 | Deiiuliis et al. |
| 2015/0304804 | A1 | 10/2015 | Lotito |
| 2015/0319006 | A1 | 11/2015 | Plummer et al. |
| 2015/0319046 | A1 | 11/2015 | Plummer et al. |
| 2015/0325106 | A1 | 11/2015 | Dawes et al. |
| 2015/0331662 | A1 | 11/2015 | Lambourne |
| 2015/0334087 | A1 | 11/2015 | Dawes |
| 2015/0348554 | A1 | 12/2015 | Orr et al. |
| 2015/0350031 | A1 | 12/2015 | Burks et al. |
| 2015/0358359 | A1 | 12/2015 | Ghai et al. |
| 2015/0365217 | A1 | 12/2015 | Scholten et al. |
| 2015/0365933 | A1 | 12/2015 | Lee et al. |
| 2015/0371512 | A1 | 12/2015 | Bennett et al. |
| 2015/0373149 | A1 | 12/2015 | Lyons |
| 2015/0379355 | A1 | 12/2015 | Kanga et al. |
| 2016/0012715 | A1 | 1/2016 | Raji et al. |
| 2016/0019763 | A1 | 1/2016 | Raji et al. |
| 2016/0019778 | A1 | 1/2016 | Raji et al. |
| 2016/0023475 | A1 | 1/2016 | Bevier et al. |
| 2016/0027295 | A1 | 1/2016 | Raji et al. |
| 2016/0036944 | A1 | 2/2016 | Kitchen et al. |
| 2016/0037389 | A1 | 2/2016 | Tagg et al. |
| 2016/0042637 | A1 | 2/2016 | Cahill |
| 2016/0055573 | A1 | 2/2016 | Chen et al. |
| 2016/0062624 | A1 | 3/2016 | Sundermeyer et al. |
| 2016/0065413 | A1 | 3/2016 | Sundermeyer et al. |
| 2016/0065414 | A1 | 3/2016 | Sundermeyer et al. |
| 2016/0065653 | A1 | 3/2016 | Chen et al. |
| 2016/0068264 | A1 | 3/2016 | Ganesh et al. |
| 2016/0077935 | A1 | 3/2016 | Zheng et al. |
| 2016/0080365 | A1 | 3/2016 | Baker et al. |
| 2016/0087933 | A1 | 3/2016 | Johnson et al. |
| 2016/0100348 | A1 | 4/2016 | Cohn et al. |
| 2016/0107749 | A1 | 4/2016 | Mucci |
| 2016/0116914 | A1 | 4/2016 | Mucci |
| 2016/0127641 | A1 | 5/2016 | Gove |
| 2016/0147919 | A1 | 5/2016 | Yabe et al. |
| 2016/0156941 | A9 | 6/2016 | Alao et al. |
| 2016/0161277 | A1 | 6/2016 | Park et al. |
| 2016/0163185 | A1 | 6/2016 | Ramasubbu et al. |
| 2016/0164923 | A1 | 6/2016 | Dawes |
| 2016/0171853 | A1 | 6/2016 | Naidoo et al. |
| 2016/0180719 | A1 | 6/2016 | Wouhaybi et al. |
| 2016/0183073 | A1 | 6/2016 | Saito et al. |
| 2016/0189509 | A1 | 6/2016 | Malhotra et al. |
| 2016/0189524 | A1 | 6/2016 | Poder et al. |
| 2016/0189527 | A1 | 6/2016 | Peterson et al. |
| 2016/0189549 | A1 | 6/2016 | Marcus |
| 2016/0191265 | A1 | 6/2016 | Cohn et al. |
| 2016/0191621 | A1 | 6/2016 | Oh et al. |
| 2016/0192461 | A1 | 6/2016 | Minsky |
| 2016/0196734 | A1 | 7/2016 | Hicks, III |
| 2016/0202695 | A1 | 7/2016 | Deroos et al. |
| 2016/0209072 | A1 | 7/2016 | Golden et al. |
| 2016/0225240 | A1 | 8/2016 | Voddhi et al. |
| 2016/0226732 | A1 | 8/2016 | Kim et al. |
| 2016/0231916 | A1 | 8/2016 | Dawes |
| 2016/0232780 | A1 | 8/2016 | Cohn et al. |
| 2016/0234075 | A1 | 8/2016 | Sirpal et al. |
| 2016/0241633 | A1 | 8/2016 | Overby et al. |
| 2016/0260135 | A1 | 9/2016 | Zomet et al. |
| 2016/0261932 | A1 | 9/2016 | Fadell et al. |
| 2016/0266579 | A1 | 9/2016 | Chen et al. |
| 2016/0267751 | A1 | 9/2016 | Fulker et al. |
| 2016/0274759 | A1 | 9/2016 | Dawes |
| 2016/0363337 | A1 | 12/2016 | Steinberg et al. |
| 2016/0364089 | A1 | 12/2016 | Blackman et al. |
| 2016/0371961 | A1 | 12/2016 | Narang et al. |
| 2016/0371967 | A1 | 12/2016 | Narang et al. |
| 2016/0373453 | A1 | 12/2016 | Ruffner et al. |
| 2016/0378109 | A1 | 12/2016 | Raffa et al. |
| 2017/0004714 | A1 | 1/2017 | Rhee |
| 2017/0005818 | A1 | 1/2017 | Gould |
| 2017/0006107 | A1 | 1/2017 | Dawes et al. |
| 2017/0019644 | A1 | 1/2017 | K V et al. |
| 2017/0026440 | A1 | 1/2017 | Cockrell et al. |
| 2017/0039413 | A1 | 2/2017 | Nadler |
| 2017/0052513 | A1 | 2/2017 | Raji et al. |
| 2017/0054571 | A1 | 2/2017 | Kitchen et al. |
| 2017/0054594 | A1 | 2/2017 | Decenzo et al. |
| 2017/0063967 | A1 | 3/2017 | Kitchen et al. |
| 2017/0063968 | A1 | 3/2017 | Kitchen et al. |
| 2017/0068419 | A1 | 3/2017 | Sundermeyer et al. |
| 2017/0070361 | A1 | 3/2017 | Sundermeyer et al. |
| 2017/0070563 | A1 | 3/2017 | Sundermeyer et al. |
| 2017/0078298 | A1 | 3/2017 | Vlaminck et al. |
| 2017/0092138 | A1 | 3/2017 | Trundle et al. |
| 2017/0103646 | A1 | 4/2017 | Naidoo et al. |
| 2017/0109999 | A1 | 4/2017 | Cohn et al. |
| 2017/0111227 | A1 | 4/2017 | Papageorgiou et al. |
| 2017/0118037 | A1 | 4/2017 | Kitchen et al. |
| 2017/0124987 | A1 | 5/2017 | Kim et al. |
| 2017/0127124 | A9 | 5/2017 | Wilson et al. |
| 2017/0154507 | A1 | 6/2017 | Dawes et al. |

(56) References Cited

U.S. PATENT DOCUMENTS

| | | | |
|---|---|---|---|
| 2017/0155545 | A1 | 6/2017 | Baum et al. |
| 2017/0180198 | A1 | 6/2017 | Baum et al. |
| 2017/0180306 | A1 | 6/2017 | Gutt et al. |
| 2017/0185277 | A1 | 6/2017 | Sundermeyer et al. |
| 2017/0185278 | A1 | 6/2017 | Sundermeyer et al. |
| 2017/0185281 | A1 | 6/2017 | Park et al. |
| 2017/0192402 | A1 | 7/2017 | Karp et al. |
| 2017/0225336 | A1 | 8/2017 | Deyle et al. |
| 2017/0227965 | A1 | 8/2017 | Decenzo et al. |
| 2017/0244573 | A1 | 8/2017 | Baum et al. |
| 2017/0255452 | A1 | 9/2017 | Barnes et al. |
| 2017/0257257 | A1 | 9/2017 | Dawes |
| 2017/0278407 | A1 | 9/2017 | Lemmey et al. |
| 2017/0279629 | A1 | 9/2017 | Raji |
| 2017/0289323 | A1 | 10/2017 | Gelvin et al. |
| 2017/0289360 | A1* | 10/2017 | Baum .................... H04M 11/04 |
| 2017/0301216 | A1 | 10/2017 | Cohn et al. |
| 2017/0302469 | A1 | 10/2017 | Cohn et al. |
| 2017/0303257 | A1 | 10/2017 | Yamada et al. |
| 2017/0310500 | A1 | 10/2017 | Dawes |
| 2017/0331781 | A1 | 11/2017 | Gutt et al. |
| 2017/0337806 | A1 | 11/2017 | Cohn et al. |
| 2017/0353324 | A1 | 12/2017 | Baum et al. |
| 2018/0004377 | A1 | 1/2018 | Kitchen et al. |
| 2018/0012460 | A1 | 1/2018 | Heitz, III et al. |
| 2018/0019890 | A1 | 1/2018 | Dawes |
| 2018/0045159 | A1 | 2/2018 | Patel |
| 2018/0054774 | A1 | 2/2018 | Cohn et al. |
| 2018/0063248 | A1 | 3/2018 | Dawes et al. |
| 2018/0063259 | A1 | 3/2018 | Connelly et al. |
| 2018/0069862 | A1 | 3/2018 | Cholas et al. |
| 2018/0069932 | A1 | 3/2018 | Tiwari et al. |
| 2018/0083831 | A1 | 3/2018 | Baum et al. |
| 2018/0092046 | A1 | 3/2018 | Egan et al. |
| 2018/0096568 | A1 | 4/2018 | Cohn et al. |
| 2018/0107196 | A1 | 4/2018 | Bian et al. |
| 2018/0183668 | A1 | 6/2018 | Caldwell et al. |
| 2018/0191720 | A1 | 7/2018 | Dawes |
| 2018/0191740 | A1 | 7/2018 | Decenzo et al. |
| 2018/0191741 | A1 | 7/2018 | Dawes et al. |
| 2018/0191742 | A1 | 7/2018 | Dawes |
| 2018/0191807 | A1 | 7/2018 | Dawes |
| 2018/0197387 | A1 | 7/2018 | Dawes |
| 2018/0198688 | A1 | 7/2018 | Dawes |
| 2018/0198755 | A1 | 7/2018 | Domangue et al. |
| 2018/0198756 | A1 | 7/2018 | Dawes |
| 2018/0198788 | A1 | 7/2018 | Helen et al. |
| 2018/0198802 | A1 | 7/2018 | Dawes |
| 2018/0198841 | A1 | 7/2018 | Chmielewski et al. |
| 2018/0278701 | A1 | 9/2018 | Diem |
| 2018/0307223 | A1 | 10/2018 | Peeters et al. |
| 2018/0322759 | A1 | 11/2018 | Devdas et al. |
| 2019/0014413 | A1 | 1/2019 | Kallai et al. |
| 2019/0041547 | A1 | 2/2019 | Rolf et al. |
| 2019/0058720 | A1 | 2/2019 | Lindquist et al. |
| 2019/0073193 | A1 | 3/2019 | Krispin |
| 2019/0073534 | A1 | 3/2019 | Dvir et al. |
| 2019/0103030 | A1 | 4/2019 | Banga et al. |
| 2019/0197256 | A1 | 6/2019 | Lehnhardt et al. |
| 2019/0239008 | A1 | 8/2019 | Lambourne |
| 2019/0347924 | A1 | 11/2019 | Trundle et al. |
| 2019/0386892 | A1 | 12/2019 | Sundermeyer et al. |
| 2019/0391545 | A1 | 12/2019 | Trundle et al. |
| 2020/0014675 | A1 | 1/2020 | Helms et al. |
| 2020/0029339 | A1 | 1/2020 | Suzuki |
| 2020/0032887 | A1 | 1/2020 | Mcburney et al. |
| 2020/0076858 | A1 | 3/2020 | Apsangi et al. |
| 2020/0094963 | A1 | 3/2020 | Myslinski |
| 2020/0127891 | A9 | 4/2020 | Johnson et al. |
| 2020/0142574 | A1 | 5/2020 | Sundermeyer et al. |
| 2020/0159399 | A1 | 5/2020 | Sundermeyer et al. |
| 2020/0162890 | A1 | 5/2020 | Spencer et al. |
| 2020/0186612 | A1 | 6/2020 | Saint Clair |
| 2020/0196213 | A1 | 6/2020 | Cheng et al. |
| 2020/0257721 | A1 | 8/2020 | Mckinnon et al. |
| 2020/0273277 | A1 | 8/2020 | Kerning et al. |
| 2020/0279626 | A1 | 9/2020 | Ansari et al. |
| 2020/0328887 | A1 | 10/2020 | Kostiainen et al. |
| 2020/0333780 | A1 | 10/2020 | Kerzner |
| 2020/0380851 | A1 | 12/2020 | Farrand et al. |
| 2021/0029547 | A1 | 1/2021 | Beachem et al. |
| 2021/0099753 | A1 | 4/2021 | Connelly et al. |
| 2021/0153001 | A1 | 5/2021 | Eisner |
| 2021/0250726 | A1 | 8/2021 | Jones |
| 2021/0326451 | A1 | 10/2021 | Nunez Di Croce |
| 2022/0021552 | A1 | 1/2022 | Ansari et al. |
| 2022/0027051 | A1 | 1/2022 | Kant et al. |
| 2022/0029994 | A1 | 1/2022 | Choyi et al. |

FOREIGN PATENT DOCUMENTS

| | | | |
|---|---|---|---|
| AU | 2011250886 | A1 | 1/2013 |
| AU | 2013284428 | A1 | 2/2015 |
| AU | 2011305163 | B2 | 12/2016 |
| AU | 2017201365 | A1 | 3/2017 |
| AU | 2017201585 | A1 | 3/2017 |
| BE | 1008939 | A6 | 10/1996 |
| CA | 2203813 | A1 | 6/1996 |
| CA | 2174482 | A1 | 10/1997 |
| CA | 2346638 | A1 | 4/2000 |
| CA | 2389958 | A1 | 3/2003 |
| CA | 2878117 | A1 | 1/2014 |
| CA | 2559842 | C | 5/2014 |
| CA | 2992429 | A1 | 12/2016 |
| CA | 2976682 | A1 | 2/2018 |
| CA | 2976802 | A1 | 2/2018 |
| CN | 102834818 | A | 12/2012 |
| CN | 102985915 | A | 3/2013 |
| EP | 0295146 | A2 | 12/1988 |
| EP | 0308046 | A2 | 3/1989 |
| EP | 0591585 | A1 | 4/1994 |
| EP | 1117214 | A2 | 7/2001 |
| EP | 1119837 | A1 | 8/2001 |
| EP | 0978111 | | 11/2001 |
| EP | 1738540 | A2 | 1/2007 |
| EP | 1881716 | A1 | 1/2008 |
| EP | 2112784 | A1 | 10/2009 |
| EP | 2188794 | A1 | 5/2010 |
| EP | 2191351 | A1 | 6/2010 |
| EP | 2327063 | A1 | 6/2011 |
| EP | 2483788 | A1 | 8/2012 |
| EP | 2569712 | A1 | 3/2013 |
| EP | 2619686 | A1 | 7/2013 |
| EP | 2868039 | A2 | 5/2015 |
| EP | 3031206 | A2 | 6/2016 |
| EP | 3285238 | A2 | 2/2018 |
| EP | 3308222 | A1 | 4/2018 |
| FR | 2584217 | A1 | 1/1987 |
| FR | 2661023 | A1 | 10/1991 |
| FR | 2793334 | A1 | 11/2000 |
| GB | 2222288 | A | 2/1990 |
| GB | 2273593 | A | 6/1994 |
| GB | 2286423 | A | 8/1995 |
| GB | 2291554 | A | 1/1996 |
| GB | 2319373 | A | 5/1998 |
| GB | 2320644 | A | 6/1998 |
| GB | 2324630 | A | 10/1998 |
| GB | 2325548 | A | 11/1998 |
| GB | 2335523 | A | 9/1999 |
| GB | 2349293 | A | 10/2000 |
| GB | 2370400 | A | 6/2002 |
| GB | 2442628 | A | 4/2008 |
| GB | 2442633 | A | 4/2008 |
| GB | 2442640 | A | 4/2008 |
| GB | 2428821 | B | 6/2008 |
| IN | 45/2015 | | 11/2015 |
| IN | 04/2016 | | 1/2016 |
| JP | 63-033088 | A | 2/1988 |
| JP | 05-167712 | A | 7/1993 |
| JP | 06-339183 | A | 12/1993 |
| JP | 08-227491 | | 9/1996 |
| JP | 10-004451 | A | 1/1998 |
| JP | 2000-006343 | A | 1/2000 |
| JP | 2000-023146 | A | 1/2000 |

(56) References Cited

FOREIGN PATENT DOCUMENTS

| | | | |
|---|---|---|---|
| JP | 2000-278671 | A | 10/2000 |
| JP | 2001-006088 | A | 1/2001 |
| JP | 2001-006343 | A | 1/2001 |
| JP | 2001-069209 | A | 3/2001 |
| JP | 2002-055895 | | 2/2002 |
| JP | 2002-185629 | | 6/2002 |
| JP | 2003-085258 | A | 3/2003 |
| JP | 2003-141659 | A | 5/2003 |
| JP | 2003-281647 | A | 10/2003 |
| JP | 2004-192659 | A | 7/2004 |
| JP | 2006-094394 | A | 4/2006 |
| JP | 2007-529826 | A | 10/2007 |
| JP | 2009-213107 | A | 9/2009 |
| JP | 2010-140091 | A | 6/2010 |
| KR | 10-2005-0051577 | A | 6/2005 |
| KR | 10-2006-0021605 | A | 3/2006 |
| KR | 10-0771941 | B1 | 10/2007 |
| TW | 340934 | B | 9/1998 |
| TW | 1239176 | B | 9/2005 |
| TW | 201101243 | A | 1/2011 |
| TW | 201102976 | A | 1/2011 |
| TW | 201102978 | A | 1/2011 |
| TW | 1340934 | B | 4/2011 |
| TW | 201117141 | A | 5/2011 |
| TW | 1480839 | B | 4/2015 |
| TW | 1480840 | B | 4/2015 |
| TW | 1509579 | B | 11/2015 |
| TW | 1517106 | B | 1/2016 |
| WO | 89/07855 | A1 | 8/1989 |
| WO | 89/11187 | A1 | 11/1989 |
| WO | 94/03881 | A1 | 2/1994 |
| WO | 95/13944 | A1 | 5/1995 |
| WO | 96/36301 | A1 | 11/1996 |
| WO | 97/13230 | A2 | 4/1997 |
| WO | 98/25243 | A1 | 6/1998 |
| WO | 98/49663 | A1 | 11/1998 |
| WO | 98/52343 | A1 | 11/1998 |
| WO | 98/59256 | A2 | 12/1998 |
| WO | 99/34339 | A2 | 7/1999 |
| WO | 00/21053 | A1 | 4/2000 |
| WO | 00/36812 | A1 | 6/2000 |
| WO | 00/72598 | A1 | 11/2000 |
| WO | 01/11586 | A1 | 2/2001 |
| WO | 01/52478 | A2 | 7/2001 |
| WO | 01/71489 | A1 | 9/2001 |
| WO | 01/99078 | A2 | 12/2001 |
| WO | 02/11444 | A1 | 2/2002 |
| WO | 02/21300 | A1 | 3/2002 |
| WO | 02/97584 | A2 | 12/2002 |
| WO | 2002/100083 | | 12/2002 |
| WO | 2003/026305 | A1 | 3/2003 |
| WO | 03/40839 | A1 | 5/2003 |
| WO | 2004/004222 | A1 | 1/2004 |
| WO | 2004/098127 | A1 | 11/2004 |
| WO | 2004/107710 | A1 | 12/2004 |
| WO | 2005/091218 | A2 | 9/2005 |
| WO | 2007/038872 | A1 | 4/2007 |
| WO | 2007/124453 | A2 | 11/2007 |
| WO | 2008/056320 | A1 | 5/2008 |
| WO | 2009/006670 | A1 | 1/2009 |
| WO | 2009/023647 | A1 | 2/2009 |
| WO | 2009/029590 | A1 | 3/2009 |
| WO | 2009/029597 | A1 | 3/2009 |
| WO | 2009/064795 | A1 | 5/2009 |
| WO | 2009/145747 | A1 | 12/2009 |
| WO | 2010/019624 | A1 | 2/2010 |
| WO | 2010/025468 | A1 | 3/2010 |
| WO | 2010/127009 | A1 | 11/2010 |
| WO | 2010/127194 | A2 | 11/2010 |
| WO | 2010/127200 | A1 | 11/2010 |
| WO | 2010/127203 | A1 | 11/2010 |
| WO | 2011/038409 | A1 | 3/2011 |
| WO | 2011/063354 | A1 | 5/2011 |
| WO | 2011/143273 | A1 | 11/2011 |
| WO | 2012/040653 | A1 | 3/2012 |
| WO | 2014/004911 | A2 | 1/2014 |
| WO | 2015/021469 | A2 | 2/2015 |
| WO | 2015/134520 | A1 | 9/2015 |
| WO | 2015/176775 | A1 | 11/2015 |
| WO | 2016/201033 | A1 | 12/2016 |
| ZA | 201302668 | | 6/2014 |

OTHER PUBLICATIONS

US Patent Application filed on May 11, 2020, entitled "Control System User Interface", U.S. Appl. No. 16/871,151.

US Patent Application filed on May 12, 2020, entitled "IP Device Discovery Systems and Methods", U.S. Appl. No. 15/930,029.

US Patent Application filed on May 19, 2020, entitled "User Interface in a Premises Network", U.S. Appl. No. 16/878,099.

US Patent Application filed on May 23, 2018, entitled "Networked Touchscreen With Integrated Interfaces", U.S. Appl. No. 15/987,638.

US Patent Application filed on May 26, 2020, entitled "Premises Management Configuration and Control", U.S. Appl. No. 16/882,876.

US Patent Application filed on Jun. 1, 2012, entitled "Gateway Registry Methods and Systems", U.S. Appl. No. 13/486,276.

US Patent Application filed on Jun. 10, 2020, entitled "Method and System for Communicating With and Controlling an Alarm System From a Remote Server", U.S. Appl. No. 16/898,146.

US Patent Application filed on Jun. 24, 2020, entitled "Method and System for Processing Security Event Data", U.S. Appl. No. 16/910,967.

US Patent Application filed on Jun. 27, 2018, entitled "Activation of Gateway Device", U.S. Appl. No. 16/020,499.

US Patent Application filed on Jul. 2, 2019, entitled "Communication Protocols in Integrated Systems", U.S. Appl. No. 16/460,712.

US Patent Application filed on Jul. 3, 2018, entitled "WIFI-To-Serial Encapsulation in Systems", U.S. Appl. No. 16/026,703.

US Patent Application filed on Jul. 9, 2020, entitled "Automation System With Mobile Interface", U.S. Appl. No. 16/925,026.

US Patent Application filed on Jul. 12, 2018, entitled "Integrated Security System with Parallel Processing Architecture", U.S. Appl. No. 16/034,132.

US Patent Application filed on Jul. 20, 2018, entitled "Cross-Client Sensor User Interface in an Integrated Security Network", U.S. Appl. No. 16/041,291.

US Patent Application filed on Jul. 26, 2019, entitled "Device Integration Framework", U.S. Appl. No. 16/522,949.

US Patent Application filed on Jul. 28, 2016, entitled "Method and System for Automatically Providing Alternate Network Access for Telecommunications", U.S. Appl. No. 15/222,416.

US Patent Application filed on Aug. 8, 2016, entitled "Security, Monitoring and Automation Controller Access and Use of Legacy Security Control Panel Information", U.S. Appl. No. 15/231,273.

US Patent Application filed on Aug. 9, 2016, entitled "Controller and Interface for Home Security, Monitoring and Automation Having Customizable Audio Alerts for SMA Events", U.S. Appl. No. 15/232,135.

US Patent Application filed on Aug. 9, 2018, entitled "Method and System for Processing Security Event Data", U.S. Appl. No. 16/059,833.

US Patent Application filed on Aug. 21, 2018, entitled "Premises System Management Using Status Signal", U.S. Appl. No. 16/107,568.

US Patent Application filed on Aug. 23, 2019, entitled "Premises System Management Using Status Signal", U.S. Appl. No. 16/549,837.

US Patent Application filed on Aug. 26, 2020, entitled "Automation System User Interface With Three-Dimensional Display", U.S. Appl. No. 17/003,550.

US Patent Application filed on Sep. 6, 2018, entitled "Takeover of Security Network", U.S. Appl. No. 16/123,695.

US Patent Application filed on Sep. 10, 2020, entitled "Security System With Networked Touchscreen", U.S. Appl. No. 17/017,519.

US Patent Application filed on Sep. 11, 2020, entitled "Management of Applications for a Device Located at a Premises", U.S. Appl. No. 17/018,901.

US Patent Application filed on Sep. 17, 2018, entitled "Integrated Security System With Parallel Processing Architecture", U.S. Appl. No. 16/133,135.

US Patent Application filed on Sep. 27, 2019, entitled "Control System User Interface", U.S. Appl. No. 16/585,481.

(56) References Cited

OTHER PUBLICATIONS

US Patent Application filed on Sep. 28, 2018, entitled "Control System User Interface", U.S. Appl. No. 16/146,715.
US Patent Application filed on Sep. 28, 2018, entitled "Forming a Security Network Including Integrated Security System Componentsand Network Devices", U.S. Appl. No. 16/147,044.
US Patent Application filed on Sep. 11, 2018, entitled "Premises Management Networking", U.S. Appl. No. 16/128,089.
US Patent Application filed on Oct. 1, 2018, entitled "Integrated Security System With Parallel Processing Architecture", U.S. Appl. No. 16/148,387.
US Patent Application filed on Oct. 1, 2018, entitled "Integrated Security System with Parallel Processing Architecture", U.S. Appl. No. 16/148,411.
US Patent Application filed on Oct. 1, 2018, entitled "User Interface In A Premises Network", U.S. Appl. No. 16/148,572.
US Patent Application filed on Oct. 3, 2018, entitled "Activation of a Home Automation Controller", U.S. Appl. No. 16/150,973.
US Patent Application filed on Oct. 8, 2020, entitled "Communication Protocols in Integrated Systems", U.S. Appl. No. 17/065,841.
US Patent Application filed on Oct. 10, 2018, entitled "Method and System for Providing Alternate Network Access", U.S. Appl. No. 16/156,448.
US Patent Application filed on Oct. 12, 2020, entitled "Integrated Security System With Parallel Processing Architecture", U.S. Appl. No. 17/068,584.
US Patent Application filed on Oct. 13, 2017, entitled "Notification of Event Subsequent to Communication Failure With Security System", U.S. Appl. No. 15/783,858.
US Patent Application filed on Oct. 18, 2018, entitled "Generating Risk Profile Using Data of Home Monitoring and Security System", U.S. Appl. No. 16/164,114.
US Patent Application filed on Oct. 18, 2019, entitled "WIFI-To-Serial Encapsulation in Systems", U.S. Appl. No. 16/656,874.
US Patent Application filed on Oct. 27, 2017, entitled "Security System With Networked Touchscreen", U.S. Appl. No. 15/796,421.
US Patent Application filed on Nov. 10, 2020, entitled "Integrated Cloud System for Premises Automation", U.S. Appl. No. 17/094,120.
US Patent Application filed on Nov. 19, 2019, entitled "Integrated Cloud System With Lightweight Gateway for Premises Automation", U.S. Appl. No. 16/688,717.
US Patent Application filed on Nov. 25, 2020, entitled "Premises Management Networking", U.S. Appl. No. 17/105,235.
US Patent Application filed on Nov. 26, 2019, entitled "Communication Protocols Over Internet Protocol (IP) Networks", U.S. Appl. No. 16/696,657.
US Patent Application filed on Nov. 28, 2017, entitled "Forming a Security Network Including Integrated Security System Components", U.S. Appl. No. 15/824,503.
US Patent Application filed on Nov. 29, 18, entitled "Premise Management Systems and Methods", U.S. Appl. No. 16/204,442.
US Patent Application filed on Nov. 30, 2017, entitled "Controller and Interface for Home Security, Monitoring and Automation Having Customizable Audio Alerts for SMA Events", U.S. Appl. No. 15/828,030.
US Patent Application filed on Dec. 9, 2020, entitled "Integrated Security System With Parallel Processing Architecture", U.S. Appl. No. 17/115,936.
US Patent Application filed on Jun. 9, 2021, entitled "Premises Management Configuration and Control", U.S. Appl. No. 17/343,315.
US Patent Application filed on Jun. 18, 2021, entitled "Controlling Data Routing Among Networks", U.S. Appl. No. 17/304,342.
US Patent Application filed on Jul. 26, 2021, entitled "Notification of Event Subsequent To Communication Failure With Security System", U.S. Appl. No. 17/443,427.
US Patent Application filed on Jul. 30, 2021, entitled "Gateway Integrated With Premises Security System", U.S. Appl. No. 17/390,222.
PCT Application filed on Oct. 13, 2016, entitled "Coordinated Control of Connected Devices in a Premise", PCT/US2016/056842.
PCT Application filed on Nov. 17, 2016, entitled "Mobile Premises Automation Platform", PCT/US2016/062519.
Requirement for Restriction/Election dated Jan. 22, 2013 for U.S. Appl. No. 13/104,932, filed May 10, 2011.
Requirement for Restriction/Election dated Jan. 22, 2013 for U.S. Appl. No. 13/104,936, filed May 10, 2011.
Requirement for Restriction/Election dated Oct. 24, 2012 for U.S. Appl. No. 12/750,470, filed Mar. 30, 2010.
Security for the Future, Introducing 5804BO—Advanced two-way wireless remote technology, Advertisement, ADEMCO Group, Syosset, NY, circa 1997.
Shang, Wei-lai, Study on Application of Embedded Intelligent Area System, Journal of Anyang Institute of Technology, vol. 9, No. 6, pp. 56-57 and 65.
South African Patent App. No. 2013/02668, corresponds to W02012/040653.
Supplemental European Search Report for Application No. EP05725743.8 dated Sep. 14, 2010, 2 pages.
Supplementary European Search Report for Application No. EP10819658, dated Mar. 10, 2015,2 pages.
Supplementary European Search Report for Application No. EP11827671, dated Mar. 10, 2015, 2 pages.
Supplementary Partial European Search Report for Application No. EP09807196, dated Nov. 17, 2014, 5 pages.
Supplementary European Search Report for Application No. EP2191351, dated Jun. 23, 2014, 2 pages.
Supplementary Non-Final Office Action dated Oct. 28, 2010 for U.S. Appl. No. 12/630,092, filed Dec. 3, 2009.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
United States Patent and Trademark Office—Before the Patent Trial and Appeal Board, Alarm.com (U.S. Pat. No. 8,350,694B1) (inventors Stephen Scott Trundle & Alison Jane Slavin) V iControl Networks, Inc. (U.S. Appl. No. 13/311,365) (Inventors. Poul j. Dawes, Jim Fulker, Carolyn Wales, Reza Raji, and Gerald Gutt), Patent Interference 106,001 (HHB) (Technology Center 24000), Mar. 31, 2015.
US Patent Application filed on Jan. 3, 2019, entitled "Methods and Systems for Data Communication", U.S. Appl. No. 16/239,114.
US Patent Application filed on Jan. 11, 2021, entitled "Premise Management Systems and Methods", U.S. Appl. No. 17/145,773.
US Patent Application filed on Jan. 22, 2019, entitled "Data Model for Home Automation", U.S. Appl. No. 16/254,535.
US Patent Application filed on Jan. 22, 2019, entitled "Premises System Automation", U.S. Appl. No. 16/254,480.
US Patent Application filed on Jan. 23, 2020, entitled "Forming a Security Network Including Integrated Security System Components and Network Dev", U.S. Appl. No. 16/750,976.
US Patent Application filed on Jan. 25, 2019, entitled Communication Protocols in Integrated Systems, U.S. Appl. No. 16/257,706.
US Patent Application filed on Jan. 28, 2019, entitled "Automation System User Interface With Three-Dimensional Display", U.S. Appl. No. 16/258,858.
US Patent Application filed on Feb. 6, 2020, entitled "Activation of Gateway Device", U.S. Appl. No. 16/784,159.
US Patent Application filed on Mar. 2, 2017, entitled "Generating Risk Profile Using Data of Home Monitoring and Security System", U.S. Appl. No. 15/447,982.
US Patent Application filed on Mar. 2, 2020, entitled "Communication Protocols in Integrated Systems", U.S. Appl. No. 16/807,100.
US Patent Application filed on Mar. 2, 2020, entitled "Coordinated Control of Connected Devices in a Premise", U.S. Appl. No. 16/807,028.
US Patent Application filed on Mar. 7, 2014, entitled "Activation of Gateway Device", U.S. Appl. No. 14/201,162.
US Patent Application filed on Mar. 7, 2014, entitled "Communication Protocols in Integrated Systems", U.S. Appl. No. 14/200,921.
US Patent Application filed on Mar. 7, 2014, entitled "Device Integration Framework", U.S. Appl. No. 14/201,227.

(56) References Cited

OTHER PUBLICATIONS

US Patent Application filed on Mar. 7, 2014, entitled "Integrated Security and Control System With Geofencing", U.S. Appl. No. 14/201,189.
US Patent Application filed on Mar. 7, 2014, entitled "Security System Integrated With Social Media Platform", U.S. Appl. No. 14/201,133.
US Patent Application filed on Mar. 10, 2014, entitled "Communication Protocols in Integrated Systems", U.S. Appl. No. 14/202,573.
US Patent Application filed on Mar. 10, 2014, entitled "Communication Protocols in Integrated Systems", U.S. Appl. No. 14/202,592.
US Patent Application filed on Mar. 10, 2014, entitled "Communication Protocols in Integrated Systems", U.S. Appl. No. 14/202,627.
US Patent Application filed on Mar. 10, 2014, entitled "Communication Protocols in Integrated Systems", U.S. Appl. No. 14/202,685.
US Patent Application filed on Mar. 10, 2014, entitled "Communication Protocols in Integrated Systems", U.S. Appl. No. 14/203,077.
US Patent Application filed on Mar. 10, 2014, entitled "Communication Protocols in Integrated Systems", U.S. Appl. No. 14/203,084.
US Patent Application filed on Mar. 10, 2014, entitled "Communication Protocols in Integrated Systems", U.S. Appl. No. 14/203,128.
US Patent Application filed on Mar. 10, 2014, entitled "Communication Protocols in Integrated Systems", U.S. Appl. No. 14/203,141.
US Patent Application filed on Mar. 10, 2014, entitled "Communication Protocols in Integrated Systems", U.S. Appl. No. 14/203,219.
US Patent Application filed on Mar. 10, 2014, entitled "Communication Protocols Over Internet Protocol (IP) Networks", U.S. Appl. No. 14/202,505.
US Patent Application filed on Mar. 10, 2014, entitled "Communication Protocols Over Internet Protocol (IP) Networks", U.S. Appl. No. 14/202,579.
US Patent Application filed on Mar. 11, 2020, entitled "Management of a Security System at a Premises", U.S. Appl. No. 16/816,134.
US Patent Application filed on Mar. 18, 2019, entitled "Server-Based Notification of Alarm Event Subsequent to Communication Failure With Armed Security System", U.S. Appl. No. 16/356,742.
US Patent Application filed on Mar. 20, 2020, entitled "Security, Monitoring and Automation Controller Access and Use of Legacy Security Control Panel Information", U.S. Appl. No. 16/825,099.
US Patent Application filed on Apr. 17, 2020, entitled "Method and System for Providing Alternate Network Access", U.S. Appl. No. 16/852,072.
US Patent Application filed on Apr. 17, 2020, entitled "Networked Touchscreen With Integrated Interfaces", U.S. Appl. No. 16/852,058.
US Patent Application filed on Apr. 23, 2019, entitled "Control System User Interface", U.S. Appl. No. 16/391,625.
US Patent Application filed on Apr. 26, 2019, entitled "Custom Content for Premises Management", U.S. Appl. No. 16/396,368.
US Patent Application filed on Dec. 14, 2018, entitled "Communication Protocols Over Internet Protocol (IP) Networks", U.S. Appl. No. 16/221,299.
US Patent Application filed on Dec. 27, 2018, entitled "Communication Protocols in Integrated Systems", U.S. Appl. No. 16/233,913.
US Patent Application filed on Dec. 27, 2019, entitled "Premises Management Systems", U.S. Appl. No. 16/728,608.
US Patent Application filed on Aug. 9, 18, entitled "Method and Systems for Processing Security Event Data", U.S. Appl. No. 16/059,833.
Valtchev, D., and I. Frankov. "Service gateway architecture for a smart home." Communications Magazine, IEEE 40.4 (2002): 126-132.
Visitalk, Communication with Vision, http://www.visitalk.jimbo.com; website accessed Jan. 10, 2018.
Wang et al, "A Large Scale Video Surveillance System with Heterogeneous Information Fusion and Visualization for Wide Area Monitoring," 2012 Eighth International Conference on Intelligent Information Hiding and Multimedia Signal Processing, Piraeus, 2012, pp. 178-181.
Wilkinson, S: "Logitech Harmony One Universal Remote" Ultimate AV magazine May 2008 (May 2008), XP002597782 Retrieved from the Internet: Original URL: http://www.ultimateavmag.com/remotecontrols/508logi) [retrieved on Aug. 23, 2010] the whole document; Updated URL: https://www.soundandvision.com/content/logitech-harmony-one-universal-remote, Retrieved from internet on Jan. 11, 2018.
Windows Telecom Dictionary, Mar. 2005, pp. 937-938.
Windows, Newton's Telecom Dictionary, 21st Edition, Mar. 2005, 937-938.
Wireless, Battery-Powered Smoke Detectors, Brochure, SafeNight Technology, Inc. Roanoke, VA, 1995.
WLS906 Photoelectric Smoke Alarm, Data Sheet, DSC Security Products, Ontario, Canada, Jan. 1998.
X10—ActiveHome, Home Automation Made Easy [retrieved on Nov. 4, 2003], 3 pages.
Yanni Zhai et al., Design of Smart Home Remote Monitoring System Based on Embedded System, 2011 IEEE 2nd International Conference on Computing, Control and Industrial Engineering, vol. 2, pp. 41-44.
Indian Patent App. No. 10698/DELNP/2012, corresponds to W02011/143273.
"Associate". Merriaim-Webster.com Dictionary, Merriam-Webster, https://web.archive.org/web/20061209213742/https7/www.merriam-webster.com/dictionary/associate. Dec. 9, 2006.
"dragging" The Authoritative Dictionary of IEEE Standard Terms. 7th ed. 2000, p. 337.
"File", The Authoritative Dictionary of IEEE Standard Terms. 7th ed. 2000, p. 432.
"Indicate". Merriam-Webster.com Dictionary, Merriam-Webster, https://web.archive.org/web/20061209080613/https://www.merriam-webster.com/dictionary/indicate. Dec. 9, 2006.
"Application" The Authoritative Dictionary of IEEE Standard Terms. 7th ed. 2000.
"Icon", Newton's Telecom Dictionary, 21st ed., Mar. 2005.
"Modular programming", The Authoritative Dictionary of IEEE Standard Terms. 7th ed. 2000.
"Windows". Newton's Telecom Dictionary, 21st ed., Mar. 2005.
6270 Touch Screen Keypad Notes, Floneywell, Sep. 2006.
6270 Touch Screen Keypad Notes, Honeywell, Sep. 2006.
Alarm.com—Interactive Security Systems, Elders [retrieved on Nov. 4, 2003-11], 1 page.
Alarm.com—Interactive Security Systems, Frequently Asked Questions [retrieved on Nov. 4, 2003], 3 pages.
Alarm.com—Interactive Security Systems, Overview [retrieved on Nov. 4, 2003], 2 pages.
Alarm.com—Interactive Security Systems, Product Advantages [retrieved on Nov. 4 2003], 3 pages.
AU application filed on Feb. 28, 2017, entitled "Control System User Interface", 2017201365.
AU application filed on Mar. 8, 2017, entitled "Integrated Security Network with Security Alarm Signaling System", 2017201585.
CA application filed on Aug. 15, 2017, entitled "Automation System User Interface", 2976682.
CA application filed on Aug. 16, 2017, entitled "Automation System User Interface", 2976802.
Condry M et al., Open Service Gateway architecture overview, Industrial Electronics Society, 1999, IECON '99 Proceedings, The 25th Annual Conference of the IEEE, San Jose, CA, USA, Nov. 29-Dec. 3, 1999, Piscataway, NJ, USA, IEEE, US, vol. 2, Nov. 29, 1999 (Nov. 29, 1999), pp. 735-742, XP010366642.
Control Panel Standard—Features for False Alarm Reduction, The Security Industry Association, SIA 2009, pp. 1-48.
CorAccess Systems, Companion 6 User Guide, Jun. 17, 2002.
Court action filed for U.S. Pat. No. 7,262,690; U.S. Pat. No. 7,911,341; U.S. Pat. No. 8,073,931; U.S. Pat. No. 8,335,842; U.S. Pat. No. 8,473,619; U.S. Pat. No. 8,478,844 in U.S. District Court, Estern District of Virginia, Case No. 1:13-CV-00834, between *iControl Networks, Inc.* (Plaintiff) vs *Alarm.com Incorporated et al.* (Defendant) on Jul. 10, 2013.
Diaz, Redondo R P et al., Enhancing Residential Gateways: OSGI Service Composition, IEEE Transactions on Consumer Electronics, IEEE Service Center, New York, NY, US, vol. 53, No. 1, Feb. 1, 2007 (Feb. 1, 2007), pp. 87-95, XP011381790.

(56) References Cited

OTHER PUBLICATIONS

Elwahab et al.; Device, System and . . . Customer Premises Gateways, Sep. 27, 2001; WO 01/71489.
EP application filed on Jun. 9, 2016, entitled, "Data Model for Home Automation", 16808247.7.
EP application filed on Aug. 16, 2017, entitled, "Automation System User Interface", 17186497.8.
EP examination report issued in EP08797646.0, dated May 17, 2017, 11 pages.
Examination Report under Section 18(3) re for UK Patent Application No. GB0620362.4, dated Aug. 13, 2007.
Examination Report under Section 18(3) re for UK Patent Application No. GB0724248.0, dated Jun. 4, 2008.
Examination Report under Section 18(3) re for UK Patent Application No. GB0724248.0, dated Jan. 30, 2008.
Examination Report under Section 18(3) re for UK Patent Application No. GB0724760.4, dated Jan. 30, 2008.
Examination Report under Section 18(3) re for UK Patent Application No. GB0800040.8, dated Jan. 30, 2008.
Faultline, "AT&T Targets video home security as next broadband market"; Nov. 2, 2006; The Register; 2 Pages.
Final Office Action dated Aug. 1, 2011 for U.S. Appl. No. 12/630,092, filed Dec. 3, 2009.
Final Office Action dated Jun. 1, 2009 for U.S. Appl. No. 11/084,232, filed Mar. 16, 2005.
Final Office Action dated Jun. 5, 2012 for U.S. Appl. No. 12/771,071, filed Apr. 30, 2010.
Final Office Action dated May 9, 2013 for U.S. Appl. No. 12/189,780, filed Aug. 11, 2008.
Final Office Action dated May 9, 2013 for U.S. Appl. No. 12/952,080, filed Nov. 22, 2010.
Final Office Action dated Jan. 10, 2011 for U.S. Appl. No. 12/189,785, filed Aug. 11, 2008.
Final Office Action dated Jun. 10, 2011 for U.S. Appl. No. 11/084,232, filed Mar. 16, 2005.
Final Office Action dated Jan. 13, 2011 for U.S. Appl. No. 12/189,780, filed Aug. 11, 2008.
Final Office Action dated Oct. 17, 2012 for U.S. Appl. No. 12/637,671, filed Dec. 14, 2009.
Final Office Action dated Sep. 17, 2012 for U.S. Appl. No. 12/197,958, filed Aug. 25, 2008.
Final Office Action dated Mar. 21, 2013 for U.S. Appl. No. 12/691,992, filed Jan. 22, 2010.
Final Office Action dated Jul. 23, 2013 for U.S. Appl. No. 13/531,757, filed Jun. 25, 2012.
Final Office Action dated Feb. 26, 2013 for U.S. Appl. No. 12/771,471, filed Apr. 30, 2010.
Final Office Action dated Jun. 29, 2012 for U.S. Appl. No. 12/539,537, filed Aug. 11, 2009.
Final Office Action dated Dec. 31, 2012 for U.S. Appl. No. 12/770,365, filed Apr. 29, 2010.
Final Office Action dated Oct. 31, 2012 for U.S. Appl. No. 12/771,624, filed Apr. 30, 2010.
3rd Generation Partnership Project! Technical Specification Group Services and System Aspects! Architecture enhancements to facilitate communications with packet data networks and application, Mar. 2015, 3GPP TS 23.682 V12.3.0, pp. 8-10. (Year: 2015).
Chapter6, Securing TCP/IP, pp. 135-164, Oct. 12, 2004.
K. Lee, D. Murray, D. Hughes and W. Joosen, "Extending sensor networks into the Cloud using Amazon Web Services," 2010 IEEE International Conference on Networked Embedded Systems for Enterprise Applications, 2010.
Oxford Dictionary, Definition of "application", 2021, 2 pages (Year: 2021).
US Patent Application filed on Mar. 15, 2021, entitled "Automation System User Interface", U.S. Appl. No. 17/202,279.
US Patent Application filed on Mar. 17, 2021, entitled "Communication Protocols Over Internet Protocol (IP) Networks", U.S. Appl. No. 17/204,068.
US Patent Application filed on Mar. 22, 2021, entitled "Premises Management Configuration and Control", U.S. Appl. No. 17/208,866.
US Patent Application filed on Apr. 8, 2021, entitled "System for Data Routing In Networks", U.S. Appl. No. 17/301,605.
US Patent Application filed on May 10, 2021, entitled "Management of a Security System at a Premises", U.S. Appl. No. 17/316,402.
Indian Patent App. No. 3687/DELNP/2012, corresponds to W02011/038409 filed on Sep. 28, 2010.
International Search Report for Application No. PCT/US13/48324, dated Jan. 14, 2014, 2 pages.
International Search Report for Application No. PCT/US2014/050548, dated Mar. 18, 2015, 4 pages.
J. David Eisenberg, SVG Essentials: Producing Scalable Vector Graphics with XML. O'Reilly & Associates, Inc., Sebastopol, CA 2002.
Lagotek Wireless Home Automation System, May 2006 [retrieved on Aug. 22, 2012].
Network Working Group, Request for Comments H.Schulzrinne Apr. 1998.
Non-Final Office Action dated Apr. 4, 2013 for U.S. Appl. No. 12/197,931, filed Aug. 25, 2008.
Non-Final Office Action dated Mar. 4, 2013 for U.S. Appl. No. 13/400,477, filed Feb. 20, 2012.
Non-Final Office Action dated May 5, 2010 for U.S. Appl. No. 12/189,780, filed Aug. 11, 2008.
Non-Final Office Action dated May 5, 2010 for U.S. Appl. No. 12/189,785, filed Aug. 11, 2008.
Non-Final Office Action dated Feb. 7, 2012 for U.S. Appl. No. 12/637,671, filed Dec. 14, 2009.
Non-Final Office Action dated Feb. 7, 2013 for U.S. Appl. No. 12/970,313, filed Dec. 16, 2010.
Non-Final Office Action dated Feb. 8, 2012 for U.S. Appl. No. 12/630,092, filed Dec. 3, 2009.
Non-Final Office Action dated Apr. 9, 2012 for U.S. Appl. No. 12/771,624, filed Apr. 30, 2010.
Non-Final Office Action dated Dec. 9, 2008 for U.S. Appl. No. 11/084,232, filed Mar. 16, 2005.
Non-Final Office Action dated Aug. 10, 2012 for U.S. Appl. No. 12/771,471, filed Apr. 30, 2010.
Non-Final Office Action dated Oct. 11, 2012 for U.S. Appl. No. 12/019,568, filed Jan. 24, 2008.
Non-Final Office Action dated Apr. 12, 2012 for U.S. Appl. No. 12/770,365, filed Apr. 29, 2010.
Non-Final Office Action dated Jul. 12, 2012 for U.S. Appl. No. 12/691,992, filed Jan. 22, 2010.
Non-Final Office Action dated Oct. 12, 2012 for U.S. Appl. No. 12/630,092, filed Dec. 3, 2009.
Non-Final Office Action dated Sep. 12, 2012 for U.S. Appl. No. 12/952,080, filed Nov. 22, 2010.
Non-Final Office Action dated Jul. 13, 2010 for U.S. Appl. No. 12/019,568, filed Jan. 24, 2008.
Non-Final Office Action dated Nov. 14, 2012 for U.S. Appl. No. 13/531,757, filed Jun. 25, 2012.
Non-Final Office Action dated Sep. 14, 2010 for U.S. Appl. No. 11/084,232, filed Mar. 16, 2005.
Non-Final Office Action dated Sep. 16, 2011 for U.S. Appl. No. 12/539,537, filed Aug. 11, 2009.
Non-Final Office Action dated Sep. 17, 2012 for U.S. Appl. No. 12/189,780, filed Aug. 11, 2008.
Non-Final Office Action dated Aug. 18, 2011 for U.S. Appl. No. 12/197,958, filed Aug. 25, 2008.
Non-Final Office Action dated Feb. 18, 2011 for U.S. Appl. No. 12/630,092, filed Dec. 3, 2009.
Non-Final Office Action dated Jan. 18, 2012 for U.S. Appl. No. 12/771,071, filed Apr. 30, 2010.
Non-Final Office Action dated Jul. 21, 2010 for U.S. Appl. No. 12/630,092, filed Dec. 3, 2009.
Non-Final Office Action dated Dec. 22, 2010 for U.S. Appl. No. 12/197,931, filed Aug. 25, 2008.
Non-Final Office Action dated Jul. 22, 2013 for U.S. Appl. No. 12/630,092, filed Dec. 3, 2009.
Non-Final Office Action dated Jan. 26, 2012 for U.S. Appl. No. 12/019,568, filed Jan. 24, 2008.

(56) References Cited

OTHER PUBLICATIONS

Non-Final Office Action dated Nov. 26, 2010 for U.S. Appl. No. 12/197,958, filed Aug. 25, 2008.
Non-Final Office Action dated Jun. 27, 2013 for U.S. Appl. No. 12/019,568, filed Jan. 24, 2008.
Non-Final Office Action dated Dec. 30, 2009 for U.S. Appl. No. 11/084,232, filed Mar. 16, 2005.
Non-Final Office Action dated May 30, 2008 for U.S. Appl. No. 11/084,232, filed Mar. 16, 2005.
Non-Final Office Action dated Apr. 13, 2010 for U.S. Appl. No. 11/761,745, filed Jun. 12, 2007.
Non-Final Office Action dated Feb. 21, 2013 for U.S. Appl. No. 12/771,372, filed Apr. 30, 2010.
Non-Final Office Action dated Jan. 5, 2010 for U.S. Appl. No. 12/019,554, filed Jan. 24, 2008.
Non-Final Office Action dated May 23, 2013 for U.S. Appl. No. 13/104,932, filed May 10, 2011.
Non-Final Office Action dated May 23, 2013 for U.S. Appl. No. 13/104,936, filed May 10, 2011.
Notice of Allowance dated May 14, 2013 for U.S. Appl. No. 12/637,671, filed Dec. 14, 2009.
Notice of Allowance dated Oct. 25, 2012 for U.S. Appl. No. 11/084,232, filed Mar. 16, 2005.
PCT Application filed on Jun. 9, 2016, entitled "Virtual Device Systems and Methods", PCT/US2016/036674.
PCT Application filed on Jun. 29, 2016, entitled "Integrated Cloud System for Premises Automation", PCT/US2016/040046.
PCT Application filed on Jun. 30, 2016, entitled "Integrated Cloud System with Lightweight Gateway for Premises Automation", PCT/US2016/040451.
PCT Application filed on Jul. 7, 2016, entitled "Automation System User Interface with Three-Dimensional Display", PCT/US2016/041353.
PCT Application filed on Aug. 16, 2016, entitled "Automation System User Interface", PCT/US2016/047172.
PCT Application filed on Aug. 17, 2016, entitled "Automation System User Interface", PCT/US2016/047262.
Final Office Action dated Feb. 16, 2011 for U.S. Appl. No. 12/019,568, filed Jan. 24, 2008.
Final Office Action dated Jul. 12, 2010 for U.S. Appl. No. 12/019,554, filed Jan. 24, 2008.
Final Office Action dated Sep. 14, 2011 for U.S. Appl. No. 12/197,931, filed Aug. 25, 2008.
Foreign communication from a related counterpart application-International Preliminary Examination Report, App No. PCT/US02/14450, dated Mar. 2, 2004, 4 pgs.
Foreign communication from a related counterpart application-International Search Report, App No. PCT/US02/14450, dated Dec. 17, 2002, 6 pgs.
Form PCT/ISA/210, "PCT International Search Report for the Application No. PCT/US08/72831," dated Nov. 4, 2008, 2 pages.
Form PCT/ISA/210, "PCT International Search Report for the Application No. PCT/US08/74246," dated Nov. 14, 2008, 2 pages.
Form PCT/ISA/210, "PCT International Search Report for the Application No. PCT/US08/74260," dated Nov. 13, 2008, 2 pages.
Form PCT/ISA/210, "PCT International Search Report for the Application No. PCT/US08/83254," dated Jan. 14, 2009, 2 pages.
Form PCT/ISA/210, "PCT International Search Report for the Application No. PCT/US09/53485," dated Oct. 22, 2009, 2 pages.
Form PCT/ISA/210, "PCT International Search Report for the Application No. PCT/US09/55559," dated Nov. 12, 2009, 2 pages.
Form PCT/ISA/210, "PCT International Search Report for the Application No. PCT/US10/50585," dated Dec. 30, 2010, 2 pages.
Form PCT/ISA/210, "PCT International Search Report for the Application No. PCT/US10/57674," dated Mar. 2, 2011,2 pages.
Form PCT/ISA/210, "PCT International Search Report for the Application No. PCT/US11/34858," dated Oct. 3, 2011, 2 pages.
Form PCT/ISA/210, "PCT International Search Report for the Application No. PCT/US11/35994," dated Sep. 28, 2011, 2 pages.
Form PCT/ISA/210, "PCT International Search Report for the Application No. PCT/US11/53136," dated Jan. 5, 2012, 2 pages.
Form PCT/ISA/210, "PCT International Search Report," 2 pgs.
Form PCT/ISA/220, "PCT Notification of Transmittal of the International Search Report and the Written Opinion fo the International Searching Authority, or the Declaration for the Application No. PCT/US08/74260," dated Nov. 13, 2008, 1 page.
Form PCT/ISA/220, "PCT Notification of Transmittal of the International Search Report and the Written Opinion for the International Searching Authority, or the Declaration for the Application No. PCT/US08/74260," dated Nov. 13, 2008, 1 page.
Form PCT/ISA/220, "PCT Notification of Transmittal of the International Search Report and the Written Opinion of the International Searching Authority, or the Declaration for the Application No. PCT/US08/72831," dated Nov. 4, 2008, 1 page.
Form PCT/ISA/220, "PCT Notification of Transmittal of the International Search Report and the Written Opinion of the International Searching Authority, or the Declaration for the Application No. PCT/US08/74246" dated Nov. 14, 2008, 1 page.
Form PCT/ISA/220, "PCT Notification of Transmittal of the International Search Report and the Written Opinion of the International Searching Authority, or the Declaration for the Application No. PCT/US08/83254," dated Jan. 14, 2009, 1 page.
Form PCT/ISA/220, "PCT Notification of Transmittal of the International Search Report and the Written Opinion of the International Searching Authority, or the Declaration for the Application No. PCT/US09/53485," dated Oct. 22, 2009, 1 page.
Form PCT/ISA/220, "PCT Notification of Transmittal of the International Search Report and the Written Opinion of the International Searching Authority, or the Declaration for the Application No. PCT/US09/55559," dated Nov. 12, 2009, 1 page.
Form PCT/ISA/220, "PCT Notification of Transmittal of the International Search Report and the Written Opinion of the International Searching Authority, or the Declaration for the Application No. PCT/US10/50585," dated Dec. 30, 2010, 1 page.
Form PCT/ISA/220, "PCT Notification of Transmittal of the International Search Report and the Written Opinion of the International Searching Authority, or the Declaration for the Application No. PCT/US10/57674," dated Mar. 2, 2011, 1 page.
Form PCT/ISA/220, "PCT Notification of Transmittal of the International Search Report and the Written Opinion of the International Searching Authority, or the Declaration for the Application No. PCT/US11/35994," dated Sep. 28, 2011, 1 page.
Form PCT/ISA/220, "PCT Notification of Transmittal of the International Search Report and the Written Opinion of the International Searching Authority, or the Declaration," 1 pg.
Form PCT/ISA/220, PCT Notification of Transmittal of the International Search Report and the Written Opinion of the International Searching Authority, or the Declaration for the Application No. PCT/US05/08766, dated May 23, 2006, 1 page.
Form PCT/ISA/237, "PCT Written Opinion of the International Searching Authority for the Application No. PCT/US08/72831," dated Nov. 4, 2008, 6 pages.
Form PCT/ISA/237, "PCT Written Opinion of the International Searching Authority for the Application No. PCT/US08/74246," dated Nov. 14, 2008, 6 pages.
Form PCT/ISA/237, "PCT Written Opinion of the International Searching Authority for the Application No. PCT/US08/74260," dated Nov. 13, 2008, 6 pages.
Form PCT/ISA/237, "PCT Written Opinion of the International Searching Authority for the Application No. PCT/US09/53485," dated Oct. 22, 2009, 8 pages.
Form PCT/ISA/237, "PCT Written Opinion of the International Searching Authority for the Application No. PCT/US09/55559," dated Nov. 12, 2009, 6 pages.
Form PCT/ISA/237, "PCT Written Opinion of the International Searching Authority for the Application No. PCT/US10/50585," dated Dec. 30, 2010, 7 pages.
Form PCT/ISA/237, "PCT Written Opinion of the International Searching Authority for the Application No. PCT/US 10/57674," dated Mar. 2, 2011, 6 pages.

(56) References Cited

OTHER PUBLICATIONS

Form PCT/ISA/237, "PCT Written Opinion of the International Searching Authority for the Application No. PCT/US11/34858," dated Oct. 3, 2011, 8 pages.
Form PCT/ISA/237, "PCT Written Opinion of the International Searching Authority for the Application No. PCT/US11/35994," dated Sep. 28, 2011, 11 pages.
Form PCT/ISA/237, "PCT Written Opinion of the International Searching Authority for the Application No. PCT/US11/53136," dated Jan. 5, 2012.
Form PCT/ISA/237, "PCT Written Opinion of the International Searching Authority of the Application No. PCT/US08/83254," dated Jan. 14, 2009, 7 pages.
Gateway Registry Methods and Systems, U.S. Appl. No. 13/486,276, filed Jun. 1, 2012.
Genex OmniEye http://www.qenextech.com/prod01.htm, 1999 5 pages.
Genex Technologies, Genex OmniEye, www.av-iq.com/avcat/images/documents/pdfs/omnieye%20nightwatchbrochure.pdf; webpage accessed Jan. 10, 2018.
Gong, Li, A Software architecture for open service gateways, Internet Computing, IEEE 5.1, Jan.-Feb. 2001, 64-70.
GrayElectronics, "Digitizing TV cameras on TCP/IP Computer Networks," http://www.grayelectronics.com/default.htm, printed on Oct. 12, 1999 (2 pages).
GrayElectronics, http://www.grayelectronics.com; webpage accessed on Jan. 10, 2018.
GTI Genex Technologies, Inc. OmniEye.(Trademark). Product Brochure, Sep. 14, 1999 (5 pages).
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
Indian Patent App. No. 10698/DELNP/2012, corresponds to WO2011/143273.
US Patent Application filed on Jan. 14, 2022, entitled "Mobile Premises Automation Platform", U.S. Appl. No. 17/576,336.
US Patent Application filed on Nov. 15, 2021, entitled "Communication Protocols in Integrated Systems", U.S. Appl. No. 17/526,915.
US Patent Application filed on Nov. 15, 2021, entitled "Integrated Cloud System With Lightweight Gateway for Premises Automation", U.S. Appl. No. 17/455,005.
US Patent Application filed on Nov. 23, 2021, entitled "Security, Monitoring and Automation Controller Access and Use of Legacy Security Control Panel Information", U.S. Appl. No. 17/534,088.
US Patent Application filed on Dec. 3, 2021, entitled "Communication Protocols in Integrated Systems", U.S. Appl. No. 17/542,302.
US Patent Application filed on Dec. 3, 2021, entitled "Control System User Interface", U.S. Appl. No. 17/457,463.
US Patent Application filed on Dec. 3, 2021, entitled "Method and System for Managing Communication Connectivity", U.S. Appl. No. 17/542,310.
US Patent Application filed on Dec. 17, 2021, entitled "Cross-Client Sensor User Interface in an Integrated Security Network", U.S. Appl. No. 17/644,935.
US Patent Application filed on Dec. 23, 2021, entitled "Defining and Implementing Sensor Triggered Response Rules", U.S. Appl. No. 17/645,889.
US Patent Application filed on Aug. 10, 2021, entitled "Media Content Management", U.S. Appl. No. 17/398,939.
US Patent Application filed on Aug. 16, 2021, entitled "Control System User Interface", U.S. Appl. No. 17/403,526.
US Patent Application filed on Aug. 23, 2021, entitled "Method and System for Providing Alternate Network Access", U.S. Appl. No. 17/409,528.
US Patent Application filed on Aug. 31, 2021, entitled "Networked Touchscreen With Integrated Interfaces", U.S. Appl. No. 17/463,267.
US Patent Application filed on Sep. 7, 2021, entitled "Gateway Registry Methods and Systems", U.S. Appl. No. 17/468,188.
US Patent Application filed on Sep. 8, 2021, entitled "User Interface in a Premises Network", U.S. Appl. No. 17/469,417.
US Patent Application filed on Sep. 9, 2021, entitled "Premises System Management Using Status Signal", U.S. Appl. No. 17/470,732.
US Patent Application filed on Oct. 25, 2021, entitled "Forming a Security Network Including Integrated Security System Components and Network Devices", U.S. Appl. No. 17/510,022.

* cited by examiner

System Architecture

Gateway Data Handling

Binding Data Flow

Camera Image/Video Architecture

PREMISES MANAGEMENT NETWORKING

CROSS REFERENCE TO RELATED APPLICATIONS

This application is a continuation of U.S. patent application Ser. No. 17/105,235, filed on Nov. 25, 2020, which is a continuation of U.S. patent application Ser. No. 16/128,089, filed on Sep. 11, 2018, issued as U.S. Pat. No. 10,890,881 on Jan. 12, 2021, which is a continuation of U.S. patent application Ser. No. 13/718,851, filed on Dec. 18, 2012, issued as U.S. Pat. No. 10,156,831 on Dec. 18, 2018, which is a continuation of U.S. patent application Ser. No. 11/084,232, filed Mar. 16, 2005, issued as U.S. Pat. No. 8,335,842 on Dec. 18, 2012, each of which are hereby incorporated by reference in their entirety.

U.S. patent application Ser. No. 11/084,232 claims the benefit of U.S. provisional application No. 60/652,475, filed on Feb. 11, 2005;

and claims the benefit of U.S. provisional application No. 60/553,934, filed Mar. 16, 2004;

and claims the benefit of U.S. provisional application No. 60/553,932 filed Mar. 16, 2004, each of which are hereby incorporated by reference in their entirety.

BACKGROUND

Vendors such as premises vendors, communication service vendors, and Internet portal vendors need a solution for extending their relationship with vendees beyond the immediate transaction. Additionally, vendees desire additional premises management services beyond the immediate transaction for premises, communication services, or Internet portals. There is a need for advanced premises management services.

DETAILED DESCRIPTION OF THE INVENTION

Figure 1:
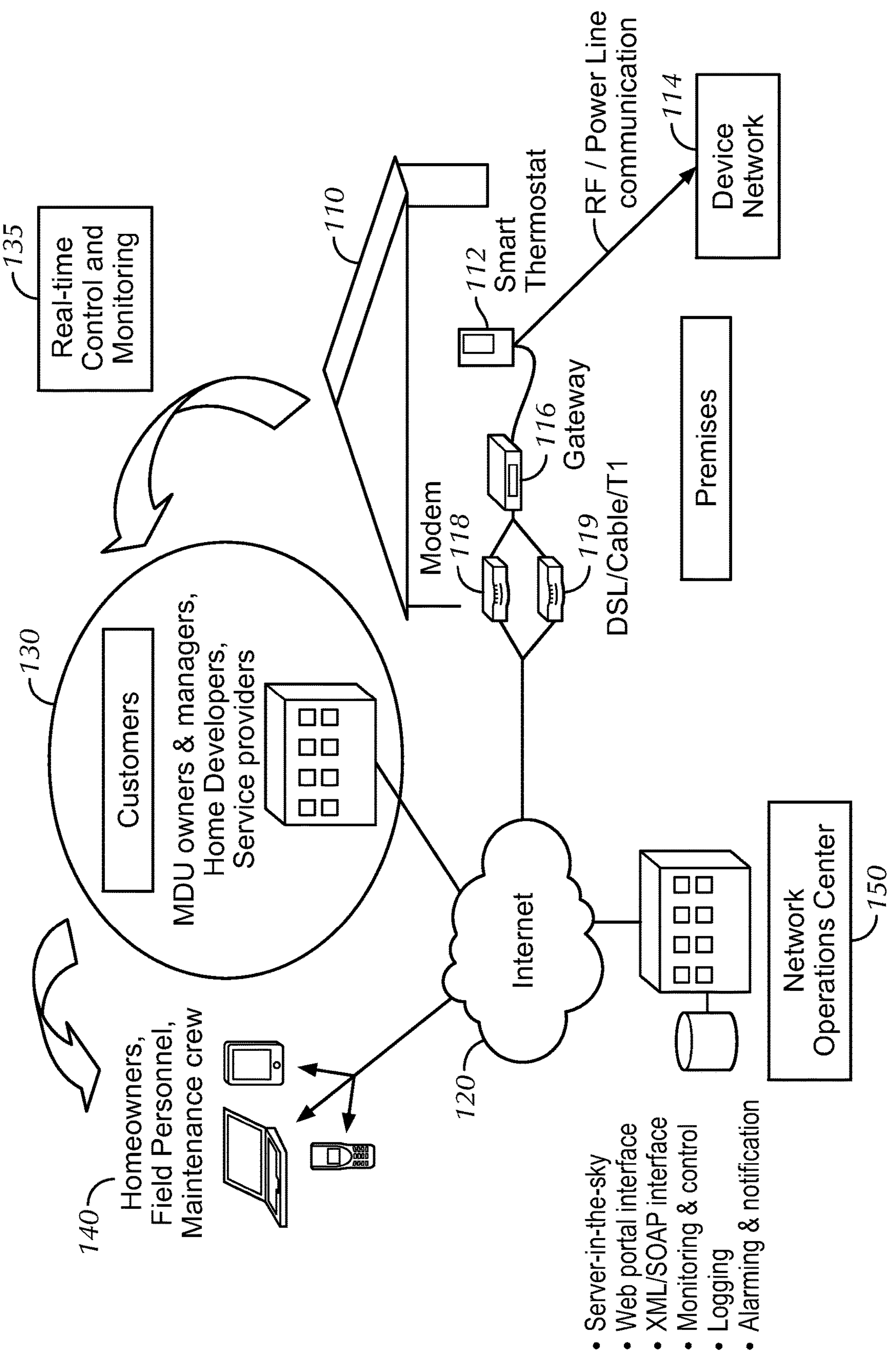
FIG. 1 shows an example of an overall network for premises management.

FIG. 1 shows an example of an overall network for premises management. A premises 110 has premises management devices such as a smart thermostat 112. The premises management devices are connected to a premises network 114 which can be, for example, an RF and/or power line network. The premises network 114 is connected to a gateway 116 which in turn is connected to a broadband device 119 such as a DSL, cable, or T1 line. The gateway 116 can alternatively or also be connected to a dial up modem 118. The premises 110 is connected to the Internet 120. The Internet 120 is connected to system managers at the network operations center 150. The Internet 120 is also connected to customers of the system manager, for example vendors such as premises vendors, communication service vendors, or Internet portal vendors. The Internet 120 is also connected to vendees 140, such as premises vendees, communication service vendees, or Internet portal vendees.

Figure 2:
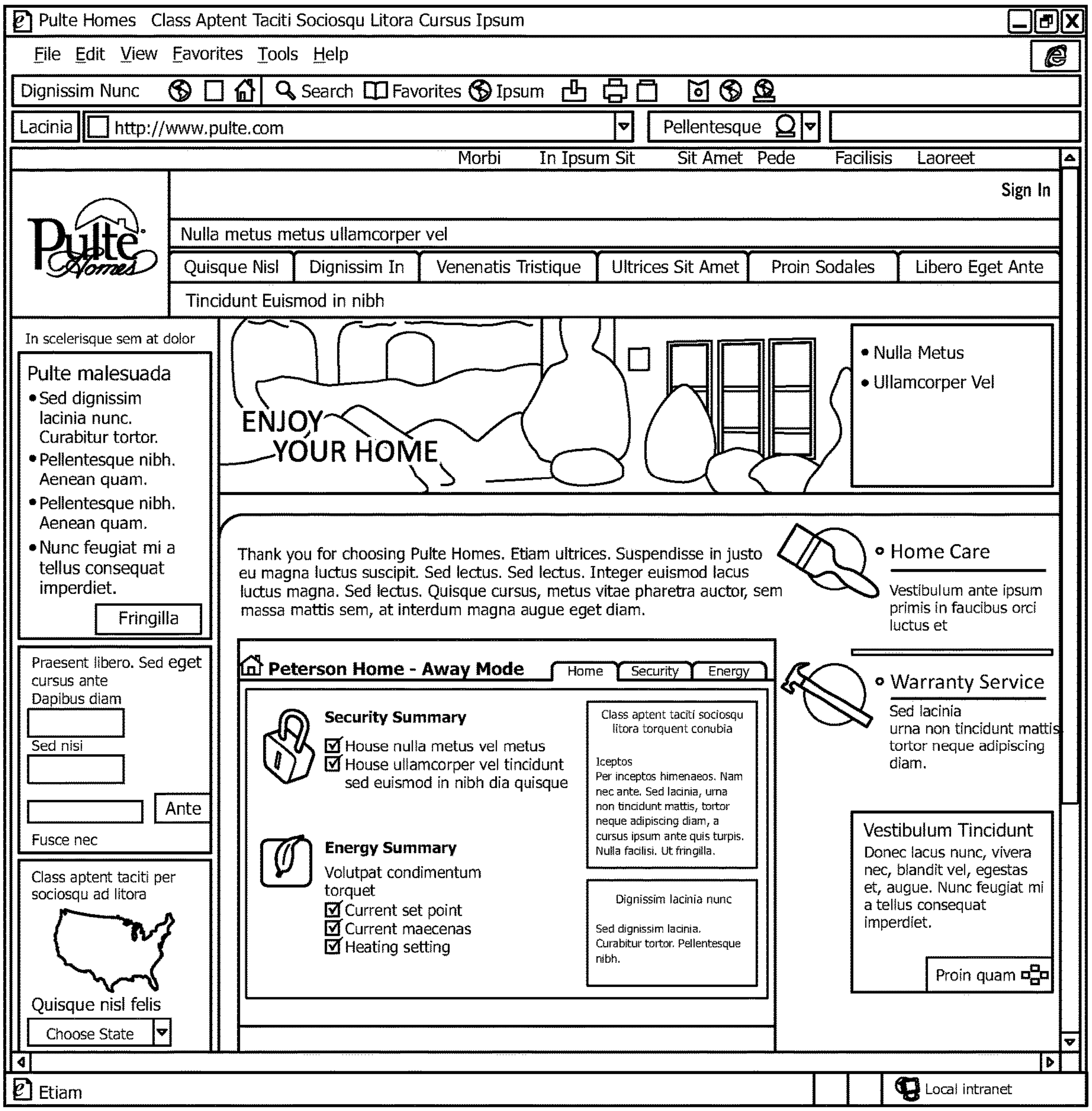
FIG. 2 shows an example of a homebuilder-branded Internet portal for premises management.

FIG. 2 shows an example of a homebuilder-branded Internet portal for premises management.

Figure 3A:
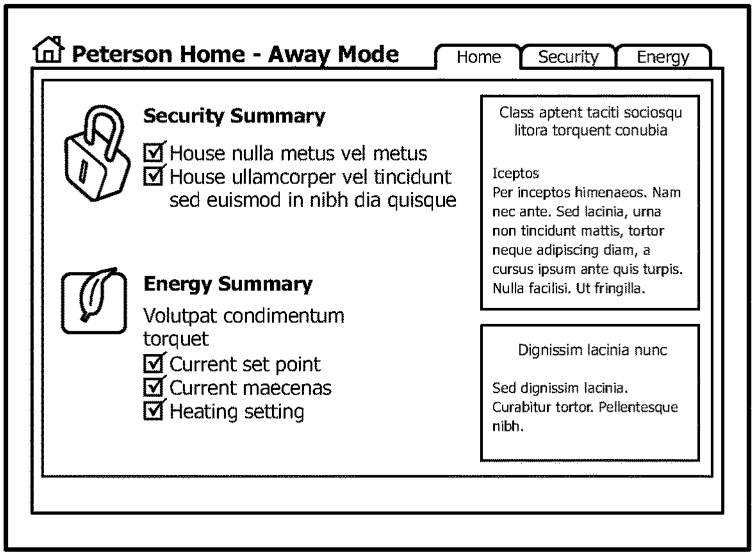
FIGS. 3A-3C show examples of detailed screens of the portal interface for premises management.
Figure 3B:
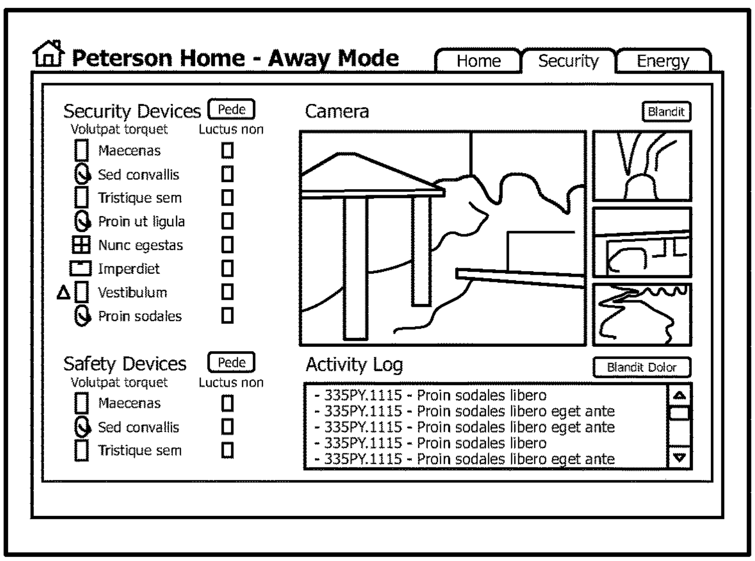
Figure 3C:
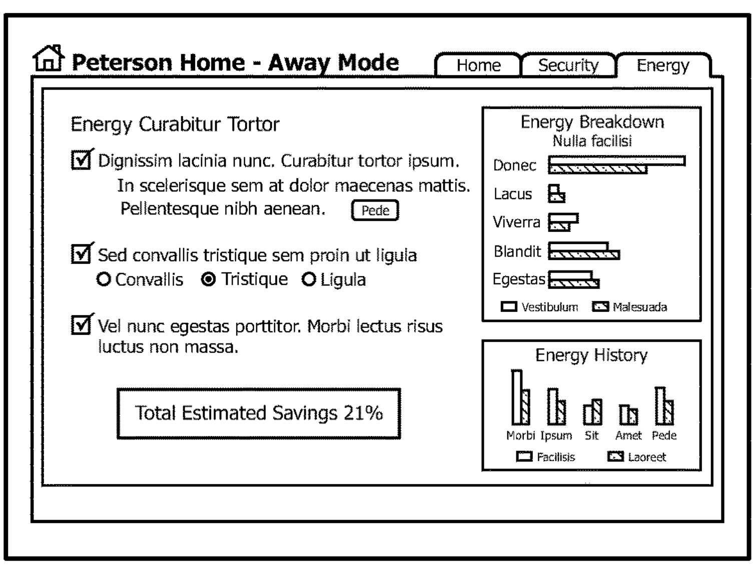

FIGS. 3A-3H show examples of detailed screens of the portal interface for premises management. FIG. 3A shows a main screen summarizing premises management services. FIG. 3B shows a screen summarizing security management services and safety management services. FIG. 3C shows a screen summarizing energy management services.

Figure 3D:
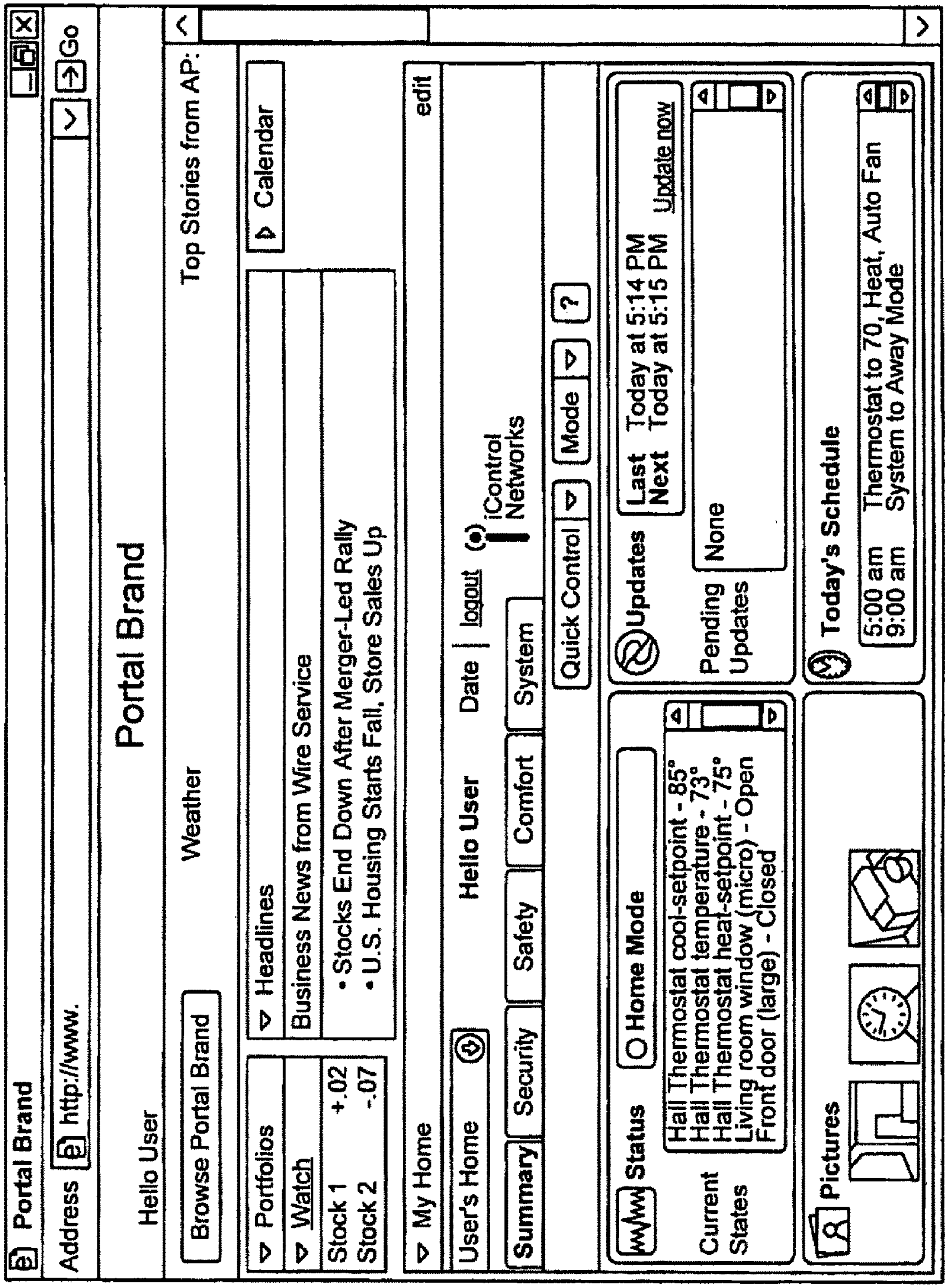
FIG. 3D shows a screen shot of a Internet Portal-branded portal for premises management according to an embodiment of the invention.

FIG. 3D is another example, illustrating how services offered by the system can be branded and incorporated into a third part web portal, for example, in a personal portal such as one provided by Yahoo. The screen includes the usual Yahoo portal content such as the stock pane on the left, the news pane on the top and the calendar pane on the right. The system-specific pane is included on the bottom where the user can access monitoring and control information on the home or business. The look and feel of the system pane can be tailored by the service provider.

Figure 3E:
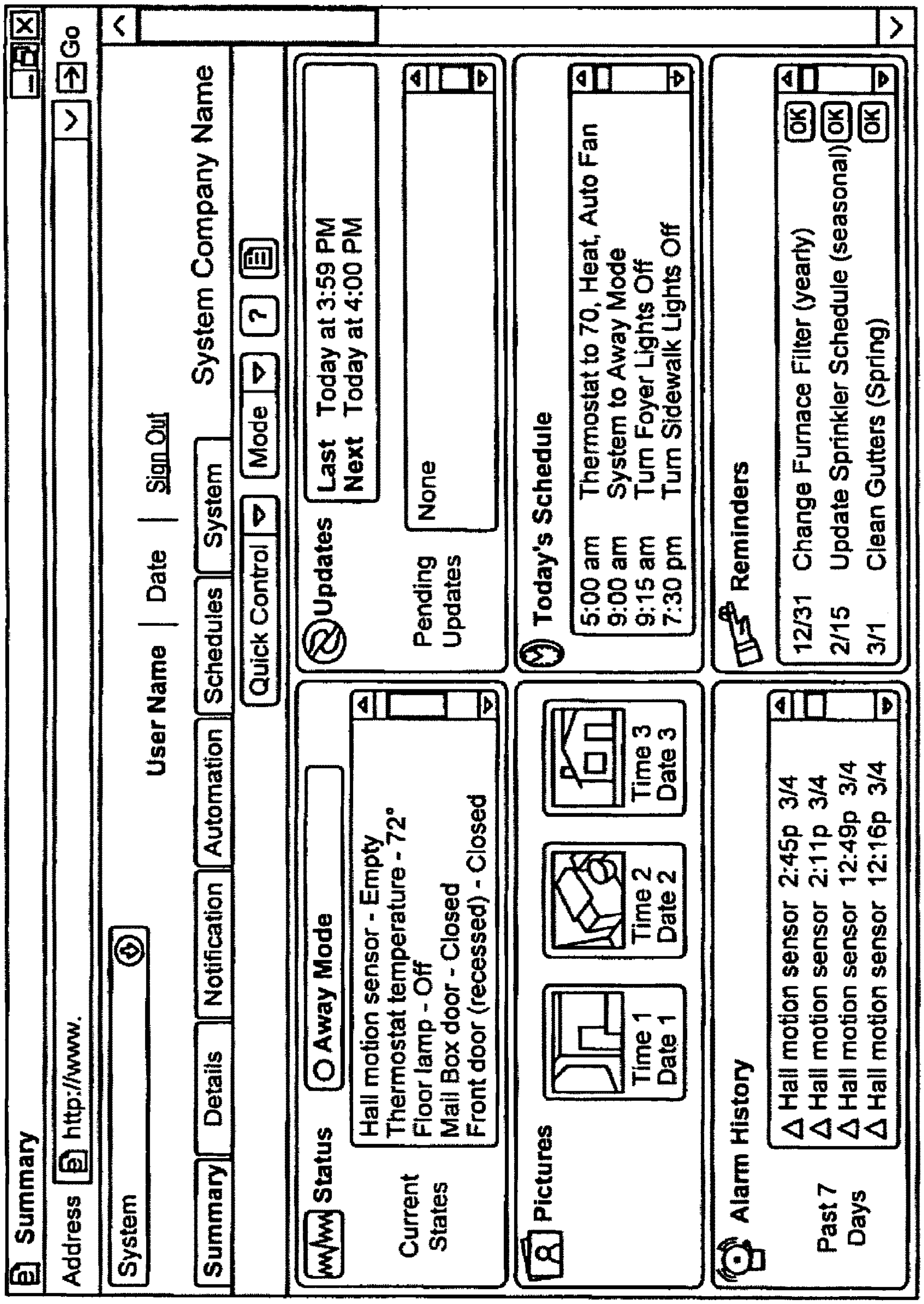
FIG. 3E shows a screen shot of a main portal summary page according to an embodiment of the invention.

The system portal summary page in FIG. 3E shows a snap-shot of the state of the various devices in the user premises. At the top left is a drop-down box that displays the name of the premises being shown on the screen. The user can change premises by clicking on this box and selecting a different premises. A series of tabs allow the user to switch to Details, Notifications, Automation, Schedules and Systems screens for performing other system functions. The various panes on this page highlight different features.

The status pane lists the different devices in the user premises along with their actual states. The pending updates pane shows the time of the last communication between the premises and the server as well as any pending updates waiting to be sent downlink to the premises. The pictures pane shows the last several (e.g. last four) pictures taken by the camera in the user premises. The user can click on a thumbnail picture to look at a larger version of the photo as well as access archived images for that camera, look at live video, take new pictures or delete photos. The schedule pane shows the schedules activities for the premises. The alarm history shows an archive of the most recent event and activity in the user premises. The reminders pane provides a means for the system to remind the user to perform certain activities or functions related to their home or business. The mode drop down button on the blue navigation bar allows the user to switch between the systems modes. The Quik-Control drop down allows the user to control any device that is controllable (e.g. camera, thermostat, lamps, etc.).

Figure 3F:
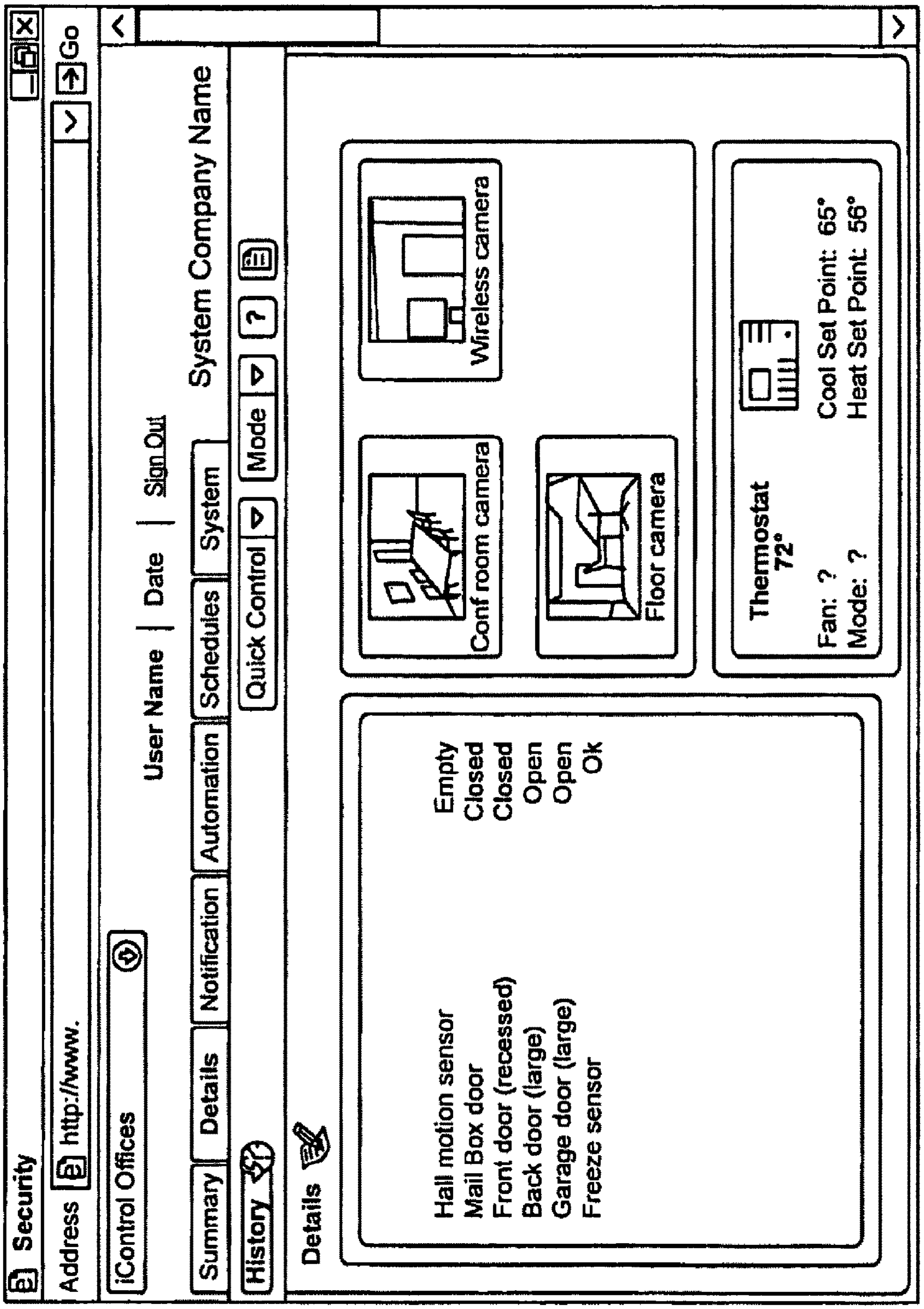
FIG. 3F shows a screen shot of a portal showing details device information according to an embodiment of the invention.

FIG. 3F shows a details screen of the portal showing details device information. The details screen allows the user to show more detailed device data. The list on the left displays the system devices and their actual states/values. The pictures pane on the top right display the camera thumbnails (beyond the 4 displayed on the summary page). The thermostat pane on the bottom right shows the details of the thermostat data including the current temperature, cooling and heating set points as well as the thermostat mode.

Figure 3G:
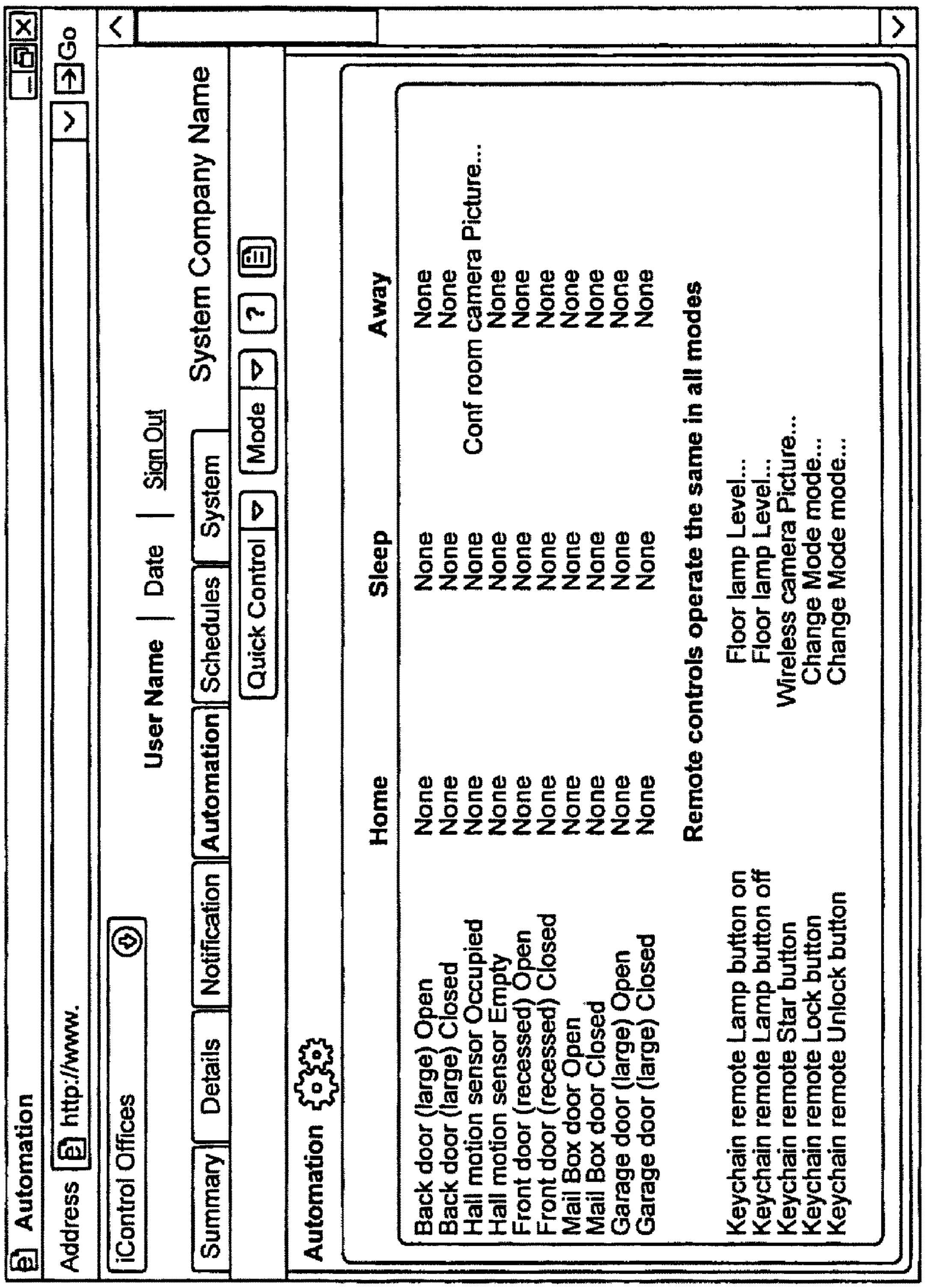
FIG. 3G shows an automation tab screen according to an embodiment of the invention.

FIG. 3G shows an automation tab screen. This screen shows how the user may assign automation rules to devices such that an event caused by a device can trigger one or more actions by other devices. The left column shows all possible events that can occur based on the devices that belong to this premises network. The three columns, one per mode, identify the action for each event for that mode. For example, the figure shows that when hall motion sensor occupied event occurs in the away mode, the conference room camera takes a picture. The bottom portion of the screen shows that the wireless keychain remote control's buttons can also be programmed by the user to perform any action desired.

Figure 3H:
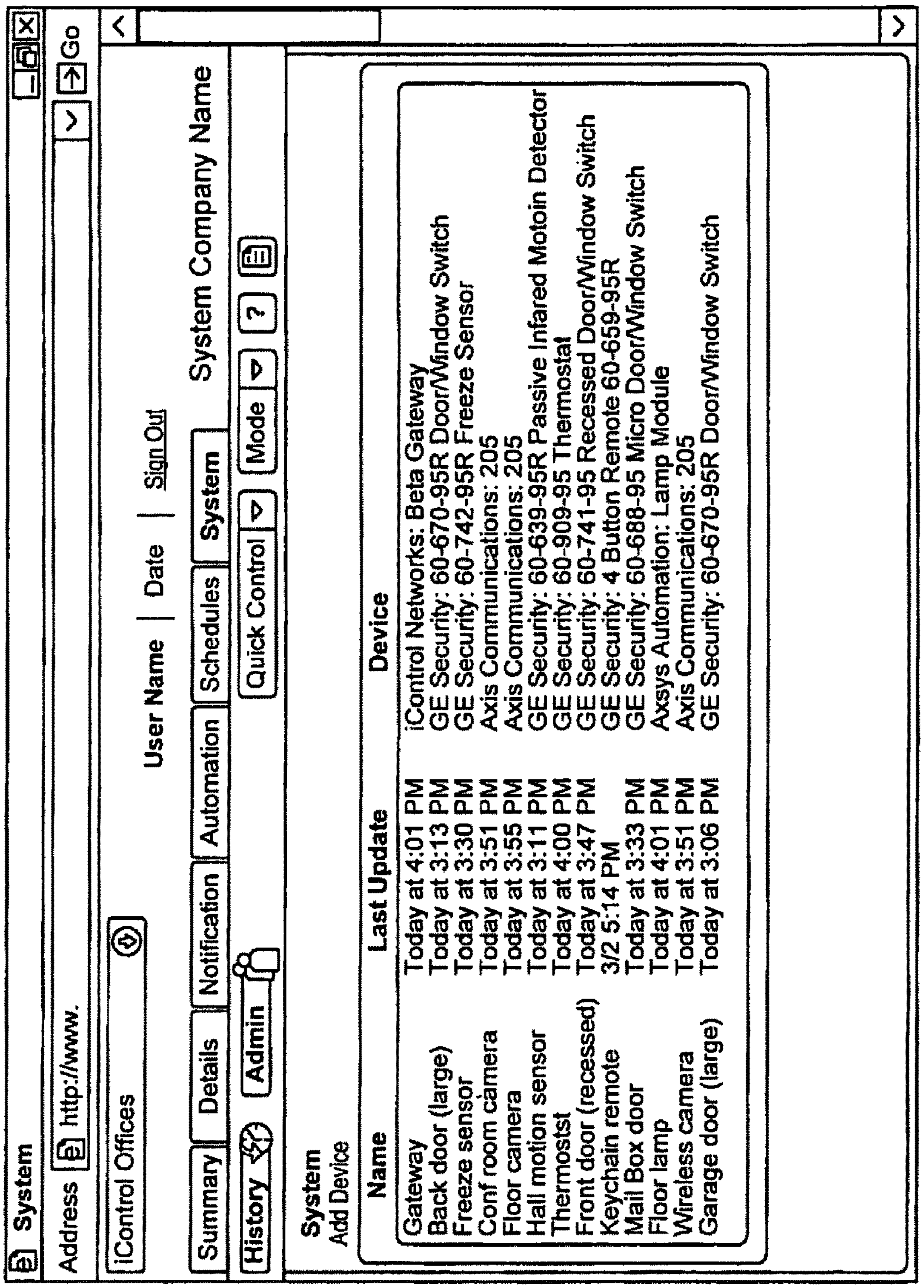
FIG. 3H shows a system tab screen according to an embodiment of the invention.

FIG. 3H shows a system tab screen showing status of devices. The System screen shows a list of all the devices in the premises' network, including the gateway. Each device in the system is on a separate line. The first column shows the name of the device along with a status indicator which show different colors based on the status of the device (green for ok, yellow for offline, red for not found or problematic). There is also a "last update" column that displays the date and time of the last signal received from that device. The third column (device) describes the type and model number for that device. The user can get more detailed information about a device by clicking on the line corresponding to the respective device.

Figure 4:
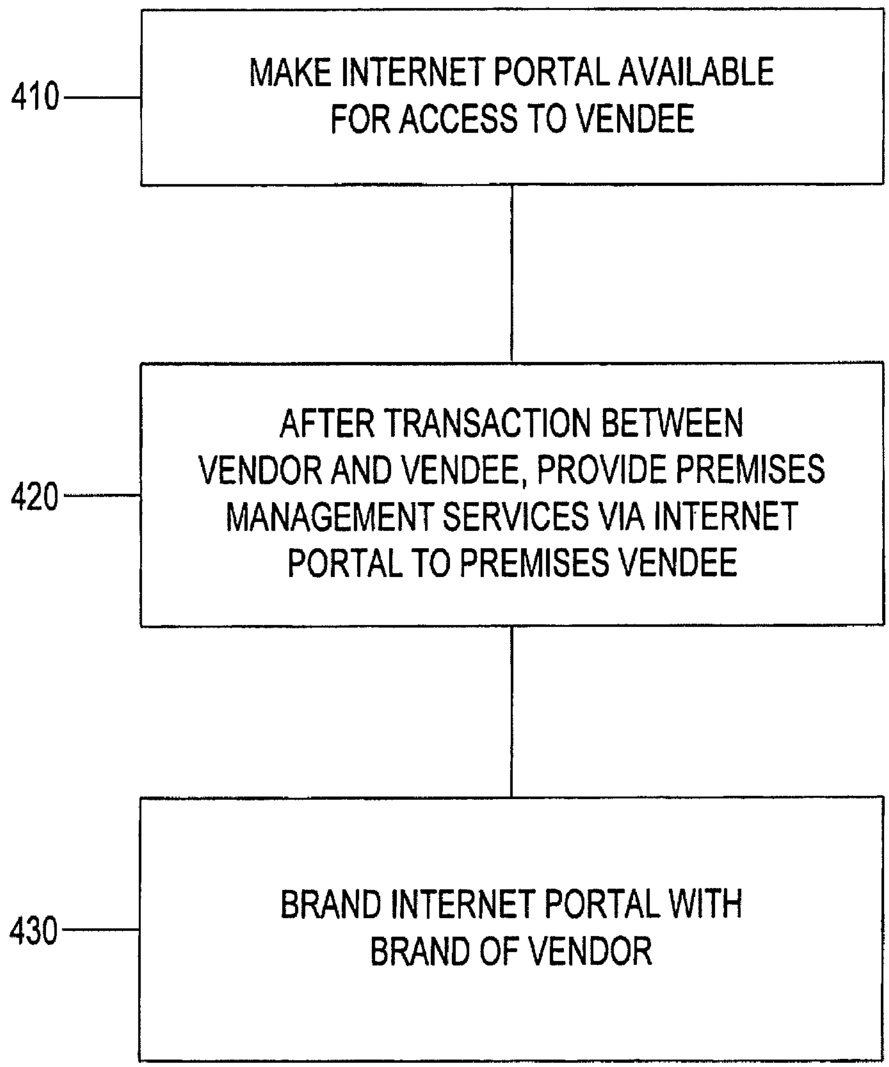
FIG. 4 is a diagram of a business method for premises management.

FIG. 4 is a diagram of a business method for premises management. In 410, an Internet portal is available for access to a vendee, such as a premises vendee, communication service vendee, and/or an Internet portal vendee. In 420, at least after a transaction between the vendor and the vendee, such as a premises transaction, a communication services transaction, and/or Internet portal services transaction, premises management services are provided via the Internet portal to the vendee. In 430, the Internet portal is branded with the brand of the vendor. The shown steps can be added to, removed, rearranged, and/or modified.

Figure 5:
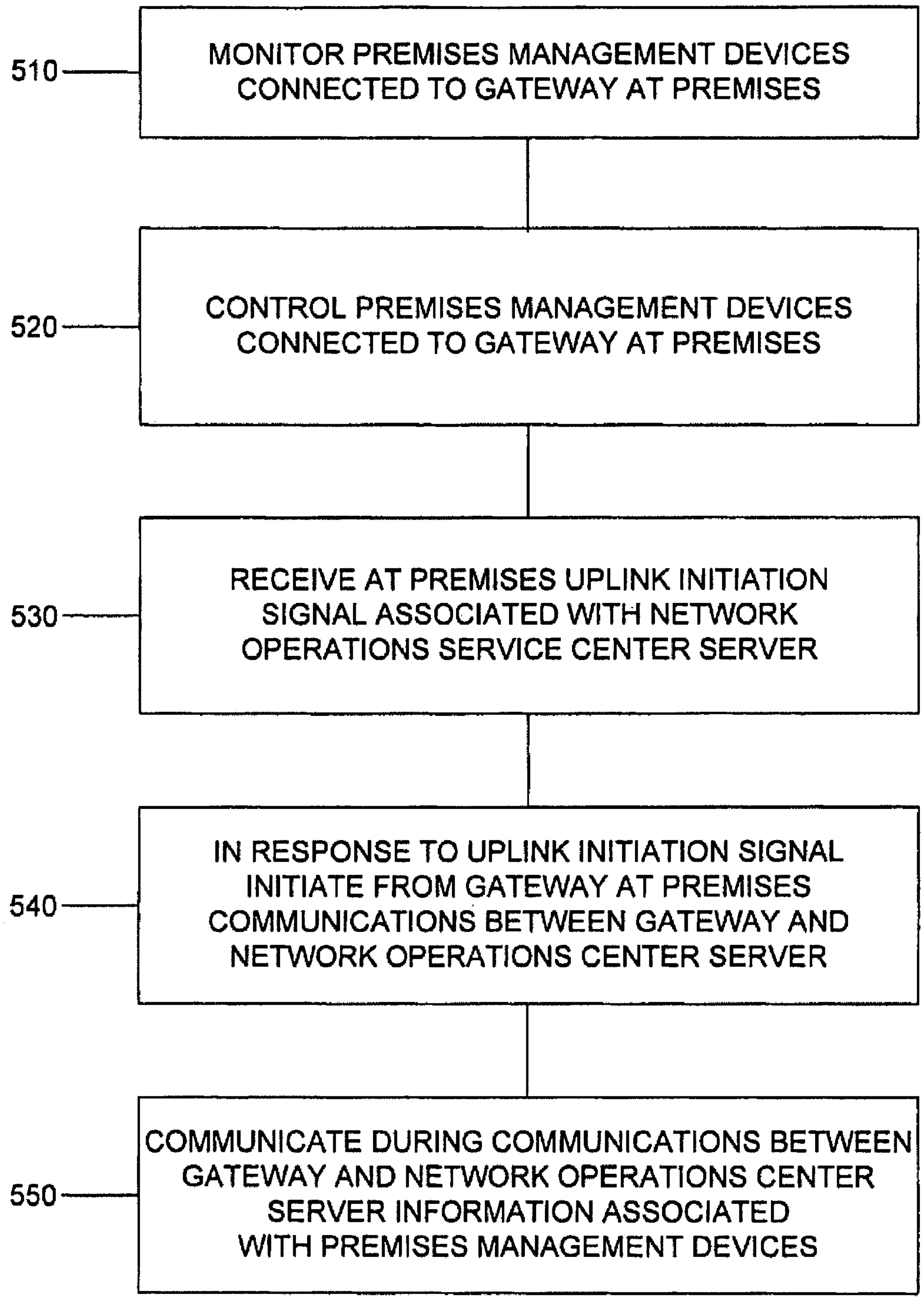
FIG. 5 is a diagram of a method for premises management networking.

FIG. 5 shows a diagram of a method for premises management networking. In 510, premises management devices connected to a gateway at a premises are monitored. In 520, premises management devices connected to the gateway at the premises are controlled. In 530, an uplink-initiation signal associated with a network operations center server is received at the premises. In 540, in response to the uplink-initiation signal, communications between the gateway and the network operations center server are initiated from the gateway at the premises. In 550, during the communications between the gateway and the network operations center server, information associated with the premises management devices is communicated.

Property developers and service providers can:

1. Differentiate their offering from their competitors
2. Generate new recurring revenue through new, value-added services
3. Reduce their operating costs
4. Increase the value of their offering
5. Increase the effectiveness and reach of their brand
6. Make smarter, knowledge-based business decisions
7. Increase customer retention and satisfaction Additional content leverages the broadband infrastructure, thereby increasing the effective value of the broadband pipe.

Property developers/managers and service providers are facing ever increasing competition and lack the expertise, time and resources to offer control and telemetry services to their customers. Connecting people to devices is the next evolutionary step for the Internet.

Some of the architectural/design goals for the system are low cost, ease of use, and scalability.

The architecture and products/service offering is flexible enough to cater to the needs of the homeowner while being scalable and intuitive enough to allow for easy installation and minimal support.

Three types of customers are envisioned for the system. Although the ultimate end user is the property owner, customers can be: home developers and commercial property, e.g. multiple tenant unit (MTU) owners and managers; service providers (telcos, cable companies, ISPs, etc.); and homeowners or commercial building tenants.

The actual user of the services resides in the premises where, for example, the gateway and devices are installed. The system can be intuitive enough that the "average" end user can perform the installation and configuration steps.

The installer can be the person or entity that installs the gateway and the devices in the home, configures the gateway, connects the gateway to the Internet and/or telephone line and/or performs any troubleshooting necessary. Depending on the actual customer, the installer can be 1) the installation crew of the service provider or property developer, 2) an outsourced installation outfit hired by the service provider or property developer, 3) an outsourced installation outfit hired by the end user, or 4) the end user.

The premises gateway can be a low-cost and stand-alone unit that connects the in-premises devices to the server. The connectivity to the Internet can be accomplished via a broadband connection (T1, DSL or cable) and/or via the telephone line. Though broadband connectivity is preferred due to its persistence and throughput, telephone connectivity is recommended to be present as a back-up option in case the broadband connection is lost. For premises without a broadband connection (e.g., vacation homes) a telephone-only connection can be used.

The service portal provides an intuitive end user interface to the premises network as well as access to system and network configuration screens and user account information and settings.

Some embodiments of the overall system can be put in use through the following steps:

1. Customer need for telemetry services is established
2. Customer (via web or phone) orders a system
3. Customer acquires system (via service provider, builder, etc.)
4. A service account is established (by the service provider/builder or by the homeowner or system manager)
5. Gateway is registered (by the service provider/builder or by the homeowner)
6. Gateway sends network/device information to the server
7. Homeowner configures own home (alarms, notifications, binding, etc.)

8. Future devices are added to system either via pre-configuration by system manager or via the end user through configuration screens on portal Each of these steps is described below:

Customer Need is Established

This can done through the property developer, the service provider sales channel or direct advertising by the system manager.

Customer Orders a System from System Manager

The customer specifies what kinds of devices are needed and where each one will reside in the premises (e.g., living room thermostat, lobby motion sensor, etc.). The user account is then appended by system manager to include this information as well as the actual unique ID for each device shipped to the customer.

Customer Acquires System

The gateway and devices can be acquired by the customer in several ways:

1. Pre-installed by the property builder/developer/manager or service provider
2. Directly purchased by the end user The choice of devices can depend on the particular services and functionality desired by the customer.

Once the customer acquires the gateway and devices, the devices are physically installed in the premises. This task can be performed with the help of an installer, or for smaller premises, performed by the end user.

A Service Account is Established

This is generally done by the end user as the process uses personal information (name, payment option, etc.). The account registration involves the user logging on to the system manager web site and establishing a new account by entering name, address, phone number, payment details and/or the gateway serial number printed on the gateway in the end user's possession.

In some cases the system manager service account may already be pre-established with the gateway serial number and the end user simply has to update the account with personal and payment information. This scenario eliminates the need for the end user to deal with any cumbersome serial numbers or keys and is really more of a personalization step.

Multiple gateways can also be handled per user account.

Gateway is Registered

This step involves the association of the user account on the system manager server (established in the previous step) with an actual gateway in the user's home. The gateway is connected to a broadband network or the telephone line in the home.

For this step, the installer, for example, presses a SYNCH button on the gateway, and initiates an uplink communication from the gateway to the system manager server using a default (first-time) IP address or, in the case of a dial-up-only connection, a toll free number dial by the gateway.

Upon establishing a connection with the server and locating its corresponding user account (e.g., established in a prior step), the gateway acquires a system manager server IP address (to be used from that point on for all gateway to server communication), and changes its state from unregistered to registered.

In the case where the gateway is pre-installed by the developer or service provider, this step may have already been performed.

The gateway may not be able to perform any functions until it has gone through this registration process (as indicated by the state of the gateway).

Gateway Sends Network/Device Information to the Server

This is done on a regular basis and can always be initiated by the gateway. The server dictates the interval for uplink communication initiation between the gateway and server.

Homeowner Configures Home (Alarms, Notifications, Binding, Etc.)

This is the normal use of the system manager portal whereby the user selects the various monitoring, logging and notification options.

Future Devices are Added to System

The end user obtains additional devices from the system manager, in which case they are added to the end user system by the system manager before being shipped to the customer.

Alternatively, the end user could purchase a device from a third party source in which case they could use the system manager portal interface to add (or replace) the device manually.

In addition, the system manager gateway can have a provision for "discovering" devices by listening for RF messages (e.g., GE Interlogix) or service pin messages (e.g., LonWorks devices).

Overview

Parts of the system as a whole are described, including the gateway, the server and the web portal interface.

System Overview

At the highest level, the system provides its users with a hosted and managed service for premises device monitoring and control for a fee, such as a monthly subscription fee. The premises markets include residential homes, commercial MTUs as well as small businesses.

The traditional complexity and expense of installing and maintaining such a system is delegated to the system manager platform. As a revenue-grade Application Service Provider (ASP) business, the system provides reliability, scalability, security, cost-effectiveness, ease-of-use, and flexibility.

The term "system" can denote the portal, server, gateway and end devices.

Reliability

The system can provide a high degree of reliability. This includes 24-7 operation of the Network Operations Center (NOC) and the server software it contains, and the reliability and fault-tolerance of the gateway and the control devices.

Scalability

The system, specifically the NOC, can scale to accommodate large numbers (in one embodiment, millions) of gateways and devices (in one embodiment, tens of millions). Though this may not be used at the onset, necessary architectural provisions can be built into the system to allow for such expandability.

Security

As a revenue-grade service offering, the system provides security against intentional and unintentional interference with the normal operation of the system. The system can be reasonably immune to external unauthorized access (either over the Internet or device network media). The system can provide reasonable protection against spoofing (of NOC server, gateway or device).

Cost-Effectiveness

Similar systems in the past have suffered from a high cost of in-premises devices and gateway as well as high and/or unpredictable installation costs. The system installation process is simple in order to minimize, if not eliminate, the installation costs.

Ease-Of-Use

The gateway and device installation process as well as the various user configuration and normal use menus/screens presented by the portal are, according to an embodiment, intuitive and easy to use. This eases the adoption and continued use of the system by its users.

Flexibility

The system is flexible enough to easily handle different device networking protocols/technologies should the need arise in the future. In addition, the system, including the web interface, can be adapted to different markets and applications.

Variable Logging

The system can log any device variable specified by the user for up to, for example, 30 days. The user defines a logging interval for each variable at the time of configuration. The logging feature can be handled by the gateway on the local device side and the data can be transferred to the server at regular intervals. The overall variable log for all variables can be kept on the server side.

Logging of data for more than, for example, 30 days (but no more than, for example, 180 days) can be provided to the user, for example for a nominal fee.

The system can allow for the logging of at least, for example, 10 variables per gateway. The minimum logging interval for any variable can be, for example, 5 minutes. Logging intervals provided can be, for example, 5, 15, 30, 60, 180 minutes as well as 6, 12, 24 hours and weekly.

Activity Logging and Tracking

The system must be able to provide at least, for example, a 14-day history log of all user, system and device actions. An action includes a change to a device variable, system or network settings brought on by either the system or the user (e.g., variable changed, logging enabled, device added, user notified, etc.). The user can trace back system activities to their cause and to the date and time they occurred. Past activities can be searched by variable, device, category or date.

System Modes

The system can support user-defined modes, such as "home", "away", "sleep", "vacation", etc. The mode the user network is in plays a factor in the determination of the actions taken (reporting, alarming, eventing, notification, etc.) by the system when variable changes occur.

System mode can be changed by the user via methods such as:

1. Via the portal interface
2. Through a schedule set by the user
3. Via a binding (a variable change tied to the mode change—e.g., RF remote control)

The system can provide a set of default modes based on the user profile (homeowner, business, vacation home, etc.). These default modes are a starting point that can be changed or added to by the user at any time.

Alarming

The user can specify alarm conditions for variables with discrete states (e.g., binary ON/OFF). These alarms can be reported in real-time (i.e., immediate uplink) by the gateway to the server. The server then in turn looks at the data and determines, based on user alarm settings, whether to notify the user or not.

Alarm conditions can be determined based on the value or state of a variable as well as the system mode.

Eventing

For non-critical events, the system can notify the user in non-real-time fashion regarding the state of any variable specified by the user. The variables chosen for user eventing can be of any kind (discrete or continuous). The gateway updates the server with the change of variable state/value at a regularly scheduled upload. The server continuously looks at variable data and determines, based on user eventing settings, whether to notify the user or not.

Eventing conditions can be determined based on the value or state of a variable as well as the system mode.

User Notification

The system can support user alarming and eventing via the following methods: email, text messaging, pager, and/or voice telephone call (voice synthesis).

Device Data Monitoring and Control

The user can specify any device variable for monitoring and control via the server portal. For example, up to 255 devices can be supported by a single gateway. For example, up to 512 variables can be supported by a single gateway.

The user can schedule specific variable updates (e.g., turn off thermostat at 8 am every Tuesday). Scheduled events can be canceled (gateway-server protocol can support this). A scheduled variable update is allowed, per time stamp and variable ID. If time stamp and variable ID match an existing scheduled variable change, then the value for that pending variable change is re-written with the new value. A given variable can have multiple scheduled values as long as each scheduled update has a different time stamp.

Any pending downlink variable change commands can be canceled that have not been relayed to the gateway at any time through the portal interface.

Device Network Support

The system can support an open architecture where most, if not all device networking protocols can be supported. Examples of specific device protocols supported by the system include RF and powerline protocols, such as GE Interlogix RF and Echelon LonWorks power line (PL & FT), simplifying the installation burden by requiring no new wires to be installed in a premises.

The LonWorks free topology twisted pair medium (FT-10) can be supported as an option to better support commercial applications (e.g., office buildings).

All devices, regardless of the technology, can possess these attributes:

1. Unique ID (global)
2. Non-volatility. Must not lose any pertinent data or state.
3. Low-battery indication over the network (if battery-operated)
4. Tamper detection (if security-sensitive)

RF

This system includes a low-level, simple unidirectional protocol for multiple sensors to talk to a receiver head end. The protocol needs and footprint are relatively small and as such the RF devices are comparatively low-cost and small. They also can function for several years without the need for a battery change for simplified installation and maintenance of the system by the user.

A bi-directional RF transceiver can be supported by the system. This allows for control as well as monitoring of remote devices (e.g., thermostat) by the user.

The following RF devices can be supported by the system:

1. Door and windows sensor
2. Motion sensor
3. Smoke alarm
4. Water sensor
5. Freeze sensor
6. Contact closure sensor (e.g., ITI DWS with external connector pins)
7. CO alarm
8. Heat sensor
9. Thermostat
10. RF remote control

PL

The power line solution offers a robust and reliable mechanism for communicating over existing residential power line wiring.

The following PL devices can be supported by the system:

1. Thermostat (e.g., RCS)
2. Load controller (e.g., Halen Smart)
3. Relay actuator (e.g., Comap)
4. Photo camera, e.g., black & white, low-resolution (with motion sensor)

FT

The Free Topology solution offers a cost-effective medium for commercial applications. Many third party LonWorks devices use this medium for communications.

Other Devices

The following is a non-exhaustive list of a few other devices supported by the system.

1. Small data/message display—for text messages, news, weather, stock, photos, etc.
2. Door latch control
3. Pool/spa controller
4. Weather station
5. Lighting control
6. Elderly or disabled monitoring
7. Irrigation controller (Bibija)
8. VCR programming Cameras The system can support cameras. For example, standard off-the-shelf IP cameras (also referred to as web cameras) may be used, such as those available from vendors such as Axis, Panasonic, Veo, D-Link, and Linksys, or other cameras manufactured for remote surveillance and monitoring.

Surveillance cameras may contain a standalone web server and a unique IP address may be assigned to the camera. The user of such a camera would typically retrieve the camera image by accessing the camera's web page through a standard web browser, using the camera's IP address. In some cases the IP camera acquires a local IP address by using a DHCP client to negotiate an address from the local DHCP server (usually residing in the user's router/firewall).

According to an embodiment, the gateway treats camera images as it does other sensor or device data. User commands to "snap" a picture are sent from the system's portal/server to the local premises gateway during scheduled communications between the gateway and server (initiated by the gateway). Alternatively, a picture "snap" command for a local or remote camera can be initiated by a sensor (e.g., motion detector, remote control, etc.) on the local device network. The gateway then in turn talks to the camera over the IP network (wired or wireless) to retrieve the image and pass that image up to the system's backend server, effectively acting as a pass-through agent for the camera.

Since the data from the gateway (including the camera image) is pushed up from the gateway to the server using standard HTTP protocol (used by web browsers), additional configuration of the user network may be avoided. Also, adjusting of the user's firewall (port forwarding, DMZ, etc.) may be avoided (i.e., simpler installation and enhanced security).

Also, the push mechanism eliminates all the issues related to accessing the camera from the Internet, namely firewall and dynamic IP issues mentioned above, since the user gets the images from the system servers and not from the premises directly.

The system's user portal interface acts as a unified user interface for the user by displaying multiple images from different cameras in the same user interface page (e.g., web page).

The system's IP cameras can be physically located anywhere as long as they are connected to the Internet (if remote) or to the local IP network (if local).

Due to the fact that the images are served from the system's server (as opposed to the local camera or network) potential security exposure of accessing the home network directly from the outside may be avoided. Also, additional security measures can be put in place (e.g., SSL) to block an unauthorized user from accessing the images on the server.

Device Low-Battery Notification

The system can notify the user via the web portal of any low-battery conditions for the devices that operate on battery (e.g., GE Interlogix devices).

Server-Side Binding

The system can send variable control information downlink based on variable information collected through the uplink connection. This rule-based exchange can take place within the same atomic uplink-downlink (request-response) exchange between the gateway and server. The user specifies the actual "rules" for such bindings (e.g., turn off the thermostat when there is no motion in the premises for 2 hours).

This implementation may impact scalability because of the atomic communication factor.

Local Binding

Local binding can permit a more real-time interaction between devices. This functionality can take place without the server's involvement (other than the initial configuration of the local rules). The local binding, given the different technologies used at the device level, needs to be routed through the gateway.

Gateway Shoulder Tap

The server can "call" a gateway if the user requests that a variable change be propagated to a device in real-time (rather than waiting for the next gateway uplink connection).

Device Sharing Between Different Users

The system can provide a means for a single device to be managed by multiple users. For example, a security gate or a pool temperature sensor in a property common area should be accessible by all residents in the complex.

Gateway

The gateway is the central link between the premises device network and the backend server. It can be a thin, low-cost client of the server and use the least amount of hardware and software without compromising the basic functionality and objectives of the overall system.

Internet Connectivity

The gateway can provide both a connection to a broadband network (Ethernet DSL or cable modem) and telephone network. The telephone network connection provides a second, redundant route for accessing the server in case the broadband network access is down and there is a need for the gateway to report critical alarm information uplink to the server. The telephone connection also provides a means for the system to support premises that have no broadband connection available (e.g., as in many second or vacation homes).

The gateway can terminate any data call in process if a user picks up a telephone and provide a dial tone immediately. In addition, the gateway may not initiate a data call if the phone is in use by the user (off hook).

They gateway can dial out in the absence of external power to the gateway.

Communication with Server

The gateway can initiate all communications with the server. Gateway communication can either initiate based on a predetermined schedule (e.g., every 30 minutes) or due to a local premises alarm (selected by the user).

Gateways can contact a common server for their first uplink connection in order to obtain their assigned gateway server address, which they can use for all subsequent uplink connections (unless changed later by the system). In the event that the gateway cannot connect to its designated gateway server, it can fall back to contacting the default initial gateway in order to refresh its gateway server address.

The predetermined call initiation schedule can be programmable by the server and can provide different intervals for broadband and telephone intervals (e.g., every 30 minutes for broadband and every 90 minutes for telephone).

By assigning the gateway-server communication initiation to the gateway the system can enjoy the following benefits:

1. Most if not all issues generally attributed to routers, firewalls and NAT are eliminated, as the gateway is now simply an HTTP client (much like a web browser).

2. Security against outside hackers is greatly increased as access into the gateway can be disallowed. The gateway knows whom it can talk to (server) and it does so when it needs to.

A possible disadvantage of a push-only scheme can be an inability of the server to provide "real-time" device control. This can be a relatively minor disadvantage minimized through the shoulder-tap mechanism.

Gateway Shoulder Tap

The gateway can have the provision of initiating an uplink communication based on a telephone ring signal detected on the phone line. This shoulder tap from the server allows the server to pass down a variable change to the gateway without having to wait for the next gateway uplink connection.

A drawback of a telephone line shoulder tap is the occasional ringing on the telephone line. It is difficult to detect an incoming ring reliably without the phone actually ringing. This is fairly benign when considering:

1. Most user variable change requests (control) may not have to be done in real-time and can occur at the next scheduled gateway uplink synch.

2. Most often the premises (e.g., home) being controlled in real-time is unoccupied.

3. The shoulder tap can at most ring the phone only once so the user can wait for the second ring before picking up the phone 4. The user can opt to provide a second phone line dedicated to the gateway.

Implementing shoulder tap over IP is another embodiment with a more complicated installation process (e.g., router/ firewall configuration, opening ports, etc.). Keeping an IP connection alive between the gateway and server can be unreliable and could heavily burden the server.

Configuration

The gateway can be installed without any special skills. The NOC server can handle the complexity of configuration.

Once plugged into a power outlet as well as a broadband and/or telephone network, the gateway can:

1. Determine if there is a broadband connection available
2. If so, obtain an address from the local DHCP server
3. Make sure the telephone connection is operational
4. Contact the server for the first time and check to see if there is a user account associated with it (this can be a secured inquiry to eliminate hacking)
5. If there is no associated user account found, notify the user (e.g., blinking LED on front panel)

Device Discovery

The gateway can be put into a device discovery mode via, for example, a front panel push button. Devices can normally be introduced to the system and assigned to the user:

1. By system manager before shipping out to the user
2. By the user/installer via the portal device registration screens The discovery mode is a third way of registering devices. The discovery mode allows the gateway to listen for and discover new devices added to the network—should there ever be a need for such functionality. Upon discovery of a new device the information is passed to the server for further processing and registration. The user can then finalize the device registration process through the system's portal (e.g., assigning names, alarming, etc.).

If the user can specify the adding of a device, it can be configured by the user immediately on the portal. Auto-configuration comes with set defaults. Another similar device to copy can be specified.

Auto Recovery

The gateway can be self-sustaining and autonomous.

In the event of communication failure between the gateway and the server for an extended period of time the gateway can continue to do its tasks (e.g., variable monitoring, logging, etc.).

In the event of an extended power loss or a system reset, the gateway can resume normal operation after the appropriate "boot-up" period (i.e., no more than 2-3 minutes). A hardware buffer can receive, e.g., RF signals during boot-up.

Any pending scheduled events that did not occur because of the power loss can be performed once the gateway has resumed normal operation and can occur in the original order defined by the user.

In the event that the gateway software "hangs," the gateway can recover itself through a built-in watchdog-monitoring feature.

Rule-Based "Binding"

Gateway Power Interruption

The gateway can operate for at least, e.g., 5 minutes after a power failure in order to report its latest status (including the power status) to the server (either via broadband or telephone). The gateway may not use a rechargeable battery in order to eliminate the need for gateway servicing when the battery reaches the need of its life (e.g., typically 2-3 years).

The gateway can withstand power interruptions without losing any pertinent data (e.g., device data, log data, date & time).

For applications where the gateway and devices are to operate in the absence of power, the user can obtain and use an uninterruptible power supply (UPS).

Remote Firmware Upgrade

The gateway can receive firmware upgrades over its WAN connection (Internet or PSTN). The gateway can have provision for recovery in case there is an interruption during a firmware download (e.g., network connection loss).

The gateway firmware upgrade is an automated process initiated by the gateway based on a schedule downloaded from the server during a gateway-server exchange. The upgrade process may not involve any user interaction or involvement and may take place when the user is least likely to be using the system (e.g., at night).

Variable Logging

The gateway can provide enough storage for logging one day worth of data for, e.g., 10 variables logged every, e.g., 15 minutes. In the event that the local gateway log is filled up before the gateway has had a chance to upload the data to the gateway, the gateway can stop logging additional data and report a "log full" error to the server at the next uplink connection.

Security

Appropriate security measures can be provided by the gateway to ensure protection against:

1. Inadvertent communication with neighboring networks and devices not related to a gateway/user.
2. Intentional external hacking into the system from the WAN side (Internet and PSTN).
3. Intentional external hacking in to the device network side (PL or RF).

Power Consumption

The gateway can use minimal operating power in order to reduce the cost associated with the power supply as well as the circuitry to keep the gateway alive immediately after a power failure.

Form Factor

The gateway can be encased in a visually attractive enclosure that is generic enough for multiple markets including consumer applications and commercial building applications (schools, etc.).

Ease of Use

The gateway can use the simplest possible installation procedure. The gateway can "figure out" how to communicate with the NOC (broadband and/or PSTN) once the power has been connected to it. No user involvement may be necessary for this to take place.

User Interface

The gateway's user interfaces include the following LEDs and switches:

POWER LED

COMM LED: communication happening between gateway and server

DEVICE LED: Device communication (PL or RF) happening. This LED can also be used for the device discovery feature.

ERROR LED: Displays different errors using different blink rates (log error, synch error, comm. error)

SYNCH switch: Initiates a gateway-server uplink communication

Gateway Local Reset

The gateway can provide a way for it to be reset locally by the user. Upon the execution of this gateway reset function, the gateway can be in the factory default state with no device, variable, user or configuration variables residing in it.

The reset operation for the gateway can be performed by, e.g., holding down the SYNCH switch for 20 seconds.

Agency Certifications

The gateway can be designed to comply with both FCC Part 15 (Level B) and Part 68 certifications.

If an external Tamura power supply is not used, then gateway design can meet the standards for the appropriate regional safety agency certification (i.e., UL, CSA, CE, and TUV).

Error Reporting

The system can report error to the user and/or administrator when the following conditions occur:

1. Downlink variable update failed
2. Gateway synch delayed or missed
3. Missing variable poll value
4. Variable log full
5. Broadband or phone line connection down Server The server provides a hosted, reliable and secure "server-in-the-sky" for the premises gateways to communicate to and for the users (customers) to access for accessing and controlling the various devices in one or more premises.

Reliability

The NOC facility can be run by a managed hosting service and as such provisions for power failure and security (theft) can be in place via the vendor providing the hosting service. However, the NOC server software architecture can support certain back-up features.

All user, system, network, gateway and device data contained by the NOC server can be backed up on a regular schedule (e.g., once a day).

When NOC server hardware malfunctions, that hardware can be quickly and easily replaced with minimum user downtime.

Security

The server can communicate to the gateway in a secure fashion.

The data can be encrypted when transferring between the gateway and server, as well as ID/password for authentication.

Scalability

The server software can be scalable such that it can support a large number of gateways over time. The scalability sold also enables the server to have a small foot print at the beginning when the number of gateways may be relatively small.

Platform

The interfaces between the servers and modules can be in XML in order to provide maximum flexibility and scalability. No requirements may be imposed for the operating system or programming language platforms used.

Server API

The server can provide an API (via XML and SOAP) that permits third party applications to get full access to the functionality of the server.

Portal

The portal can support web, WAP and PDA access points. An important attribute of the portal is ease-of-use.

Customization

The portal can present an automatically-customized UI to the user based on the application (e.g., residential, commercial, etc.) and the devices used (e.g., security, energy, safety, etc.).

As a secondary feature the portal can also allow the user to easily customize their portal for their particular needs.

Lastly, system manager personnel or authorized agents can further customize a portal for a specific customer (e.g., a telecom) or class of customers (e.g., homeowners of a home builder). This process can put a specific "skin" on a customer portal.

User Account Screens

These screens allow the end user to open an account and register the end user's gateway(s). Screens can be included for obtaining billing/payment info and other user information (e.g., address, primary contact information, phone number, etc.).

In addition, this can be where the user enters their gateway ID(s) (on the gateways) so the system can make an association between the logical user account and the physical user network(s)/gateway(s).

User notification options (email, phone, page, text messaging, etc.), as well as time zone, uplink interval can also be selected here.

The option to customize the WAP portal interface can be provided so the user can select the variables and the functionalities that are presented on a WAP device accessing the service.

Device Registration Screen

The user can register devices obtained from other sources—assuming they were not pre-registered already by the system manager. The user can enter the unique device ID and the device name, etc.

The ability to delete a device from the local user network can be provided. History related to the device being deleted (log data, action tracking, etc.) can be removed from the system, e.g., 30 days after the device deletion.

The gateway can know if something succeeds or not and report it back to the server. Similarly, each "command" the server performs on the gateway can be tracked back when the results of what the gateway did with it come back (e.g., success, fail, etc.).

The gateway can report the downlink changes like it reports uplink changes. The state change of the variable in question (e.g., Change thermostat setpoint) can appear in the log like any other variable, along with its time stamp.

The portal can set the change, then after the change occurs it can verify it is reported in the log. For example, if the portal is asked to turn the light on, it can be ensured that it happened "once and only once" and if it failed, that can be known.

The ability to replace a device in the local user network can also be provided. Old log data for the replaced device can be kept without a break in the device's data (i.e., the log can start getting values from the new device. Also, since the downlink values are set on the new device, those initial settings can also appear in the log.

Network Configuration Screens

This is where the user configures the device network and sets preferences and options (e.g., which variables to monitor, logging options, etc.).

Provisions for creating variable groupings are also provided here (i.e., defining a single variable that represents the collection of all similar type variables selected by the user—either ANY or ALL function (OR or AND)—e.g., all door/windows sensor states).

The user selection of which variables are monitored for eventing and alarming is performed here as well.

Normal Usage Screens

These represent the main screens used most often by the user on a day-to-day basis. Typical functionality provided includes: network summary, variable monitoring; variable control, variable logging, system activity log, system status, alarms, etc.

WAP Interface

The portal can also provide a simplified interface for supporting WAP devices. The functionality can be a limited subset of monitoring and control services offered by the web portal.

The customization of the WAP portal interface can be done through the normal Web interface screens PDA Interface The portal can also provide a simplified interface for supporting browsers running on PDAs. The functionality can be a limited subset of monitoring and control services offered by the web portal.

The customization of the PDA portal interface can be done through the normal Web interface screens (see above).

Permission Levels

The portal, in association with the server, can provide configurable user access and permission levels for both inter-account (e.g., different premises) and intra-account (e.g., mom, dad & kid) isolation.

Other Features

1. A desktop application in the icon tray that reports alarms and events in the background.

2. Support for larger premises (single user with multiple gateways)

3. Support for multiple users/locations per gateway

4. Rule-based local binding

5. IPSec (e.g., via HiFn chips)

6. Support for LonWorks free topology (FT-10) devices by the gateway

Control Network

An embodiment of a control network may comprise a collection of sensor and actuator devices that are networked together.

Sensor devices are devices that sense something about their surroundings and report what they sense on the network. Examples of sensor devices are door/window sensors, motion detectors, smoke detectors and remote controls.

Actuator devices are devices that receive commands over the network and then perform some physical action. Actuator devices may include light dimmers, appliance controllers, burglar alarm sirens and cameras. Some actuator devices also act as sensors, in that after they respond to a command, the result of that command is sent back over the network. For example, a light dimmer may return the value that it was set to. A camera returns an image after has been commanded to snap a picture.

The core of an embodiment of a control network is an architecture where sensor devices are coupled to actuator devices. A light switch, for example, may turn on a lamp through a light dimmer actuator. A door/window sensor or smoke detector triggers an alarm. Other devices may also be controlled in various ways.

Figure 6:
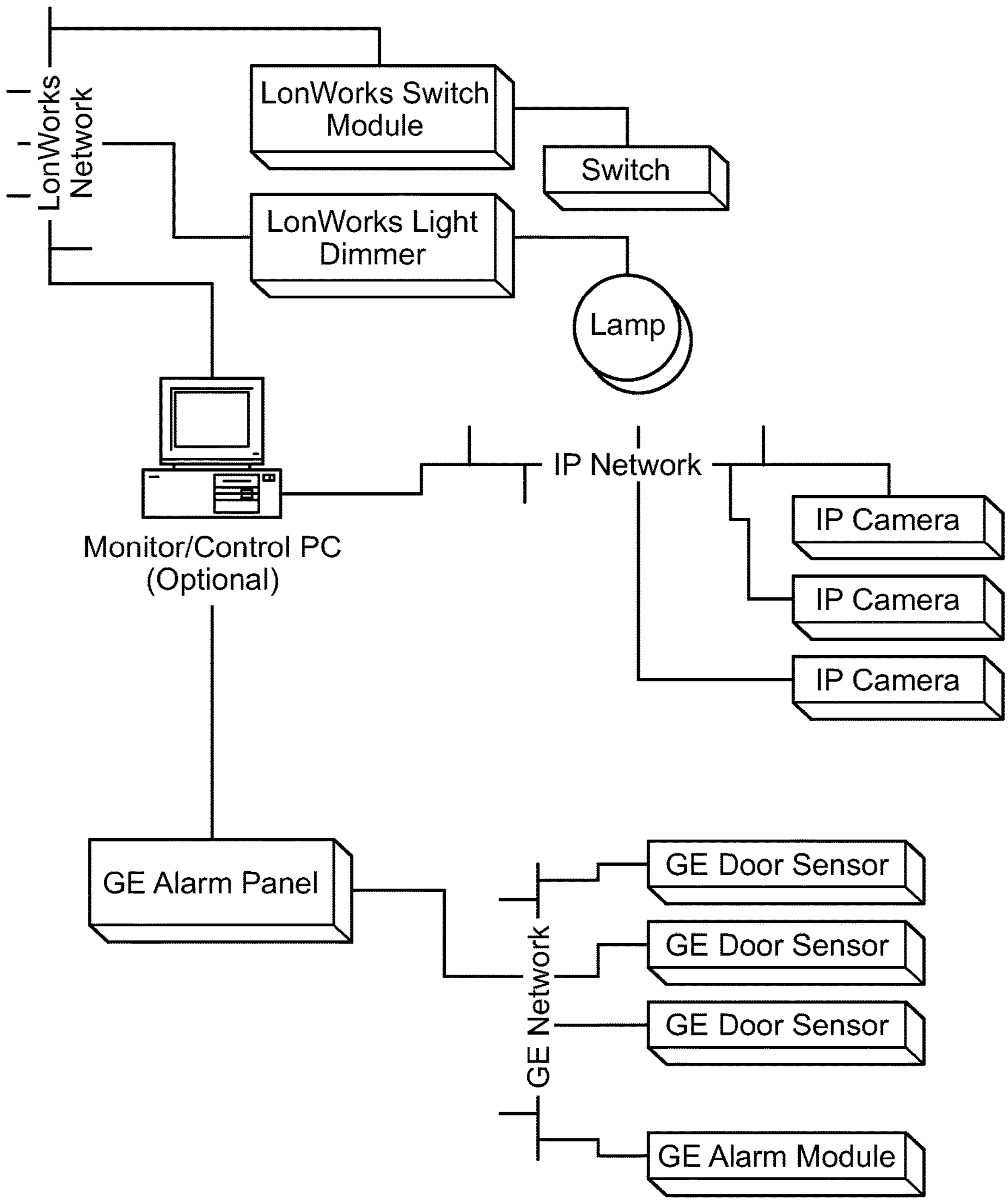
FIG. 6 illustrates an example of a control network environment.

FIG. 6 illustrates an example of a control network environment. Here three different networks with devices are depicted (GE security, LonWorks, IP). The LonWorks network includes a light switch and lamp, the GE network has some door sensors and an alarm controller, and the IP network has some IP cameras attached.

Note that the computer in the middle of the network may be used to bridge the various networks, essentially providing interoperability, but with available existing technologies that calls for a custom solution requiring expensive custom software. Otherwise, the three control networks are independent.

Figure 7:
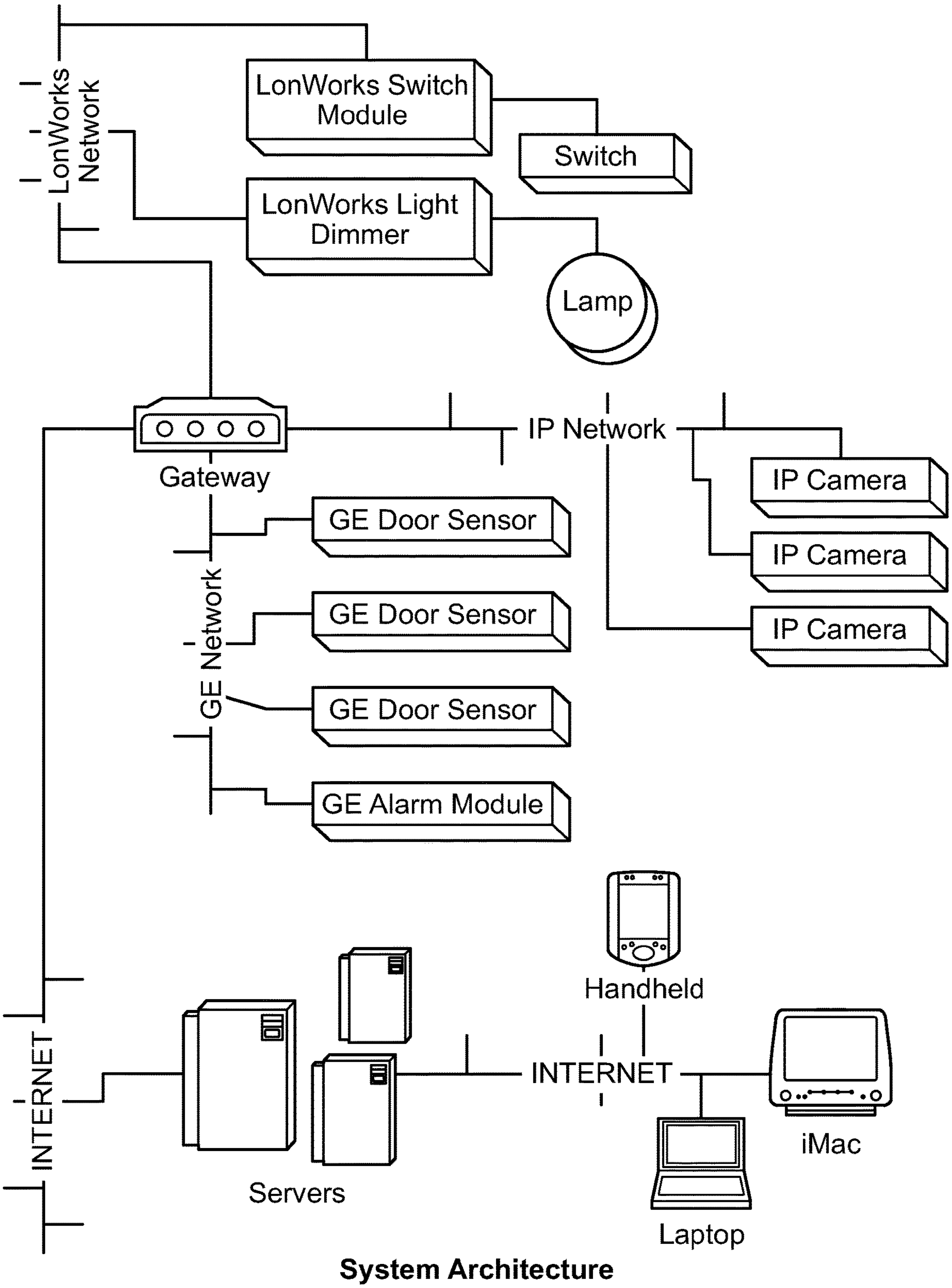
FIG. 7 is a block diagram of a control network with a gateway.

FIG. 7 depicts one embodiment of an architecture that uses these described concepts.

Here we see the same three local networks on the premises (IP, LonWorks, GE Security). However, now they are all connected together by the system gateway.

Furthermore, the system gateway is attached to the interne, through which it regularly contacts the system servers in order to send up new data and get back control and configuration information. Clients can monitor and control their premises using ordinary browsers on a wide variety of devices by accessing the system servers.

Note that, at the premises, use of a PC or custom programming to achieve interoperability between different device technologies, or to provide remote monitoring and control may be avoided. Instead, in an embodiment both functions are performed by the system gateway, which according to an embodiment is designed to interface to a variety of device technologies and provide an abstraction layer that helps the rest of the system (servers and clients) to be technology-neutral.

Sensor/Actuator Device Abstraction

Sensor and actuator devices are abstracted at the gateway hardware level so that different devices from different manufacturers can be handled seamlessly. Embodiments may support devices from several different manufacturers (for example, GE Security, Axis Communications, Axsys Systems) using three different communications technologies (unlicensed-band RF for GE devices, Internet Protocol for IP cameras, and powerline for LonWorks modules).

Gateway Device

The gateway device performs the hardware abstraction function according to an embodiment of the invention. The gateway includes the hardware and software required to communicate with all supported device technologies. Software on the gateway converts the raw data received from the device to an indexed data point. Periodically the gateway sends the data to the server, with each datum tagged with its data point index and time stamp.

In an embodiment, the server performs substantial operations for data storage and user interface.

Gateway—Server Data Interface

Between the server and the gateway, an embodiment of the system uses a device-property-value model. Each device supports some number of properties that expose its capabilities. For example, an embodiment of a door sensor has a state property (open or close) and a battery-level property (low or ok). Both the devices and their properties are given indexes when the gateway is configured, and all subsequent data exchange uses the indexes to identify the property involved. This indexed property ID may also be referred to as an "indexed data point."

Figure 8:
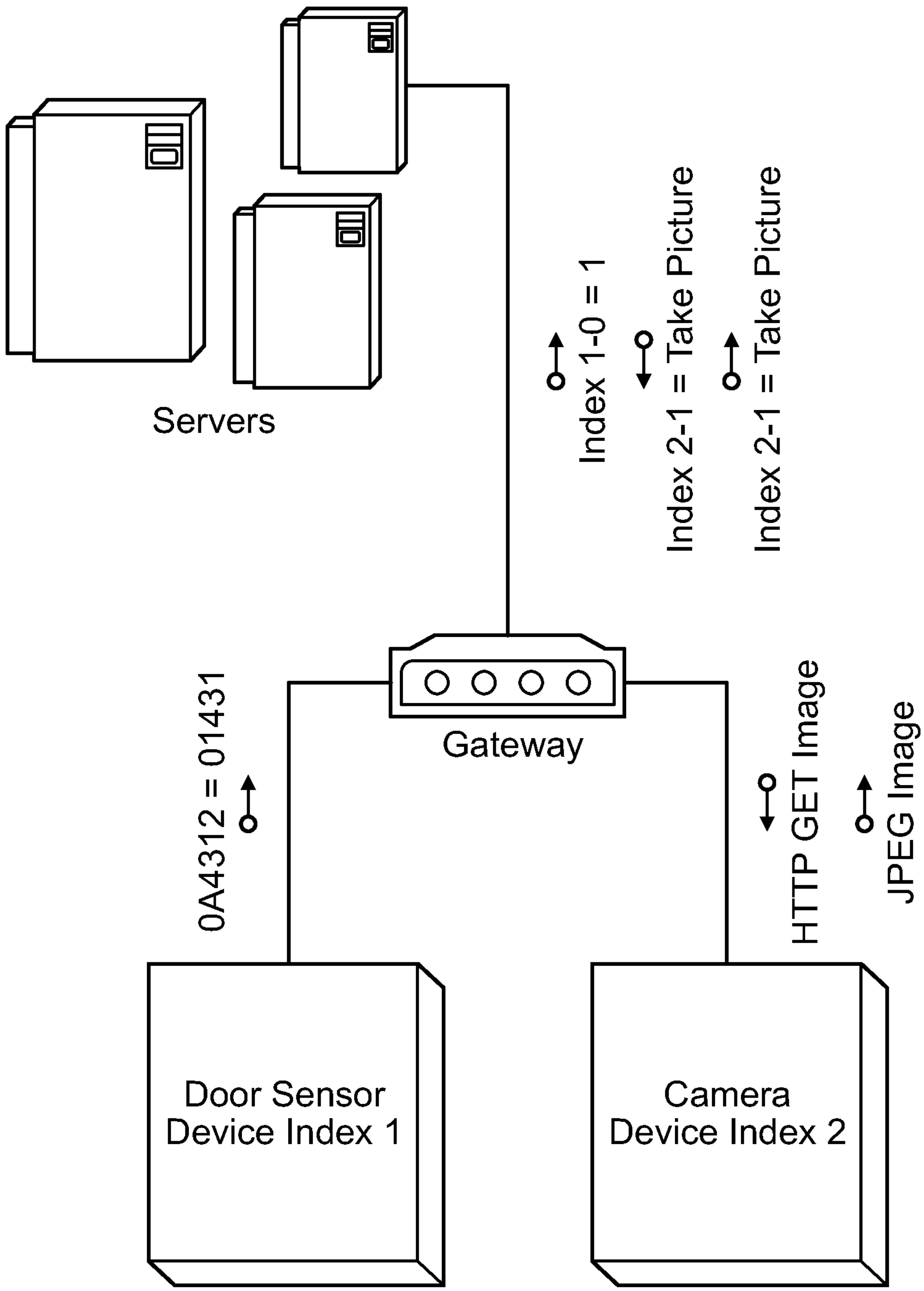
FIG. 8 is a flow diagram showing data being transformed, physically and logically, by a gateway.

FIG. 8 illustrates how data is transformed, physically and logically, by the gateway.

The door sensor has detected an open door, and sends the gateway a message with its hardware ID and raw value. The gateway interprets the data, converts it to an indexed data point value, and sends it to the server as device #1, property #0, set to 1 (true). Note that the device ID is converted to the configured device index (1), and the changed property is identified by its property index (0).

In the second case, the client wants to take a picture, so the server sends down the value (in this case, the desired picture name) indexed by the camera's device index (2) and the camera's picture property's index (1). In this case, the gateway initiates a web service to the camera to access (and upload) the image, then sends back the result of that operation to the server, again as an indexed data point.

According to an embodiment, the camera and a door sensor are both handled identically by the server and in the server-gateway protocol, using the device+property model.

Common Device Definition Format

In the server infrastructure, the device data is handled as indexed data point values. When the data is presented to the user, it is reinterpreted. The device definition file is the mechanism that permits the server software to handle this reinterpretation with a single, common code module, independent of device types or technologies.

Physical devices are defined using a common device definition file format which provides the information necessary to convert the device- and technology-specific view of a device to an abstracted, generalized view.

Function Types and Properties Abstraction

In order to allow client inspection and manipulation of sensor/actuator devices in a device- and technology-independent manner, device capabilities are mapped to standard function types, each of which defines one or more standard properties. This permits client software to, for example, query the system for temperature measurements, without necessarily knowing what physical device type provided it or what networking technology it used.

Raw Data Types

Each property in a device definition is tagged with its raw data type. This is the format of the raw data as received from the device and passed up by the gateway. Note that this is usually not the same format as the raw data that is passed from the device to the gateway.

For Boolean (digital) properties, this raw value is either the string "1" or the string "0." For analog properties, the format of the value can vary widely depending on the type of device. The gateway does not have to be responsible for handling the wide variety of formats possible, since the raw format type is stored in the device type definition, and is used by the server to make the conversion when necessary.

Standard Data Types

Each property in the device definition file is further tagged with a standard data type. This is the type that is stored in the server database and, by default, reported to the client. (Note that the actual database field type is a string: the "standard type", as used here, refers to how that string is formatted, not to the database data type).

Formatter Conversion Classes

The server has a set of formatter classes that convert between the raw and standard formats. These are selected and instantiated dynamically, as needed, based on the raw and standard data type strings from the device definition. This way the server code that manages data is identical for all data types, and supporting a new data type includes creation of a new formatter conversion class. Similarly, there are a set of formatter classes that convert between different standard formats.

Data Conversion Data Flow

Figure 9:
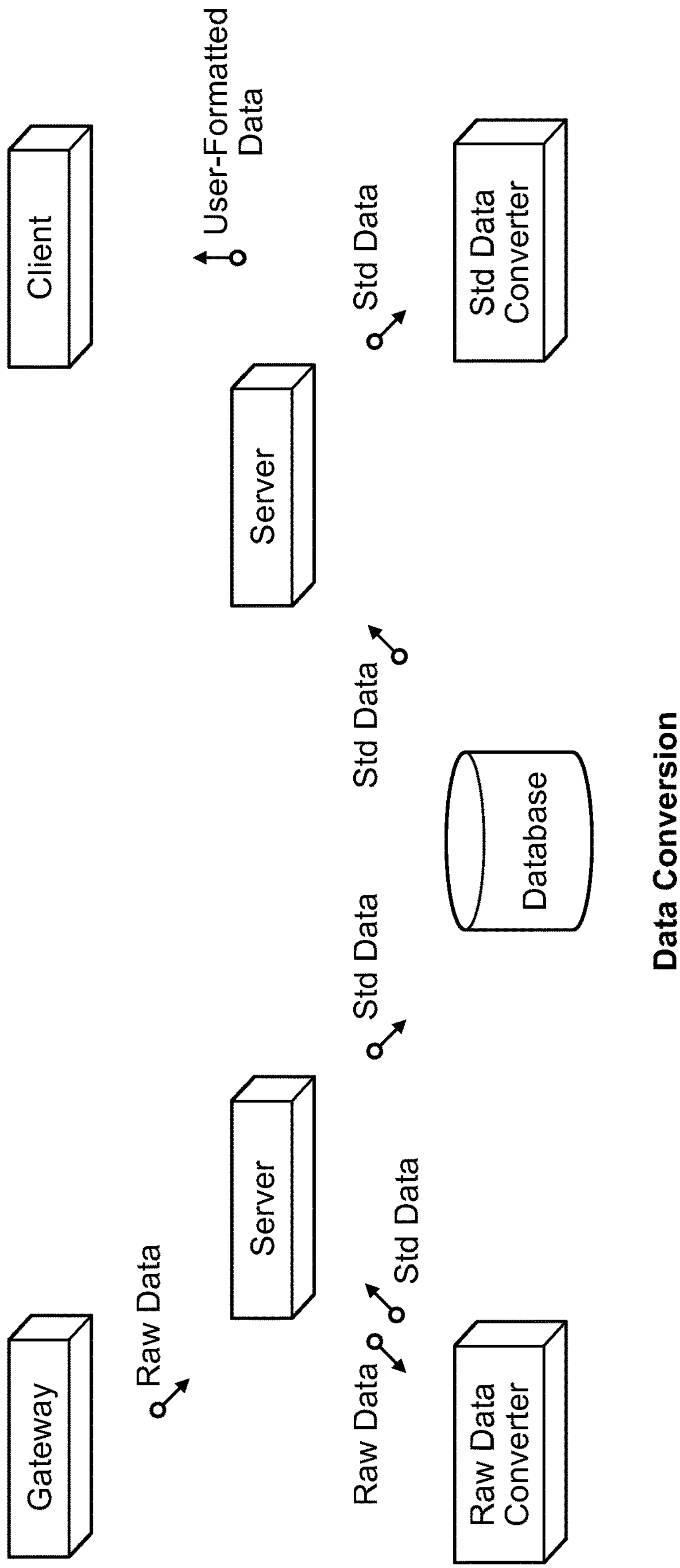
FIG. 9 is a flow diagram showing the data conversion.

FIG. 9 illustrates how the data conversion is handled. Raw data is sent up by the gateway. The server uses the device definition to determine which raw data converter to invoke, calls the converter, and stores the standard data in the database. Later, when the data is read, the server accesses the standard data from the database, optionally reformats it to the client's specifications, then returns the formatted value to the client.

Associative Binding

Binding is the process of "connecting" the output of one device (a sensor) to another device (actuator). An example is a switch that triggers a light to go on.

Gateway Binding

First, whether the devices in question use the same technology or not, associative binding uses the gateway itself as the "connection" mechanism. The gateway receives the signals from the sensor, interprets them, and relays the appropriate message to the actuator.

Gateway binding can be implemented without associative binding. That may, however, involve the gateway containing code to do the data conversion from the source device's data format to the destination device's data format. For example, if a switch is bound to a lamp controller, switching the switch to on causes the lamp to turn on.

Associative Binding

The gateway implements a form of associative binding, where a binding (connection) is triggered by the value of a source device property. Bindings are kept in a table that maps source device properties+values to destination device properties+values. For example, consider a remote control that sends out a numeric value (for example, 1 to 10). Binding entries can map the individual values to different target devices, so that each value can turn on a different lamp. Furthermore, the binding entries contain the specific values that need to be sent to the target device property.

Each associative binding defined on the gateway may include:

Index of the source device property

Index of the target device property

Source property value

Destination property value

When a sensor's bound data point reports a change, the gateway checks whether there are any bindings that match that data value. If there are, it sends the appropriate destination data to the destination device property, hence to the destination device hardware.

Figure 10:
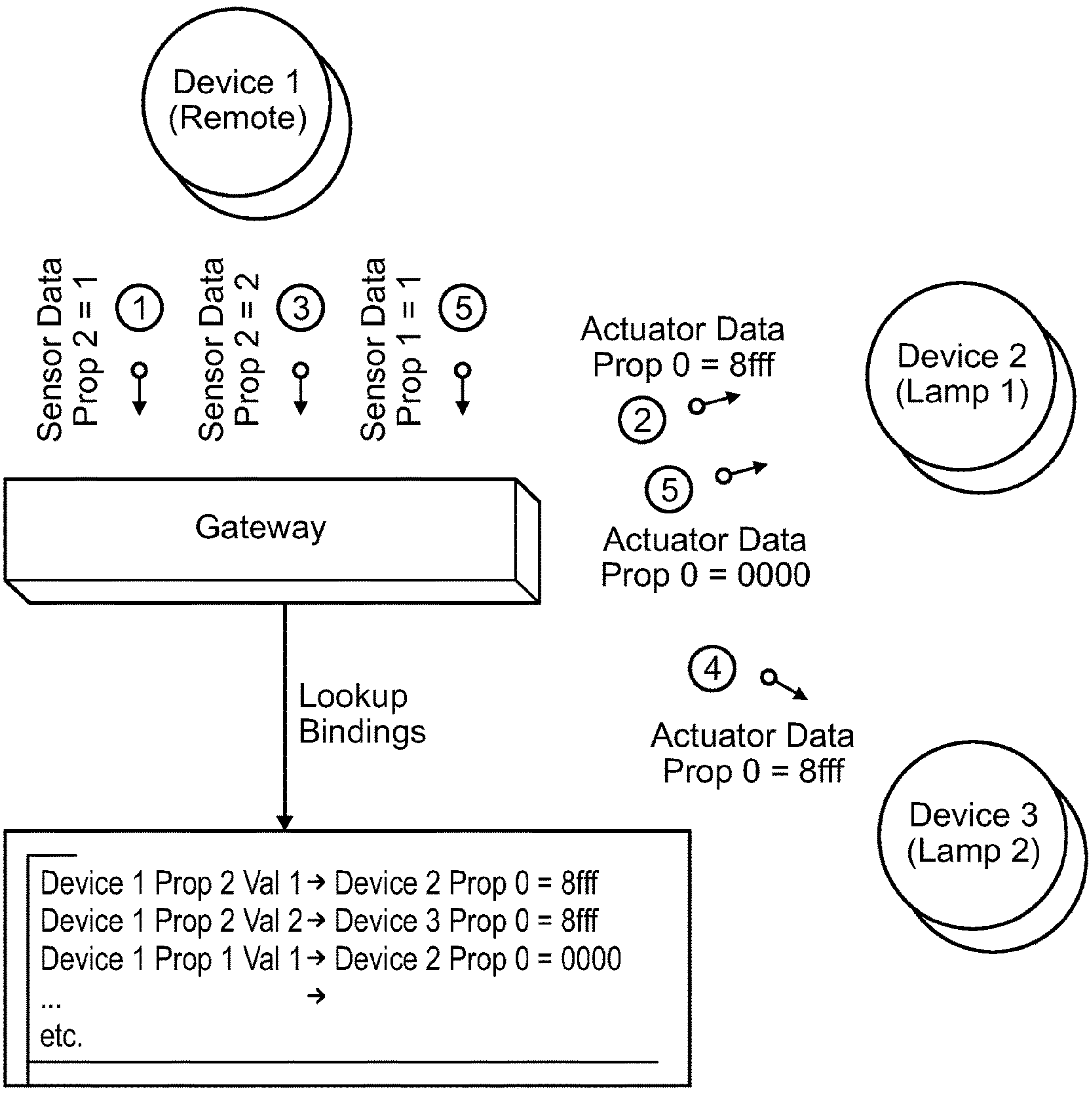
FIG. 10 is a diagram showing a gateway binding mechanism.

FIG. 10 illustrates a gateway binding mechanism. The steps illustrated in the diagram are:

1. User presses on-1 button, remote sends "prop 2=1"
2. Gateway finds "prop2=1" in table, sends "prop 0=8fff" to Device 2 prop 0
3. User presses on-2 button, remote sends "prop 2=2"
4. Gateway finds "prop2=2" in table, sends "prop 0=8fff" to Device 3 prop 0
5. User presses off-1 button, remote sends "prop 1=1"
6. Gateway finds "prop1=1" in table, sends "prop 0=0000" to Device 2 prop 0

Gateway Data Abstraction

The source and destination data are specified in the table as untyped strings, so the gateway can do a string comparison, which may not involve knowledge of the data semantics. The gateway passes the destination string back to the destination device, again without necessarily using semantic knowledge.

User Data Abstraction

In an embodiment of the system, the user knows the semantics of the data, but may not know the raw data formats. So the user knows that "when I press the lamp on button on my remote, I want the lamp to go to full brightness." Because the data from both the sensor and the actuator involved in a binding is normalized to standard data units, the user can specify their desired bindings using those standard data formats, and the system receives these selections. (In the above case, Remote "lamp" button="On" causes the Lamp to be set to "100%").

Server Data Abstraction

As in cases where the server handles sensor/actuator data, it does so in the case of bindings using the format conversion classes, driven by the device definition files. The server does not necessarily use semantic knowledge of the values being bound.

Gateway Device Abstraction

For a given user premises, in addition to the sensor and actuator data, there is system-level data that is managed. Some examples are error logs, usage logs, gateway error alerts, tracking changes to the system, etc. The gateway may be treated as a pseudo device.

In this design, system data are reported as properties belonging to the gateway pseudo device. Because the system properties are exposed this way, they can be transparently handled by the server infrastructure (logging, reporting, etc.) rather than requiring a separate logging/reporting mechanism. This enhances the resiliency of the server design, since new system properties can be added without changing the server code (simply adding the new system variables to the gateway device model suffices).

Camera Snapshot: Abstracting Images Through Properties

The data from cameras (i.e., "camera" function types) is a relatively large binary file. An embodiment of this does not fit the simple property-value model, and in an embodiment the image is not represented by a string. An embodiment handles the cameras and camera properties like other devices where it is appropriate, yet still offers the camera features (still images and video) to the user. An embodiment does that by creating special properties for the camera.

Cameras contain a property named "snapshot" that is linked to the camera's images. This property performs: 1) writing to this property causes the camera to take a snapshot and upload it to the server, and 2) the property is logged when the property changes. The value of the property is the name of the snapshot image. That is used by the server to fetch an image given a name.

Taking a Snapshot

Clients write a string value to the snapshot property that gets sent down to the gateway. That causes the camera code in the gateway to get the snapshot from the camera and upload it to the server. Finally, it reports (to the server) that the property was successfully updated. While the gateway does require special code to handle the camera interface, the device property data is handled exactly like any other device property.

Figure 11:
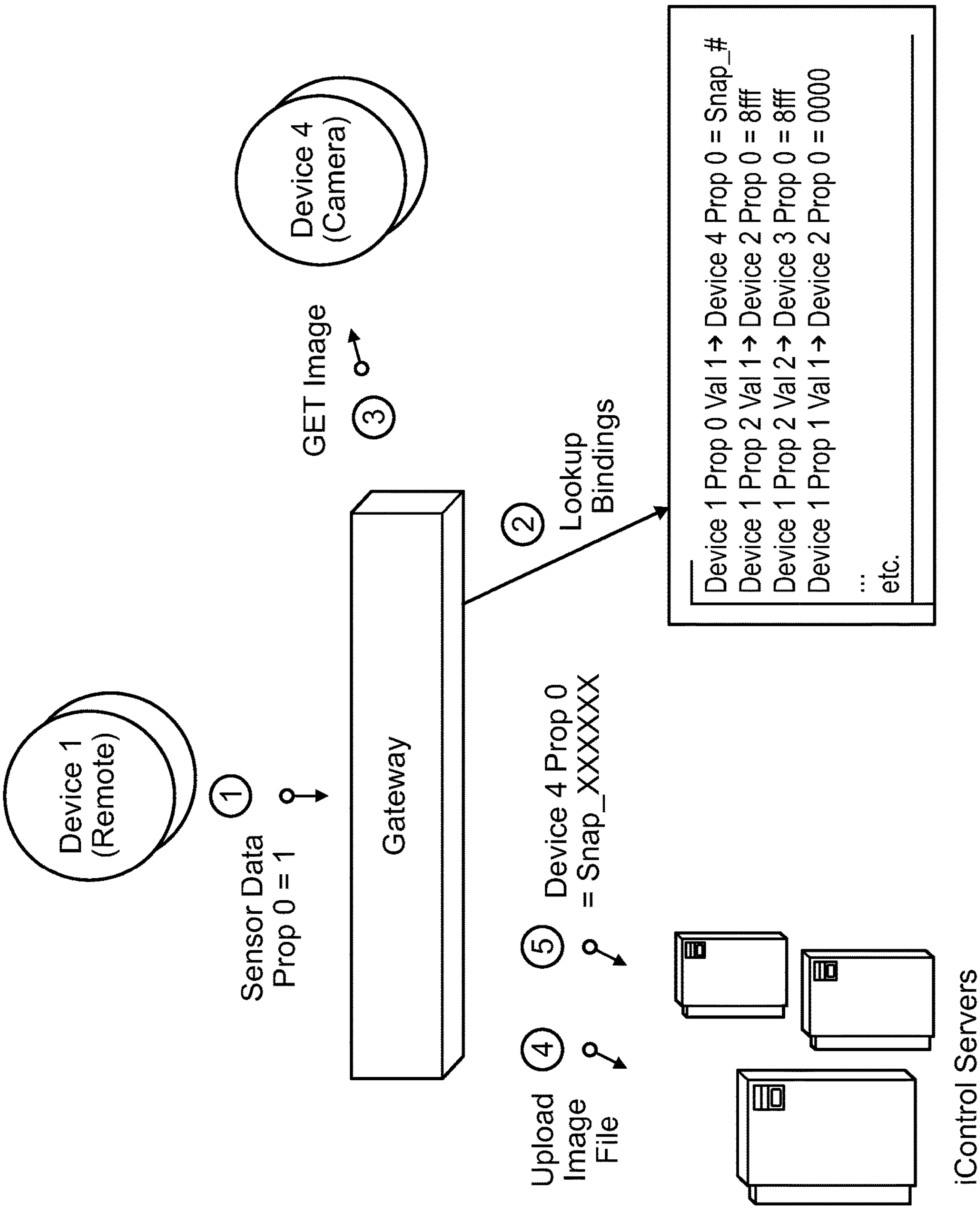
FIG. 11 is a diagram showing a camera snapshot scenario.

FIG. 11 illustrates a camera snapshot scenario.

Logging Images

By using a regular property to represent an image snapshot, the times, names, etc. of the snapshots can be logged using the ordinary property logging mechanisms used for other properties. The client software uses this history log to display thumbnails of the saved images. As in the case of the server, the client software does not need special code to get the list of images (although it does use special code to display the thumbnails and images according to an embodiment).

Binding Snapshots

Because a snapshot is triggered by a property assignment, that assignment can also occur due to a binding. Thus combining this snapshot property functionality with the associative binding capability leads to a way to take snapshots based on reported sensor data.

FIG. 11 illustrates a camera snapshot binding mechanism. The steps depicted are:

1. User presses "take picture" button on remote, remote sends "Device 1 Prop 0=1"
2. Gateway finds the binding in the table (Dev 4 Prop 0=Snap_#)
3. The # at the end tells the camera code to append a random number
4. Gateway camera code gets the data update, initiates an HTTP GET to the camera
5. Gateway camera code sends the image to the server
6. Gateway reports updated data like any other data update.

Camera Integration

Embodiments of the server and gateway incorporate a number of features that simplify the installation and use of still and video cameras.

Camera Type Abstraction

As is the case for attached devices, cameras are abstracted on the gateway so that neither the client nor the server infrastructure necessarily has specific knowledge of the camera type, thus they may handle all cameras identically according to an embodiment. (Note: the client application—in our case the portal—may use some specific camera knowledge in order to present the video and stills transparently to the user).

Integrated Stills and Video

Figure 12:
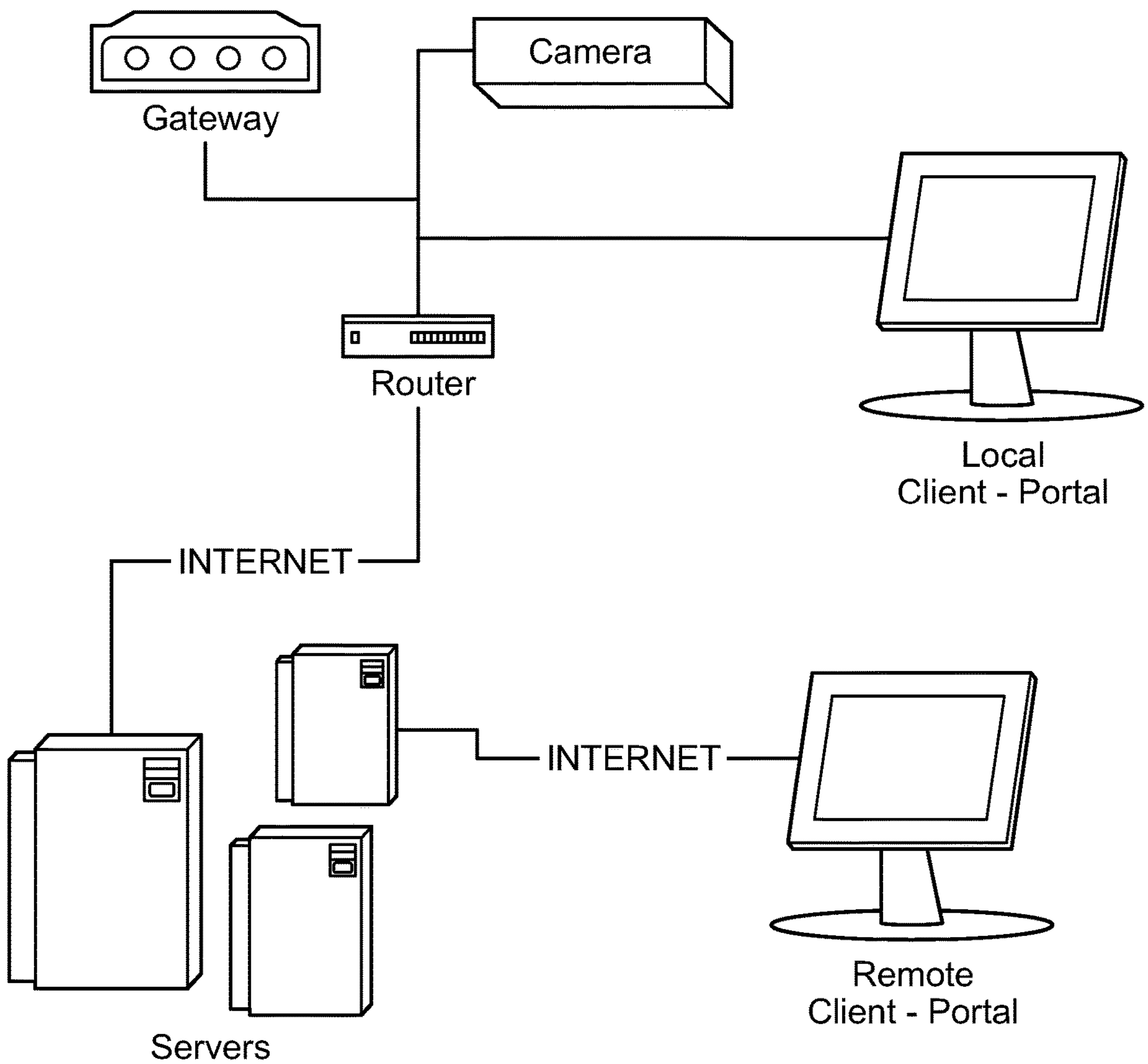
FIG. 12 is a diagram showing a camera environment.

The camera stills and video are integrated into the user interface so that the user never sees any camera-specific web pages. FIG. 12 illustrates a camera environment.

Firewall-Proof Still Images

According to an embodiment, the images from the IP-attached cameras supported are not viewed from beyond the user's own local network unless the user's router opens a port and forwards the camera requests to the camera. However, since the gateway is behind the same firewall as the camera, it gets the image from the camera and transfers it to the server via HTTP port 80 (which is always open). The images thus become available to the user on the Internet (protected by username/password).

Integrated Video Dynamic DNS Replacement

Viewing video from the camera involves the client changing router settings to forward TCP requests to their camera. Then, the portal allows the client to access the video without the client necessarily knowing the Internet address of the client's system. The gateway is in regular communication with the server, and upon update the server saves the gateway's current WAN address. When the client wants to see video from the client's camera, the server inserts the gateway's WAN address into the video image link (href). If the user's IP address changes frequently, the user can access their camera's video from anywhere.

Installation

Network cameras on the market come with a variety of installation methods. An embodiment of the gateway eliminates the need for client involvement by automatically configuring the camera hardware.

During the camera configuration, the gateway creates private administrator password, then a view-only user with a random password that is subsequently used to get camera images (still or video). The gateway searches for the camera on the local network to obtain its IP address (as assigned by the user's router). Since the gateway itself is automatically configured via DHCP, it knows the subnet and approximate address range that the router is using for the DHCP-assigned addresses.

Configuration

According to an embodiment, the camera configuration capability is exposed via camera configuration properties. Should the user want to change the camera's address or client user name/password, the user can do so in one place, on the system portal. The changes are passed down to the gateway (as camera configuration property updates) where it causes the gateway to reconfigure the camera hardware. Differences between different camera types are handled by the gateway software. These properties are handled and logged as other properties.

Router Port Forwarding Assistance

Setting a router's port forwarding table to support remote video viewing may involve:

1. Determine that port forwarding is called for
2. Find the router's configuration web page
3. Figure out what to enter as the server address
4. Figure out what to enter as the server port
5. Know what to put where
6. Know if it is working correctly An embodiment of the system addresses these items. Note that the user is logged on from the user's own network (the "Local Client" example in FIG. 12) to configure the user's router.

Determining Port Forwarding is Desired

When the user accesses a camera from the system portal, the system server performs a test to check whether the camera is accessible from the Internet. If it is, the camera page includes a link to a page that will display the video. If the camera is not accessible, the video link instead opens a camera assistance page that guides the user through steps to configure their router's port forwarding.

Finding the Router's Web Page

Since the gateway is on the same internal network as the camera, it knows what the router's address is (it is the default gateway passed back in the DHCP assignment). The portal generates a link on the camera assistance page that takes the user right to the user's router's configuration web page.

Address, Port and where to Put them

Since the camera's address and port are available via properties, the portal reads these properties and includes these properties in descriptive text on the camera assistance page. That page also contains a link to a router help page, where the user can select the user's router and get specific help on what to do to configure it.

Device Test

The camera assistance page has a button to test whether the port forwarding is a success or not. It uses the server's test-camera-access API to make the determination, and displays either a pass or fail message to let the user know.

Various Embodiments

In addition to the foregoing, the following are various examples of embodiments of the invention.

Some embodiments of a method for premises management networking include monitoring premises management devices connected to a gateway at a premises; controlling premises management devices connected to the gateway at the premises; receiving, at the premises, an uplink-initiation signal associated with a network operations center server; and in response to the uplink-initiation signal, initiating, from the gateway at the premises, communications between the gateway and the network operations center server; and communicating, during the communications between the gateway and the network operations center server, information associated with the premises management devices.

The uplink-initiation signal can be received via telephone and/or broadband connection. The gateway can initiate communications between the gateway and the network operations center server with at least an HTTP message and/or at least an XML message. The premises management devices can manage energy of the premises, security of the premises, and/or safety of the premises. Many embodiments provide a hosted solution for property developers, owners and managers as well as service providers (ISPs, telcos, utilities, etc.) such as communication service providers and Internet portal providers. Some embodiments offer a complete, turnkey, reliable, and/or cost-effective solution for the delivery of telemetry services (e.g., energy management, security, safety, access, health monitoring, messaging, etc.) to customers.

An embodiment of the invention is directed to a business method for premises management. Some embodiments of a business method for premises management include making an Internet portal available for access to a vendee, such as a premises vendee, communication service vendee, and/or an Internet portal vendee; and at least after a transaction between the vendor and the vendee, such as a premises transaction, a communication services transaction, and/or Internet portal services transaction, providing premises management services via the Internet portal to the vendee.

The Internet portal can be branded with a brand of the vendor according to an embodiment. Examples of a premises vendor include a home builder, premises builder, and premises manager. Examples of a premises vendee include a home buyer, premises buyer, and premises tenant. Examples of a communication service vendor include an Internet service provider, a telephone company, a satellite television company, and a cable television company. Examples of a communication service vendee include a customer of the Internet service provider, a customer of the telephone company, a customer of the satellite television company, and a customer of the cable television company. Premises management services can manage energy of the premises, security of the premises, and/or safety of the premises.

An embodiment of the invention is directed to a system. The system includes a network of premises management devices, a gateway coupled to the network and premises management devices, a server coupled to the gateway by a communication medium and a portal coupled to the communications medium. The portal provides communication with the premises management devices.

According to various embodiments in the invention alone or in various combinations: the communications medium may comprise the Internet; the portal may comprise an internet portal; and/or the portal may be branded with the name of a vendor of a product associated with the premises. The product may comprise a building, and/or the vendor may comprise a party that leases the premises. The vendor may also or alternatively comprise a property management organization. The server may be included within a network operations center. The logic may comprise, according to various embodiments of the invention, software, hardware, or a combination of software and hardware.

Another embodiment to the invention is directed to a gateway. The gateway includes an interface coupled to a network of premises management devices, logic that receives data from different premises management devices, and an interface coupled to a communications medium that is coupled to a server. The server is coupled to a portal coupled to the communications medium. The portal provides communications with the premises management devices.

According to various embodiments of the invention alone or in various combinations: the communications medium may comprise the Internet; the portal may comprise an internet to portal; and/or the portal may be branded with the name of a vendor of a product associated with the premises. The product may comprise a building; the vendor may comprise a party that leases the premises; the vendor may comprise a property management organization; and/or the server may be included within a network operations center.

Another embodiment of the invention is directed to premises management system. The premises management system includes a network of premises management devices and a gateway coupled to the network of premises management devices. The gateway includes logic that receives data from different premises management devices and an interface coupled to a communications medium that is coupled to a server. The server is coupled to a portal coupled to the communications medium, and the portal provides communication with the premises management devices. The logic may comprise, according to various embodiments of the invention, software, hardware, or a combination of software and hardware.

Another embodiment of the invention is directed to a system that includes: a network of premises management devices; a gateway coupled to the network of premises management devices; a server coupled to the gateway by a communications medium and a portal coupled to the communications medium, the portal providing communication with the premises management devices.

According to various embodiments in the invention, alone, or in various combinations: the common format includes a set of properties for each type of device; the format includes an index for each device and an index for each property of each device; the network comprises a network operations center; the network of premises management devices includes at least a camera; the system includes logic that reinterprets abstracted data in the common format from the different premises management devices; the server includes a device definition file for reinterpreting the abstracted data; the system includes a set of standard function types that define standard properties; the standard properties include temperature; the system includes client software that queries measurements corresponding to the respective property without specifying the type of device from which the measurement is to be received; the server includes a set of formatter classes that convert between the format of data in which data is passed from the gateway to the server in a type in which the data is stored in the server; the formatter classes are instantiated dynamically; the system includes device definitions for respective premises management devices; and/or the server is included within a network operations center.

An embodiment of the invention is directed to a gateway that includes: an interface coupled to a network of premises management devices; logic that abstracts data from different premises management devices using a common format; and an interface coupled to a communications medium that is coupled to a server. The server is coupled to a portal coupled to the communications medium, and the portal provides communication with the premises management devices. The gateway may include logic to interact with various aspects of the various systems described herein.

Another embodiment in the invention is directed to a gateway that includes: an interface coupled to a network of premises management devices, the network including at least a first device comprising a source of data and at least a second device comprising a recipient of the data; logic that abstracts data from different premises management devices using a common format; logic that maps data from a first device least comprising the source of data to data on a second device comprising the recipient of the data; and an interface coupled to a communications medium that is coupled to a server, wherein the server is coupled to a portal coupled to the communications medium, the portal providing communication with the premises management devices.

According to various embodiments of the invention, in various combinations or alternatively: the mapping is based on a property of the first device and a corresponding property of the second device; the mapping is stored in a table in the server; the mapping is based on a correspondence between an index of a property of the first device with an index of a property of the second device; gateway includes logic that checks whether there are any corresponding properties on a corresponding device that comprises a recipient of data if corresponding data from a device that comprises a source of the corresponding data changes; and/or the logic comprises hardware, software, or a combination of hardware and software.

Another embodiment of the invention is directed to a system that includes: a set of one or more premises management devices, the set of one or more premises management devices including at least a camera; a gateway coupled to the set of one or more network of premises management devices, the gateway including logic that abstracts data from a premises management device using a common format, general to different devices; a server coupled to the gateway by a communications medium; and a portal coupled to the communications medium, the portal providing communication with at least a device in the set of one or more premises management devices.

According to various embodiments of the invention, alternatively, or in various combinations: the system includes logic that transmits data from the gateway to the server using HTTP protocol; the data from the gateway includes an image from the camera; the gateway includes logic that pushes data to the server from the set of one or more premises management devices; the system includes logic that causes an image from the camera served from the server to be displayed; the system includes logic that causes an image from the camera to be transmitted from the gateway to the server in response to an uplink-initiation signal; the uplink communication signal is received via telephone; the uplink communication signal is received via telephone without requiring answering of a telephone call; the uplink communication signal is received via broadband connection; at least a device in the set of one or more network of premises management devices manages energy of the premises; at least a device in the set of one or more network of premises management devices manages security of the premises; at least a device in the set of one or more network of premises management devices manages safety of the premises; the camera includes at least a property specific to a camera and at least a property common with at least another type of device; the property specific to a camera causes the camera to take a picture; the property specific to a camera causes a picture taken by the camera to be uploaded to the server; the system includes logic that causes a picture to be taken based on the state of another device in the set of one or more premises management devices; another device in the set comprises a motion sensor; the system includes the plurality of different types of cameras and wherein the gateway includes logic that abstracts data from the different types of cameras into a common format for delivery to the server; the system includes a router that couples the gateway to the communications medium; the camera comprises an internet protocol (IP) camera; and images from the camera are provided over the communications medium only if the gateway initiates a transfer of the image to the server.

Another embodiment of the invention is directed to a system that includes: a set of one or more premises management devices, the set of one or more premises management devices including at least a camera; a gateway coupled to the set of one or more network of premises management devices; a server coupled to the gateway by a communications medium, and a portal coupled to the communications medium, the portal providing communication with at least a device in the set of one or more premises management devices. The gateway includes logic that pushes data from the set of one or more premises management devices to the server.

According to various embodiments of the invention, alternatively, or in various combinations: the gateway does not allow direct access to the set of one or more premises management devices from the communications medium; the system includes logic that causes an image from the camera to be transmitted from the gateway to the server in response to an uplink-initiation signal; the uplink communication signal is received via telephone; the uplink communication signal is received via telephone without requiring answering of a telephone call; the uplink communication signal is received via broadband connection; at least a device in the set of one or more network of premises management devices manages security of the premises; the camera includes at least a property specific to a camera and at least a property common with at least another type of device; the property specific to a camera causes the camera to take a picture; the system includes logic that causes a picture to be taken based on the state of another device in the set of one or more premises management devices; the system includes a plurality of different types of cameras and the gateway includes logic that abstracts data from the different types of cameras into a common format for delivery to the server; and/or the camera comprises an internet protocol (IP) camera.

Another embodiment of the invention is directed to a gateway that includes: an interface coupled to a set of one or more premises management devices, the set of one or more premises management devices including at least a camera; and an interface coupled to a communications medium that is coupled to a server, wherein the server is coupled to a portal coupled to the communications medium, the portal providing communication with the premises management devices; and logic that pushes data from one or more premises management devices to the server.

Components of the gateway, server, system and/or other aspects described above include any collection of computing components and devices operating together. Components of these items can also be components of subsystems or within a larger computer system or network. The components can also be coupled among any number of components (not shown), for example other buses, controllers, memory devices and data input/output (IO) devices in any number of combinations. Further common components of these items can be distributed among various numbers or combinations of other processor-based components according to various embodiments of the invention.

Aspects of the gateway, server, system and other items described here and may be implemented as functionality programmed into any variety of circuitry, including programmable logic devices, (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects these items include: microcontrollers with memory (such as electronically erasable programmable read only memory (EEPROM)), embedded microprocessors, firmware, software, etc. Furthermore, aspects of the gateway, server and other elements may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the ICS may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the system is not intended to be exhaustive or to limit the system to the precise form disclosed. While specific embodiments of, and examples for, the system are described herein for illustrative purposes, various equivalent modifications are possible within the scope of the system, as those skilled in the relevant art will recognize. The teachings of the system provided herein can be applied to other processing systems and methods, not only for the systems and methods described above.

The elements and acts of the various embodiments described above can be combined to provide further embodiments. These and other changes can be made to the system in light of the above detailed description.

In general, in the following claims, the terms used should not be construed to limit the system to the specific embodiments disclosed in the specification and the claims, but should be construed to include all processing systems that operate under the claims. Accordingly, the system is not limited by the disclosure, but instead the scope of the system is to be determined entirely by the claims.

While certain aspects of the system are presented below in certain claim forms, the inventors contemplate the various aspects of the system in any number of claim forms. For example, while only one aspect of the system is recited as embodied in machine-readable medium, other aspects may likewise be embodied in machine-readable medium. Accordingly, the inventors reserve the right to add additional claims after filing the application to pursue such additional claim forms for other aspects of the system.

The invention claimed is:

1. A system comprising:

a server device located external to a premises; and a gateway device located at the premises and in communication with the server device, wherein the gateway device is configured to:

receive, from the server device, data indicative of a current mode associated with the premises;

receive, from a premises device located at the premises, premises data;

determine, based on the current mode, a rule associated with the current mode;

determine, based on the rule associated with the current mode, a data message indicative of the premises data; and send the data message indicative of the premises data.

2. The system of claim 1, wherein the current mode comprises one or more of a home mode, an away mode, a sleep mode, a vacation mode, or a user defined mode.

3. The system of claim 1, wherein the gateway device is configured to receive data indicative of the current mode associated with premises by receiving the data indicative of the current mode based on one or more of: a user indication of the current mode via a user interface, a schedule indicating a time period associated with the current mode, or a triggering condition indicating the current mode.

4. The system of claim 1, wherein the gateway device is configured to send the data message by sending, to one or more of the server device or an additional premises device located at the premises, the data message.

5. The system of claim 1, wherein the gateway device is configured to determine, based on a mapping of a format associated with the premises device to a common format associated with mapping a plurality of data formats to a single format, a data value and processing the data value to determine the data message.

6. The system of claim 1, wherein the gateway device is configured to store a plurality of rules corresponding to a plurality of modes, wherein the plurality of rules comprise a first rule triggering a first type of message if data is received during a first mode and a second rule triggering a second type of message if the data is received during a second mode.

7. A device comprising:

one or more processors; and memory storing instructions that, when executed by the one or more processors, cause the device to:

receive, from a server device located external to a premises, data indicative of a current mode associated with the premises;

receive, from a premises device located at the premises, premises data;

determine, based on the current mode, a rule associated with the current mode;

determine, based on the rule associated with the current mode, a data message indicative of the premises data; and send the data message indicative of the premises data.

8. The device of claim 7, wherein the current mode comprises one or more of a home mode, an away mode, a sleep mode, a vacation mode, or a user defined mode.

9. The device of claim 7, wherein the instructions that, when executed by the one or more processors, cause the device to receive data indicative of the current mode associated with premises comprises instructions that, when executed by the one or more processors, cause the device to receive the data indicative of the current mode based on one or more of: a user indication of the current mode via a user interface, a schedule indicating a time period associated with the current mode, or a triggering condition indicating the current mode.

10. The device of claim 7, wherein the instructions that, when executed by the one or more processors, cause the device to send the data message comprises instructions that, when executed by the one or more processors, cause the device to send, to one or more of the server device or an additional premises device located at the premises, the data message.

11. The device of claim 7, wherein the instructions, when executed by the one or more processors, further cause the device to determine, based on a mapping of a format associated with the premises device to a common format associated with mapping a plurality of data formats to a single format, a data value and processing the data value to determine the data message.

12. The device of claim 7, wherein the instructions, when executed by the one or more processors, further cause the device to store a plurality of rules corresponding to a plurality of modes, wherein the plurality of rules comprise a first rule triggering a first type of message if data is received during a first mode and a second rule triggering a second type of message if the data is received during a second mode.

13. The device of claim 7, wherein the device comprises one or more of gateway device or a network device.

14. The device of claim 7, wherein the device is a gateway device located at the premises.

15. A non-transitory computer-readable medium storing computer-executable instructions that, when executed, cause:

receiving, by a gateway device located a premises and from a server device located external to the premises, data indicative of a current mode associated with the premises;

receiving, by the gateway device and from a premises device located at the premises, premises data;

determining, based on the current mode, a rule associated with the current mode;

determining, by the gateway device and based on the rule associated with the current mode, a data message indicative of the premises data; and sending, by the gateway device, the data message indicative of the premises data.

16. The non-transitory computer-readable medium of claim 15, wherein the current mode comprises one or more of a home mode, an away mode, a sleep mode, a vacation mode, or a user defined mode.

17. The non-transitory computer-readable medium of claim 15, wherein receiving data indicative of the current mode associated with premises comprises receiving the data indicative of the current mode based on one or more of: a user indication of the current mode via a user interface, a schedule indicating a time period associated with the current mode, or a triggering condition indicating the current mode.

18. The non-transitory computer-readable medium of claim 15, wherein sending the data message comprises sending, to one or more of the server device or an additional premises device located at the premises, the data message.

19. The non-transitory computer-readable medium of claim 15, wherein the instructions, when executed, further cause determining, based on a mapping of a format associated with the premises device to a common format associated with mapping a plurality of data formats to a single format, a data value and processing the data value to determine the data message.

20. The non-transitory computer-readable medium of claim 15, wherein the instructions, when executed, further cause storing a plurality of rules corresponding to a plurality of modes, wherein the plurality of rules comprise a first rule triggering a first type of message if data is received during a first mode and a second rule triggering a second type of message if the data is received during a second mode.

21. A device comprising:

one or more processors; and memory storing instructions that, when executed by the one or more processors, cause the device to:

receive, from a server device located external to a premises, data indicative of a current mode associated with the premises;

receive, from a premises device located at the premises, premises data;

determine, based on a rule associated with the current mode, a type of message; and send, based on the type of message, a data message indicative of the premises data.

22. The device of claim 21, wherein the current mode comprises one or more of a home mode, an away mode, a sleep mode, a vacation mode, or a user defined mode.

23. The device of claim 21, wherein the instructions that, when executed by the one or more processors, cause the device to receive data indicative of the current mode associated with premises comprises instructions that, when executed by the one or more processors, cause the device to receive the data indicative of the current mode based on one or more of: a user indication of the current mode via a user interface, a schedule indicating a time period associated with the current mode, or a triggering condition indicating the current mode.

24. The device of claim 21, wherein the instructions, when executed by the one or more processors, further cause the device to determine, based on the current mode the rule.

25. The device of claim 21, wherein the instructions, when executed by the one or more processors, further cause the device to determine, based on a mapping of a format associated with the premises device to a common format associated with mapping a plurality of data formats to a single format, a data value and processing, based on the rule, the data value to determine the type of message.

26. The device of claim 21, wherein the instructions, when executed by the one or more processors, further cause the device to store a plurality of rules corresponding to a plurality of modes, wherein the plurality of rules comprise a first rule triggering a first type of message if data is received during a first mode and a second rule triggering a second type of message if the data is received during a second mode.

27. The device of claim 21, wherein the instructions that, when executed by the one or more processors, cause the device to send the data message comprises instructions that, when executed by the one or more processors, cause the device to send, to one or more of the server device or an additional premises device located at the premises, the data message.

28. The device of claim 21, wherein the device is a gateway device located at the premises.

29. A non-transitory computer-readable medium storing computer-executable instructions that, when executed, cause:

receiving, by a gateway device located at a premises and from a server device located external to the premises, data indicative of a current mode associated with the premises;

receiving, from a premises device located at the premises, premises data;

determining, based on a rule associated with the current mode, a type of message; and sending, based on the type of message, a data message indicative of the premises data.

30. The non-transitory computer-readable medium of claim 29, wherein the current mode comprises one or more of a home mode, an away mode, a sleep mode, a vacation mode, or a user defined mode.

31. The non-transitory computer-readable medium of claim 29, wherein receiving data indicative of the current mode associated with premises comprises receiving the data indicative of the current mode based on one or more of: a user indication of the current mode via a user interface, a schedule indicating a time period associated with the current mode, or a triggering condition indicating the current mode.

32. The non-transitory computer-readable medium of claim 29, wherein the instructions, when executed, further cause determining, based on the current mode, the rule.

33. The non-transitory computer-readable medium of claim 29, wherein the instructions, when executed, further cause determining, based on a mapping of a format associated with the premises device to a common format associated with mapping a plurality of data formats to a single format, a data value and processing, based on the rule, the data value to determine the type of message.

34. The non-transitory computer-readable medium of claim 29, wherein the gateway device is configured to store a plurality of rules corresponding to a plurality of modes, wherein the plurality of rules comprise a first rule triggering a first type of message if data is received during a first mode and a second rule triggering a second type of message if the data is received during a second mode.

35. The non-transitory computer-readable medium of claim 29, wherein sending the data message comprises sending, to one or more of the server device or an additional premises device located at the premises, the data message.

* * * * *